United States Patent [19]

Haussmann et al.

[11] Patent Number: 4,471,480

[45] Date of Patent: Sep. 11, 1984

[54] PROGRAMMABLE CONTROLLER FOR A TDM DIGITAL MULTIPLEXER-DEMULTIPLEXER COMBINATION

[75] Inventors: Robert H. Haussmann, Wayne; Stuart B. Cohen, Cedar Grove; Arthur L. Bandini, Harrington Park, all of N.J.

[73] Assignee: International Telephone and Telegraph Corporation, New York, N.Y.

[21] Appl. No.: 334,001

[22] Filed: Dec. 23, 1981

[51] Int. Cl.³ ............................................ H04J 3/00

[52] U.S. Cl. ................................................... 370/84

[58] Field of Search ...................... 370/13, 32, 42, 43, 370/79, 84, 99, 100, 96, 102, 112

[56] References Cited

U.S. PATENT DOCUMENTS

| | | | |
|---|---|---|---|
| 3,982,074 | 9/1976 | Clark | 370/99 |
| 3,982,077 | 9/1976 | Clark et al. | 370/99 |
| 4,143,246 | 3/1979 | Smith | 370/100 |
| 4,206,322 | 6/1980 | Lurtz | 370/84 |
| 4,313,193 | 1/1982 | Nakano et al. | 370/43 |

OTHER PUBLICATIONS

"Code and Speed Dependent TDM System 3TR1600 for Telegraph and Data Transmission," by R. Bodart et al., Nov. 1978, pp. 197–209, Philips Telecommunications Review.

*Primary Examiner*—Douglas W. Olms

*Assistant Examiner*—Wellington Chin

*Attorney, Agent, or Firm*—John T. O'Halloran; Alfred C. Hill

[57] ABSTRACT

A common controller in the form of a programmed digital sequencer executes a series of instructions to control multiplexing-demultiplexing overhead channel format generation, frame synchronization stuff-destuff operation and automatic channel assignment in a digital TDM multiplexer-demultiplexer combination at one communication terminal to enable multiplexing N input data signals each having a predetermined bit rate into a transmitted synchronous data stream having a predetermined fixed data format and a given bit rate greater than the sum of the predetermined bit rates and to demultiplex N output data signals each having the predetermined bit rate from a received synchronous data stream having the data format and the given bit rate, where N is an integer greater than one. The disclosed common controller can be used with synchronous input and output data signals or for asynchronous input and output data signals wherein the asynchronous input and output data signals are distributed throughout the fixed data format in the time slots thereof evenly due to the automatic channel assignment. The programmed digital sequencer includes program memory means and support logic means coupled to the memory means to supply control signals in response to a plurality of digital codes present in the program memory means for multiplexing, demultiplexing, overhead channel format generation frame synchronization, stuff-destuff control and automatic channel assignment.

29 Claims, 37 Drawing Figures

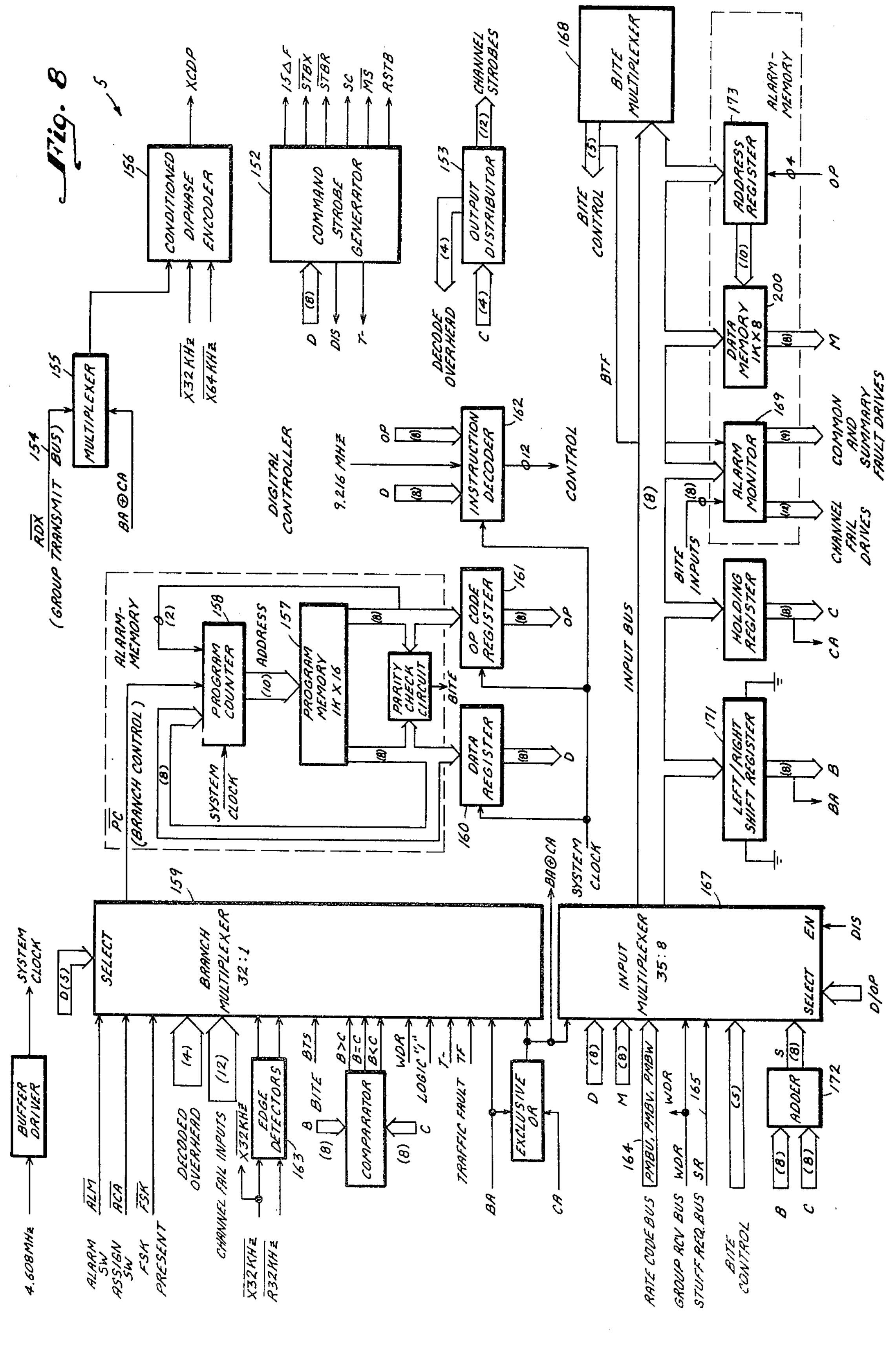
Fig. 8
CONDITIONED DIPHASE ENCODER
COMMAND STROBE GENERATOR
OUTPUT DISTRIBUTOR
BITE MULTIPLEXER
ALARM-MEMORY
ADDRESS REGISTER
DATA MEMORY 1K X 8
ALARM MONITOR
HOLDING REGISTER
LEFT/RIGHT SHIFT REGISTER
INPUT MULTIPLEXER 35:8
BRANCH MULTIPLEXER 32:1
MULTIPLEXER
DIGITAL CONTROLLER
INSTRUCTION DECODER
OP CODE REGISTER
DATA REGISTER
PROGRAM COUNTER
PROGRAM MEMORY 1K X 16
PARITY CHECK CIRCUIT
BUFFER DRIVER
EDGE DETECTORS
COMPARATOR
EXCLUSIVE OR
ADDER
INPUT BUS ARITHMETIC UNIT
54LS283 4-BIT ADDER
54LS85 4-BIT COMPARATOR
54LS194 4-BIT BIDIRECTIONAL REGISTER
54LS374 OCTAL D FLIP FLOPS
HOLDING REGISTER
TO FIG.16D
TO FIG.16C
TO FIG.16A
TO FIG.16E
TO FIGS.16A,16C
OPH FROM FIG 16A
FROM FIG.16E
FROM FIG.16A
FROM FIG.16D
172
171

173
FROM FIG.16A
DG
54LS251 8:1 MULTIPLEXER
FSK
TO FIG.16C
TO FIG.16D
54LS161 4-BIT COUNTER
1KX1 RAM
93L425
DATA MEMORY
MCS
MEMW
FROM FIG.16E
JAMA
CLK
PON CLR
FROM FIG.16J
FROM FIG.16D
INA
INB
INC
IND
INE
INF
ING
INH
MA
MB
MC
MD
ME
MF
MG
MH

ALARM FAULT DRIVERS
169
170
54LS259 8-BIT ADDRESSABLE LATCH
54S138 3:8 DECODER
54LS161 4-BIT COUNTER
TO FRONT PANEL
TO AUDIBLE ALARM
TO FIG. 22E

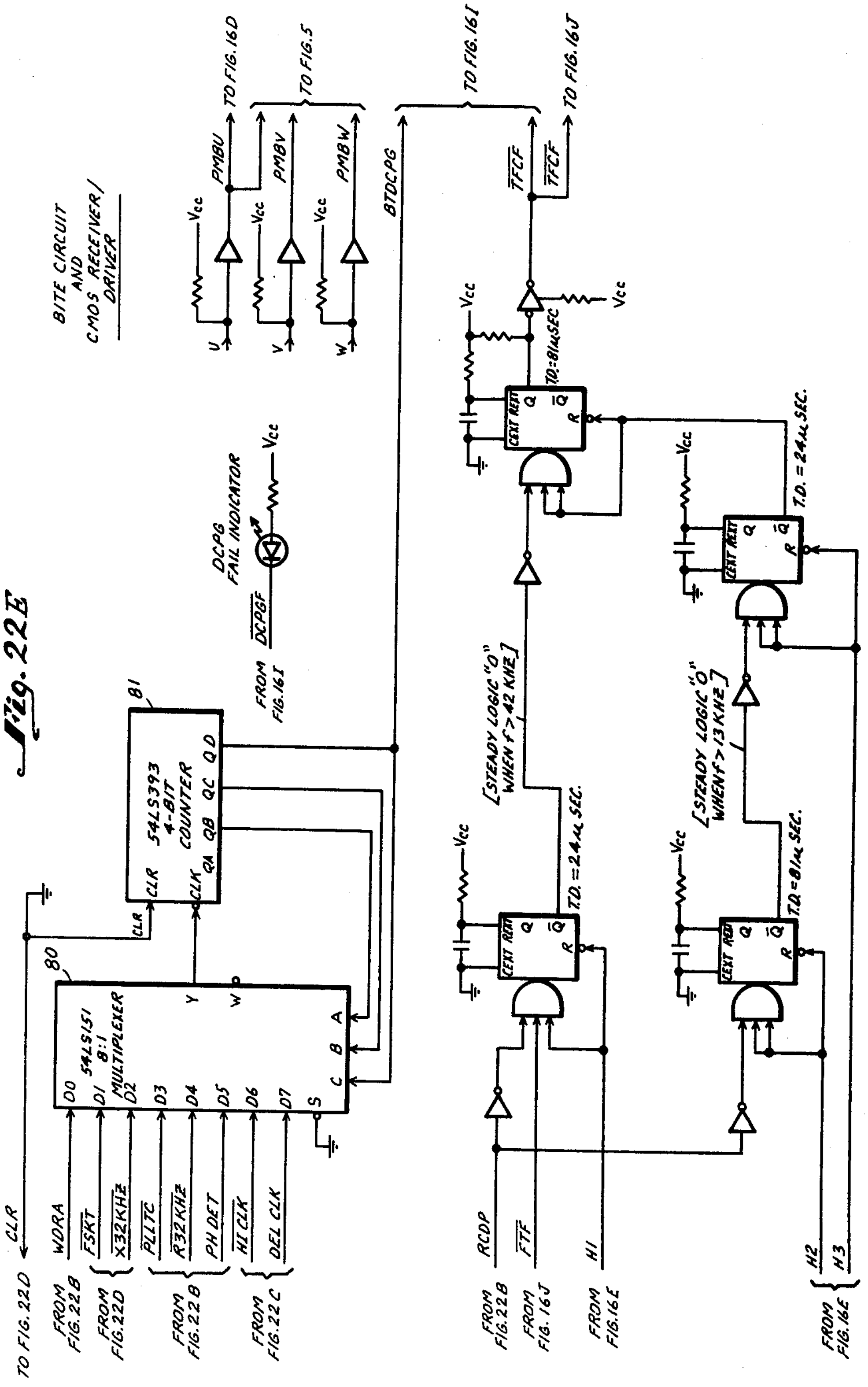
Fig. 22E
BITE CIRCUIT AND CMOS RECEIVER/ DRIVER
54LS151 8:1 MULTIPLEXER
80
54LS393 4-BIT COUNTER
81
CLR
CLK
QA QB QC QD
D0 D1 D2 D3 D4 D5 D6 D7 S
C B A Y W
TO FIG. 22D
FROM FIG. 22B
FROM FIG. 22D
FROM FIG. 22B
FROM FIG. 22C
WDRA
FSKT
X32KHz
PLLTC
R32KHz
PH DET
H1 CLK
DEL CLK
DCPG FAIL INDICATOR
FROM FIG. 16I
DCPGF
Vcc
U
V
W
PMBU
PMBV
PMBW
TO FIG. 16D
TO FIG. 5
BTDCPG
TO FIG. 16I
TFCF
TO FIG. 16J
T.D. = 81μSEC
T.D. = 24μ SEC.
T.D. = 81μ SEC.
CEXT REXT
Q
Q̄
R
[STEADY LOGIC "O" WHEN f > 42 KHZ]
[STEADY LOGIC "O" WHEN f > 13 KHZ]
RCDP
FTF
H1
H2
H3
FROM FIG. 22B
FROM FIG. 16J
FROM FIG. 16E
FROM FIG. 16E

PROGRAMMABLE CONTROLLER FOR A TDM DIGITAL MULTIPLEXER-DEMULTIPLEXER COMBINATION

BACKGROUND OF THE INVENTION

The present invention relates to a controller for a TDM multiplexer-demultiplexer combination and more particularly to a programmable controller for a TDM digital multiplexer-demultiplexer combination.

An asynchronous multiplexer and demultiplexer combination and its associated hard wired common controller is disclosed in U.S. Pat. No. 3,982,077 of J. M. Clark, S. B. Cohen and A. H. Magnus, issued Sept. 21, 1976, assigned to the same assignee as the instant application.

The asynchronous digital TDM multiplexer-demultiplexer combination located at one communication terminal of this patent will multiplex N asynchronous source data signals having a first mixture of different bit rates into a transmitted synchronous data stream having a predetermined fixed data format and a given bit rate greater than the total of the bit rates of the source data and will demultiplex N asynchronous source data signals having a second mixture of different bit rates from a received synchronous data stream having the predetermined fixed data format and the given bit rate, where N is an integer greater than one. This combination includes an automatic channel assignment circuit to assign channels of the two data streams to the asynchronous source data signals in a manner to minimize temporary data memory regardless of the number of different bit rates by assigning the data signals to channels of the associated one of the two data streams so that the bits of each of the data signals tend to have equal spacing throughout the bits of the associated one of the two data streams. The channel assignment control circuit also includes a means to automatically indicate when the total of the mixture of the bit rates has exceeded an allowable maximum.

The asynchronous multiplexer-demultiplexer combination of the above-cited patent employed 24 channel capability for NRZ (non-return to zero) or conditioned diphase digital signals and a hard wired common controller to provide the common control functions for a multiplexer-demultiplexer combination. The common control functions include the multiplexing and demultiplexing time slot assignments, overhead channel format generation, receive frame synchronization, stuff-destuff control, automatic channel assignment and BITE (built-in test equipment). The hard wired circuitry of the above-cited U.S. patent provided automatic channel assignment which simplifies the human interface with the equipment, optimal frame format and overhead channel assignment which minimizes format jitter, provides excellent framing performance compatible with the automatic channel assignment concept and employs custom large scale integrated (LSI) circuits which provide most of the logic functions of the multi-user digital cards.

SUMMARY OF THE INVENTION

The multiplexer-demultiplexer combination of the present application accommodates a number of asynchronous digital channel rates (600, 1,200, 2,400, 4,800 and 9,600 bits per second), low-speed digital teletypewriter (TTY) inputs up to 150 baud and an FSK channel using front panel thumbwheel selection and automatic channel assignment. Any mix of rates and/or modes (digital or FSK) are allowed as long as the aggregate channel bit rates do not exceed 30 kilobits per second (digital TTY and FSK channels each counted as 1,200 bits per second).

The construction of the asynchronous multiplexer-demultiplexer combination uses the stuff-only control technique for asynchronous multiplexing, and one unique feature necessary to allow a digital channel card at one end of the communication link to interface to an FSK channel card at the other end is a special dummy stuff request generated by the FSK circuitry. Digital to digital, digital to FSK, FSK to digital and FSK to FSK subscriber connections are allowed without any additional interface circuitry or equipment required.

The multiplexer-demultiplexer combination provides an intelligent BITE function which suppresses secondary alarm indications when the primary source of a failure is detected.

All common control functions are provided on three printed circuit boards, a reduction of 50% from the number of printed circuit boards required in the construction of the asynchronous multiplexer-demultiplexer of the above-cited U.S. Patent. This is accomplished by using a programmed controller to replace five previous hard wired printed circuit boards with two new ones. The master oscillator and clock divider circuits are essentially the same printed circuit board as in the multiplexer-demultiplexer combination of the above-cited U.S. patent.

Not only is the equipment of the asynchronous digital TDM multiplexer-demultiplexer combination of the present invention smaller, lighter, lower-powered and lower-cost than that of the above-cited U.S. patent, but also a higher predicted MTBF (mean time between failures) and an improved BITE arrangement is provided which simplifies the operator interface.

An object of the present invention is to provide a programmable controller for either a synchronous multiplexer-demultiplexer combination or an asynchronous multiplexer-demultiplexer combination for a TDM communications system which provides all of the common control functions for a multiplexer-demultiplexer combination which were accomplished with hard wire logic in the arrangement of the above-cited U.S. patent.

Another object of the present invention is to provide a programmable controller for a TDM synchronous multiplexer-demultiplexer combination or an asynchronous multiplexer-demultiplexer combination which controls multiplexing and demultiplexing and controls overhead channel format generation, receive frame synchronization, stuff/destuff control, automatic channel assignment and intelligent BITE.

A feature of the present invention is the provision in a digital time division multiplexer-demultiplexer combination at one communication terminal to multiplex N input data signals each having a predetermined rate into a transmitted synchronous data stream having a predetermined fixed data format and a given bit rate greater than the sum of the selected bit rates and to demultiplex N output data signals each having the predetermined bit rate from a received synchronous data stream having the data format and the given bit rate, where N is an integer greater than one, a common controller coupled to a timing signal generator and each of N channel printed circuit board plug-in receptacles each coupled to a different one of the N input data signals and a different one of N outputs each for a different one of the N output signals, each of the N receptacles having plugged therein a selected one of no printed circuit boards, a digital data channel printed circuit board and a frequency shift keying (FSK) channel printed circuit board to process a mixture of digital data signals, teletype signals and FSK signals in the N input data signals and the received data stream, the mixture of signals being in any random order and mix and the digital channel printed circuit boards and the FSK channel printed circuit boards being plugged in the N receptacles in any random order and mix, the controller at least controlling the N receptacles for multiplexing the N input data signals to provide the transmitted data stream and for demultiplexing the received data stream to distribute the output data signals to appropriate ones of the N outputs and controlling the timing signal generator for aligning receive timing signals with the data format of the received data signal to provide receive frame synchronization to enable proper demultiplexing of the received data stream, the controller comprising: a programmed digital sequencer executing a series of instructions to control the multiplexing, the demultiplexing and the frame synchronization, the sequencer including a program memory means to supply a plurality of digital codes each related to a different one of the series of instructions, and support logic means coupled to the memory means, the N receptacles and the timing generator responsive to the plurality of digital codes to provide control signals for the multiplexing, the demultiplexing and the frame synchronization.

The programmable controller implementation of the present application replaces five printed circuit boards of the multiplexer-demultiplexer combination of the above-cited patent with two printed circuit boards resulting in lower cost, less power and weight and reduced size. The predicted MTBF is higher and the BITE functions have been improved, including the capability to suppress secondary fault indicators when the primary fault has been identified.

The programmable controller of the present invention includes standard MSI logic circuits and memory chips using a custom-designed program language. This allows implementation with standard QPL or easily qualified parts. The only common circuits required in addition to the controller are the master oscillator and clock divider and the group line driver and receiver.

The programmable controller approach is flexible and will allow variations in design parameters to be easily accommodated. These may include but are not limited to: (1) change the number of channels; (2) change channel and/or group bit rates; (3) change overhead formats and stuff/destuff control; (4) accommodate other frame synchronization codes and (5) add additional channel card types.

The basic programmable controller design can be used for a synchronous multiplexer by dropping the stuff/destuff control. The automatic channel assignment feature would be retained if channel rates are variable.

This construction may be implemented by using a microprocessor or LSI microcontroller as long as the speed and temperature requirements for the application are met.

BRIEF DESCRIPTION OF THE DRAWINGS

Above-mentioned and other features and objects of this invention will become more apparent by reference to the following description taken in conjunction with the accompanying drawing, in which:

FIG. 8 is a block diagram of the common controller of the asynchronous multiplexer-demultiplexer combination in accordance with the principles of the present invention;

FIGS. 22A–22E is a schematic diagram of the digital clock pulse generator of the asynchronous multiplexer-demultiplexer in accordance with the principles of the present invention with the interconnection between various ones of FIGS. 22A–22E and other Figs. of the drawing being shown by the labeling on the input and output of these circuits.

DESCRIPTION OF THE PREFERRED EMBODIMENT

Overall System

The asynchronous multiplexer-demultiplexer combination of the present application is a repackaging of the asynchronous TDM multiplexer-demultiplexer combination of the above-cited U.S. Patent. Some of the key design concepts which were carried forward into the present application include automatic channel assignment which simplifies the human interface; optimal frame format and overhead channel assignment which minimizes format jitter, provides excellent framing performance compatible with the automatic channel assignment concept; and custom large-scale integrated (LSI) circuits which provide most of the logic functions of the multiple-user digital channel printed circuit boards. The asynchronous TDM multiplexer-demultiplexer combination of the present application is accomplished in a smaller, lighter and lower-powered equipment as a result of some of the requirement changes and improvements in the packaging of the proven design concepts of the above-cited U.S. patent. Some of the changes are (1) reduced number of channels from 24 in the above-cited U.S. patent to 12 channels of the present invention; (2) simplified channel rate selection from dual simplex to full duplex, which requires one thumbwheel rate select switch per channel instead of two; (3) single channel interface with the deletion of alternate TTL interface simplifies channel printed circuit boards and reduces chassis input/output connections; and (4) improved common logic design. The original design of the present application is implemented with new logic concepts reducing common printed circuit boards from 6 to 3.

The improvement and simplifications as described herein results in a more cost-effective and more versatile equipment. All circuit constructions are based upon the use of proven algorithms and circuits which have been incorporated in the equipment of the above-cited U.S. Patent.

The reduction in the common logic printed circuit boards is attained by the use of more advanced low-power Schottky MSI circuits. A programmed controller logic approach provides all necessary functions including the automatic channel assignment and frame synchronization algorithms with the added benefit of an "intelligent" BITE capability. For virtually any circuit fault, the printed circuit board at fault will be identified and its fault indicator activated. Indicators on other printed circuit boards will be inhibited.

One of the major design features required to achieve a cost-effective construction in accordance with the present invention is the use of custom LSI circuits on the digital channel printed circuit board. These printed circuit boards can be supplied by Collins Radio Semiconductor Division, now a part of Rockwell International, and by American Microsystems Incorporated.

Figure 1:
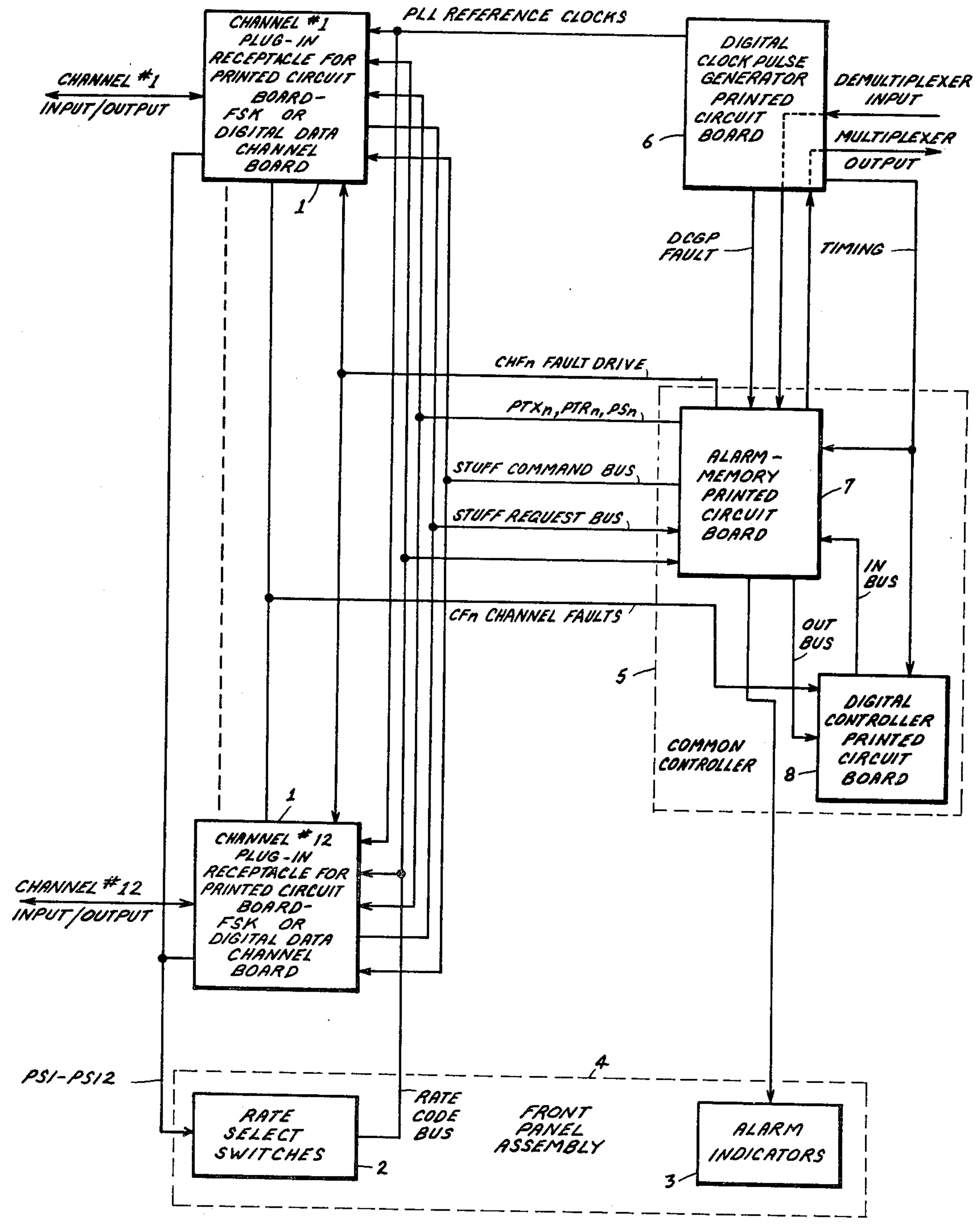
FIG. 1 is a block diagram of the asynchronous TDM multiplexer-demultiplexer combination in accordance with the principles of the present invention.

Referring to FIG. 1, there is illustrated therein a block diagram of the asynchronous TDM multiplexer-demultiplexer combination in accordance with the principles of the present invention. Each of the 12 channel positions or receptacles 1 for the printed circuit boards in the printed circuit board nest will accept either the digital data channel printed circuit board or the FSK channel printed circuit board. Any configuration of the two types of printed circuit boards may be used in any order in the 12 channel positions or receptacles 1. The proper mode and data rate selection is made for each channel with the front panel thumbwheel switches 2.

Built-in test equipment (BITE) detects faults and activates fault indicators on the plug in module (printed circuit board) where a fault originates. The BITE provides a front panel visual indication as follows: (1) a functional fault summary activated by any detected functional fault, (2) a traffic alarm which signals loss of traffic at the demultiplexer input and (3) a rate overload where the channel rate select switches are set to a combination which exceeds the 30 KBPS (kilobit per second) aggregate input capability. An alarm buzzer is activated with the first two visual indicators above. This can be silenced by use of a front panel push-button switch. The alarm indicators 3 are located on a front panel assembly 4 along with thumbwheel rate select switches 2.

All active circuitry is located on fifteen printed circuit boards and the power supply module, easily accessible from the front of the equipment case. The front panel thumbwheel switches 2, alarm indicators 3 and push-button switches are also located on a front-removable module which houses the audible alarm.

The line protect assembly containing the EMP capacitors and diodes is also accessible behind the printed circuit board front access panel. Removal of the above-mentioned units leaves a chassis with only wiring and connectors—no difficult-to-access electrical components.

Functions required for each channel interface are duplicated on individual channel printed circuit boards. Each channel is functionally independent of the mode of operation of all other channel cards including whether or not the other channel slots or receptacles are equipped with cards. All functions which are common to the overall operation of the multiplexing and demultiplexing functions are grouped together on the common cards or printed circuit boards, such as the common controller 5, and the digital clock pulse generator printed circuit board 6. Some additional rules had to be imposed due to the addition of the second type (FSK) of channel interface. The channel printed circuit boards and their interfaces to the common logic are designed so each of the 12 channel receptacles or slots can be equipped with either a digital channel printed circuit board or an FSK channel printed circuit board, in any order or mix. Those signals which are used by both types of channel printed circuit boards are used in the same manner requiring no changes in the common logic to accommodate the two types of printed circuit boards. This includes the data multiplexing and demultiplexing buses, timing strobes and BITE signals.

The signals which are unique to one type of channel printed circuit board, such as the FSK timing signals, are always present at the printed circuit receptacle, but used only by the printed circuit board type which requires them.

The digital data channel printed circuit board is essentially the same as in the above-cited patent. The alternate TTL and timing interfaces have been deleted and there are improvements in the BITE implementation.

The FSK channel printed circuit board is new, designed to be compatible with the TH-22 Teletypewriter equipment. As mentioned above, this printed circuit board is designed to be interchangeable with the digital data channel printed circuit board.

The common logic, originally consisting of six printed circuit boards, has been redesigned to fit onto three printed circuit boards. All of the functions of the original common logic as disclosed in the above-cited patent are retained, including an improved BITE function. The digital clock pulse generator printed circuit board 6 is basically the same as the original reference frequency generator printed circuit board of the above-cited patent, except it now contains both the transmit and receive group interface circuits. The common controller module performs all of the common control functions, including multiplexing and demultiplexing timing control, frame synchronization and automatic channel assignment. The memory-alarm module 7 of the common controller 5 contains the control codes and random-access memory (RAM) required by controller 5. The logic for an improved BITE and alarm capability is also found on printed circuit board 7. Detailed descriptions of each of the printed circuit board modules is given in the following sections.

Digital Data Channel Printed Circuit Board

This section describes the digital data channel printed circuit board of the TDM multiplexer-demultiplexer combination of the present invention. This printed circuit board is a minor redesign of the port logic card of the above-cited patent.

Figure 2:
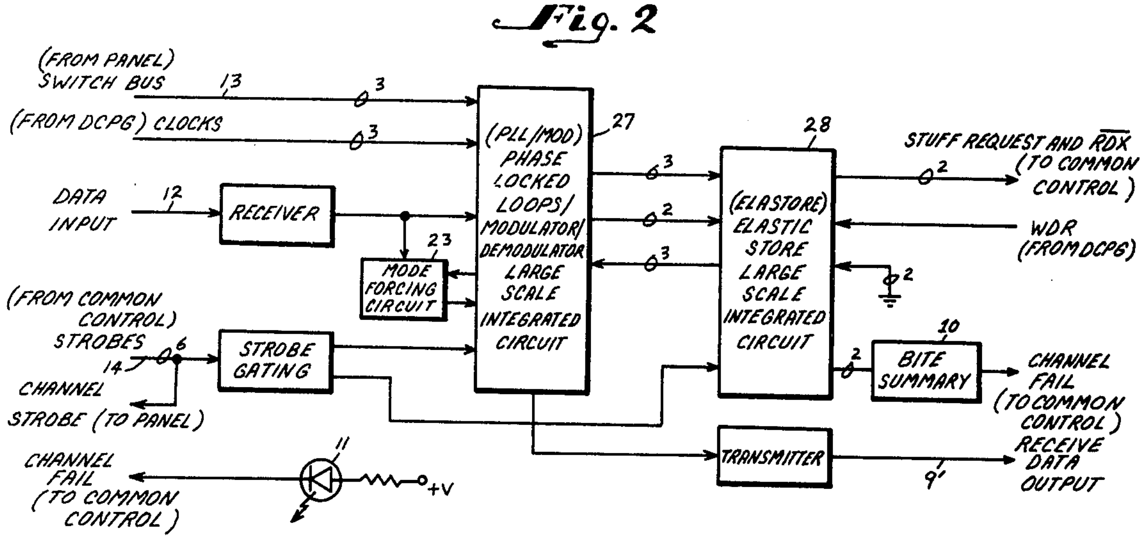
FIG. 2 is a block diagram of the digital data channel printed circuit board.
Figure 5:
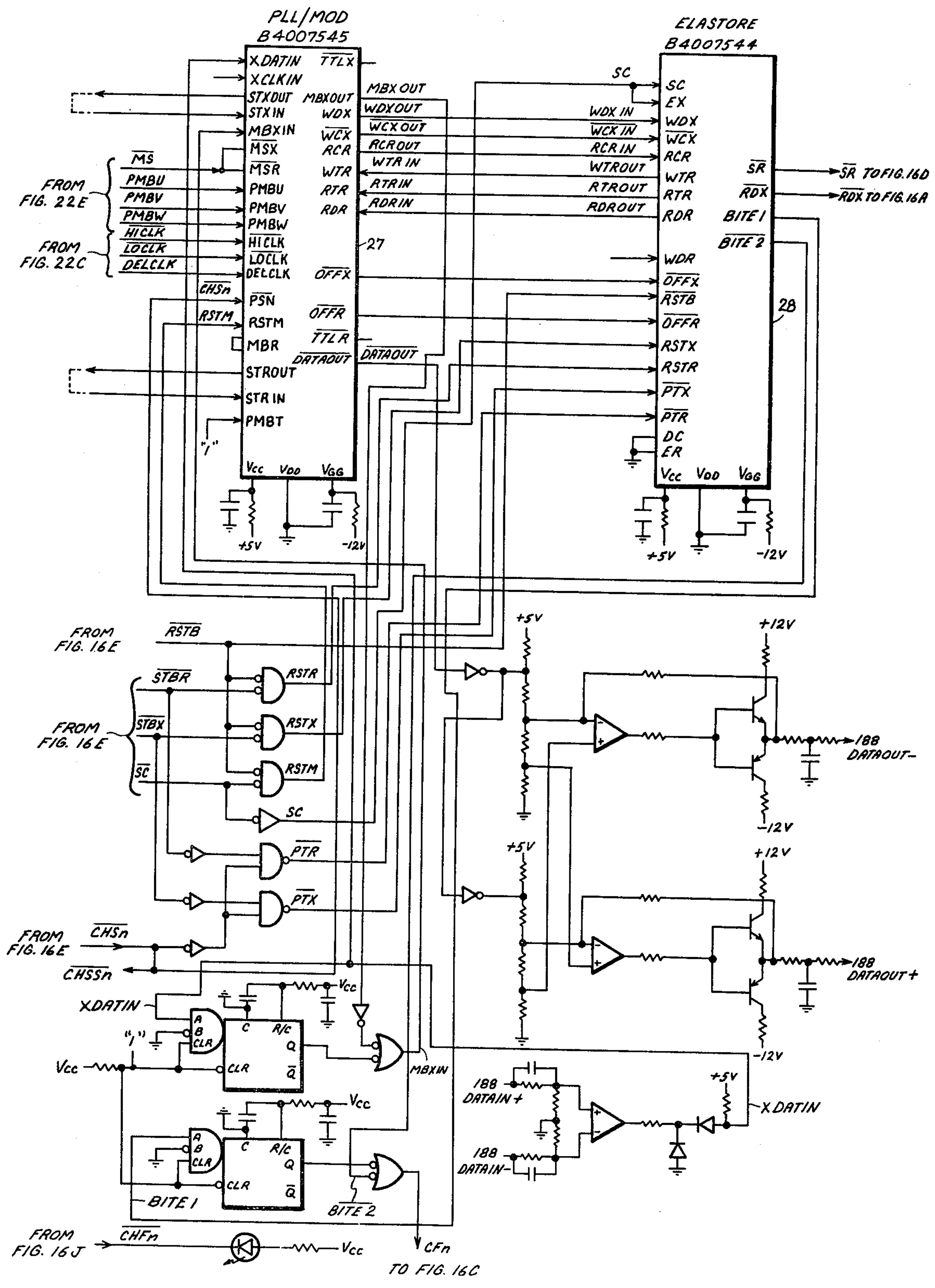
FIG. 5 is a schematic logic diagram of the digital data channel printed circuit board of FIG. 2.

Referring to FIGS. 2 and 5, there is illustrated in FIG. 2 a block diagram of, and in FIG. 5 a schematic diagram of, the digital data channel printed circuit board which will provide from 1 to 12 of the channel interfaces to the group data bus 9'. The interface shall be either conditioned diphase (CDP) at 600, 1,200, 2,400, 4,800 or 9,600 bits per second or teletype (TTY) at speeds from 45.5 to 150 baud processed at 1,200 bits per second rate. The digital printed circuit board shall accept strobe pulses from controller 5 of FIG. 1 to control the operation of the printed circuit board, including the multiplexing and demultiplexing signals. Thumbwheel switch data shall be loaded into registers to indicate CDP or TTY and bit rate under control of the strobes. The printed circuit board shall also contain BITE 10 to alert the controller 5 of a failure and a light-emitting diode 11 to allow the controller to indicate to the operator that the printed circuit board has failed. For the remainder of this specification, the "transmit" direction is from channel input 12 to group bus 9'. "Receive" direction is the opposite direction.

The digital data channel printed circuit board shall operate in one of two modes: (1) conditioned diphase (CDP) or (2) teletype (TTY).

The digital data channel printed circuit board shall receive the thumbwheel switch bus 13 from switches 2 and when a mode strobe occurs on bus 14, the printed circuit board shall store the data on bus 13 to select CDP or TTY mode and bit rate in accordance with the following Table I.

TABLE I

| Switch Bus | | | | |
|---|---|---|---|---|
| PMBU | PMBV | PMBW | Rate b/s | Mode |
| 0 | 0 | 0 | 1200 | (TTY) |
| 0 | 0 | 1 | 1200 | (CDP) |
| 0 | 1 | 0 | OFF | |
| 0 | 1 | 1 | 600 | (CDP) |
| 1 | 0 | 0 | 4800 | (CDP) |
| 1 | 0 | 1 | 2400 | (CDP) |

TABLE I-continued

| Switch Bus | | | | |
|---|---|---|---|---|
| PMBU | PMBV | PMBW | Rate b/s | Mode |
| 1 | 1 | 0 | 9600 | (CDP) |

Figure 3:
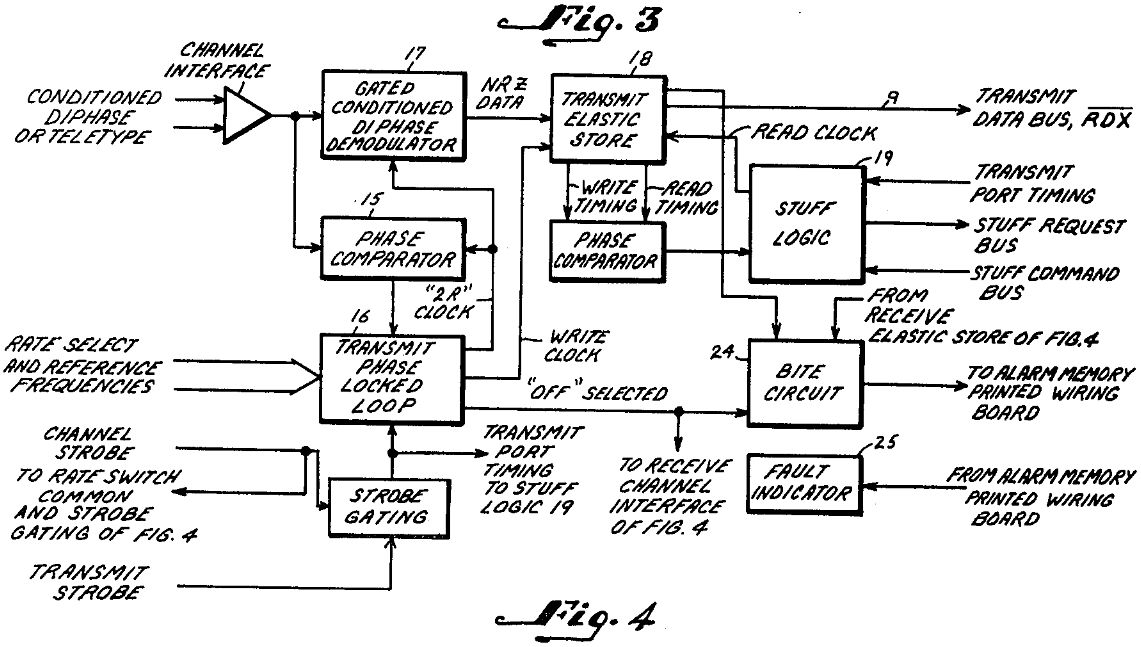
FIG. 3 is a block diagram of the transmit portion of FIG. 2.

The transmit function block diagram is shown in FIG. 3 which includes a phase comparator 15 to compare CDP data with the 2R clock (twice the bit rate) generated by the transmit phase locked loop 16. The output of phase comparator 15 shall select either a high frequency reference (307.2 KHz (kilohertz)+108.6 ppm (pulses per minute)) or a low frequency reference (307.2 KHz−108.6 ppm) according to the phase error. This selection shall be obtained by dividing the selected reference clock. The NRZ data output of the CDP demodulator 17 shall be clocked into the transmit elastic store 18 by the bit rate clock and placed on the transmit data bus 9 when strobed by the controller 5. The printed circuit board shall return a stuff request from stuff logic 19 to controller 5 when strobed if elastic store 18 is less than half full. This will result later in a stuff command from controller 5 which shall cause a data bit from elastic store 18 to be used twice.

For TTY, the printed circuit board shall operate exactly the same as for CDP except that the CDP demodulation function shall be bypassed and the bit rate clock shall 1,200 Hz (Hertz) derived by alternating between two reference clocks. This results in multiple-sampling the TTY which has a maximum baud rate of 150.

Figure 4:
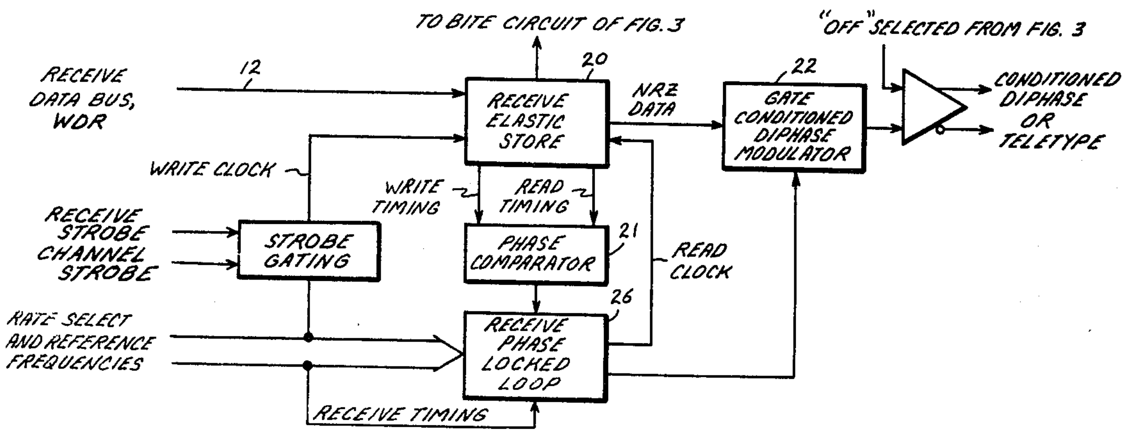
FIG. 4 is a block diagram of the receive portion of FIG. 2.

Referring to FIG. 4, the receive function of the digital data channel printed circuit board of FIG. 2 is shown in block diagram form which shall use the same reference frequencies. A strobe from controller 5 shall reset the receive elastic store 20 to the midpoint. A phase comparator 21 shall detect elastic store greater or less than half full to decide which reference frequency to use. The required bit rate clock shall be obtained by dividing down the selected reference frequency. The mode selection circuit shall connect the CDP modulator 22 into the output data path when required.

The mode forcing circuit 23 of FIG. 2 forces the mode to change from CDP to TTY in the event that activity on the data channel input stops. This shall prevent erroneous elastic store or stuff/destuff activity alarms at either side of the communication link.

The BITE circuit 24 shall monitor activity on both transmit and receive timing lines and shall detect overflow or underflow of either elastic store and shall present a summary channel fail signal to controller 5. Controller 5 will review all BITE signals and will send a ground to the appropriate circuit card to light its fault indicator 25 which may be a LED 11 such as shown in FIG. 2.

The digital signal channel printed circuit board is interchangeable with the FSK channel printed circuit board. That is, either type printed circuit board shall be capable of being used in any of the twelve channel card receptacles 1.

Table II sets forth the mnemonics for the input signals and Table III shows the mnemonics of the output signals of the equipment of the present invention.

TABLE II

| SIGNAL | Input Signals DEFINITION |
|---|---|
| 188 Data Input | Signal Pair from Channel |
| PMBU, V, W | Buffered thumbwheel switch signals from controller |
| $\overline{HICLK}$ | 307.233 KHz clock from DCPG |
| $\overline{LOCLK}$ | 307.167 KHz clock from DCPG |
| DELCLK | 66.7 Hz clock from DCPG. Negative transition occurs when HICLK and LOCLK are in phase |
| $\overline{CHSN}$ | Channel strobe from controller. Selects card to accept other strobes |
| $\overline{STBR}$ | Receive strobe. With $\overline{CHSN}$, signals card to accept data from demux data stream, WDR. With $\overline{RSTB}$, resets receive elastic store. |
| $\overline{STBX}$ | Transmit strobe. With $\overline{CHSN}$, signals card to gate data onto mux data stream, $\overline{RDX}$. With $\overline{RSTB}$, resets transmit elastic store |
| $\overline{SC}$ | Stuff command. With $\overline{CHSN}$ and $\overline{STBX}$, causes the transmit elastic store to send the same data bit twice. With $\overline{RSTB}$, clears receive and transmit phase-locked loop dividers. |
| $\overline{MS}$ | Mode Strobe. With $\overline{CHSN}$ loads the thumbwheel switch setting into Mode/Rate registers. |
| $\overline{RSTB}$ | Reset BITE. Resets elastic store overflow/underflow latch and removes card fail if caused by same. See $\overline{STBR}$, $\overline{STBX}$ and $\overline{SC}$ for other actions. |
| CHFn | Channel fail indicator drive signal |
| WDX In, WCX In, RCR In, | Signals from PLL/MOD to ELASTORE on card connector for testability. |
| WTR In, RTR In, $\overline{RDR}$ In | Signals from ELASTORE to PLL/MOD on card connector for testability. |
| $\overline{DBD}$, $\overline{FSKT}$ | Signal pins reserved for use by FSK card |
| WDR | Write Data Receive. Demux Data Stream. Input to receive elastic store when signalled by $\overline{CHSN}$ and $\overline{STBR}$. |

TABLE III

| SIGNAL | Output Signals DEFINITION |
|---|---|
| $\overline{CHSSn}$ | Channel switch strobe. Strapped to $\overline{CHSN}$, so that the controller can tell if card is removed. |
| $\overline{SR}$ | Stuff request. Reply to $\overline{CHSN}$ and $\overline{STBX}$ indicating that transmit elastic store is less than half full. |
| $\overline{RDX}$ | Read data transmit. Mux data stream. Output of transmit elastic store in reply to $\overline{CHSN}$ and $\overline{STBX}$ |
| CFn | Channel fail. Output of BITE. |
| 188 Data Output | Signal pair to channel |
| WDX Out WCX Out RCR Out | Signals from PLL/MOD to ELASTORE LSI on card connector for testability. |
| WTR Out RTR Out $\overline{RDR}$ Out | Signals from ELASTORE to PLL/MOD on card connector for testability. |
| $\overline{FSK}$ | Signal pin reserved for use by FSK card. |

The mnemonics shown in Tables II and III will be useful in understanding the operation of the schematic diagram of FIG. 5 of the digital data channel printed circuit board.

The timing employed in this portion of the multiplex-demultiplex combination is as follows. Minimum pulse width of $\overline{CHSN}$, $\overline{STBR}$, $\overline{STBX}$, $\overline{SC}$, $\overline{MS}$ and $\overline{RSTB}$ is equal to 1,000 ns (nanoseconds). Set-up time, $\overline{SC}$ to $\overline{STBX}$ equals 200 ns minimum. The hold time, $\overline{SC}$ after $\overline{STBX}$ equals 200 ns minimum. Access time, from coincidence of $\overline{CHSN}$ and $\overline{STBX}$ to data valid on $\overline{RDX}$ or $\overline{SR}$ 1,000 ns maximum.

With regard to FIGS. 3 and 4, the phase locked loop 16 and receive phase lock loop 26, modulator 22 and demodulator 17 are included on the LSI circuits 27 of FIGS. 2 and 5 and the transmit elastic store 18 and the receive elastic store 20 are contained in the integrated LSI 28 of FIGS. 2 and 5.

FSK Channel Printed Circuit Board

Figure 6:
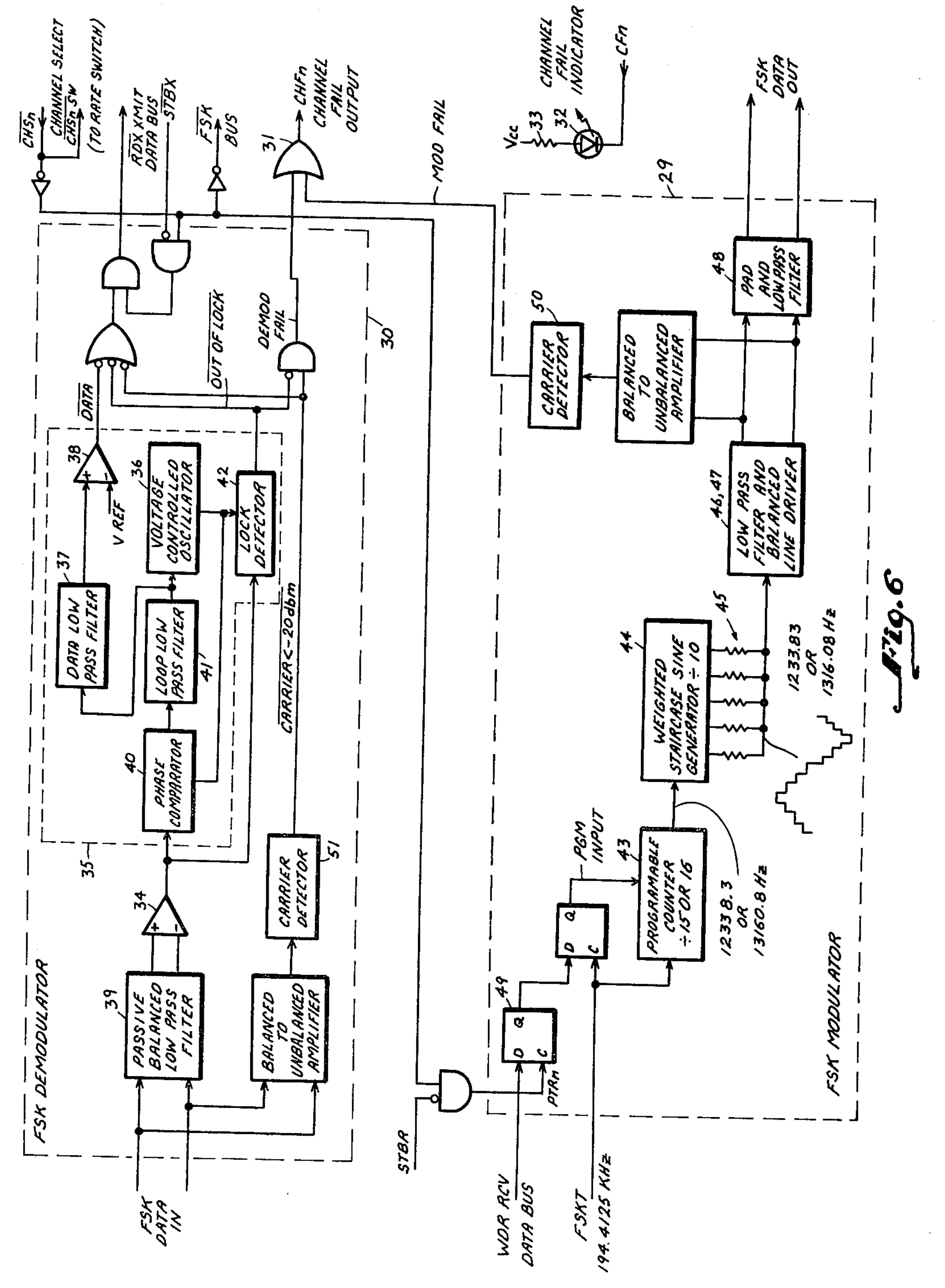
FIG. 6 is a block diagram of the FSK channel printed circuit board.
Figure 7A:
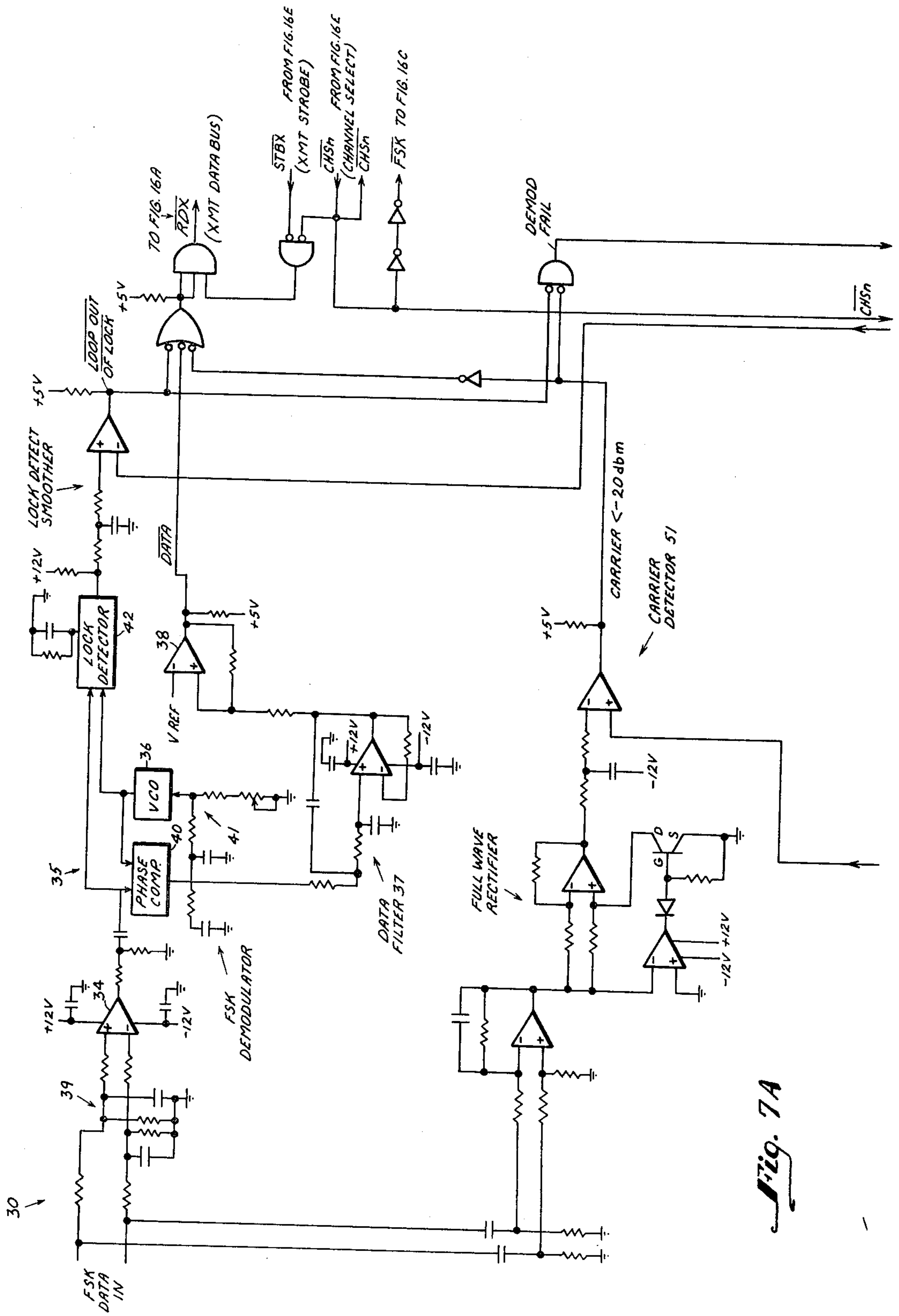
FIGS. 7A and 7B when organized as shown in FIG. 7C, is a schematic diagram of the FSK channel printed circuit board of FIG. 6.
Figures 7B, 7C:
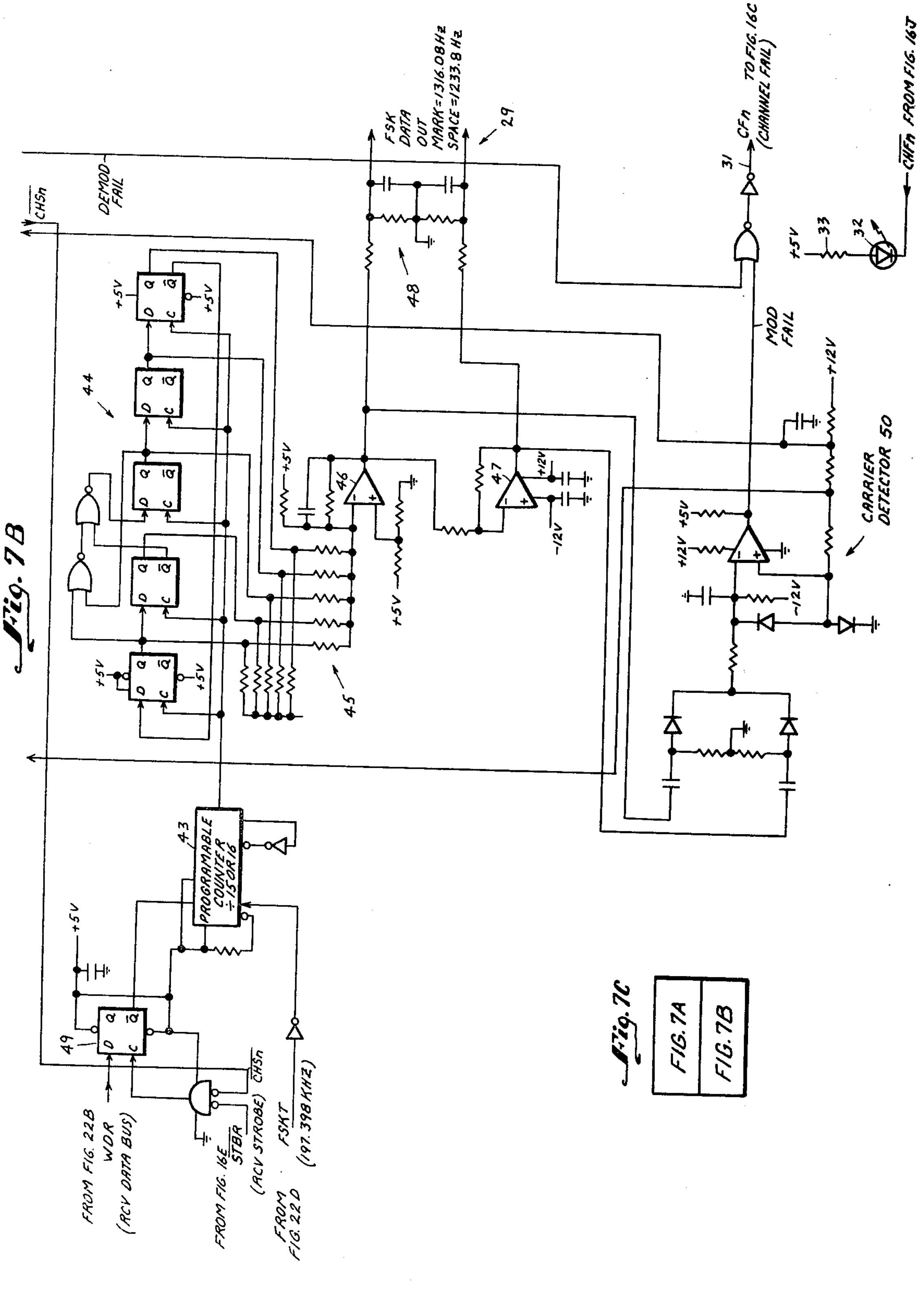

FIG. 6 and FIGS. 7A and 7B laid out as shown in FIG. 7C are the block diagram and schematic diagram of the FSK printed circuit board which may be used in any one to twelve of the channel receptacles 1. The interface is phase coherent FSK TTY signals compatible with the TH-22/TG telegraph terminal operating over up to five miles of cable. The FSK channel circuit board converts the FSK signals into an equivalent of full-baud NRZ TTY data signals which can be multiple-sampled at 1,200 Hz and multiplexed into the synchronous data stream in the same manner as CDP and TTY signals, and vice versa.

The FSK printed circuit board includes an FSK modulator 29 providing a phase coherent FSK output at 1232.5 and 1317.5 Hz nominal carrier frequencies with a ±1 dBm nominal balanced output at 600 ohms with rates from 0–150 baud and an FSK demodulator 30 that accepts a phase coherent FSK data input at the above carrier frequencies and data rate with a 600 ohm nominal balanced input.

Table IV below indicates the interface, the mnemonic symbol and the definition of the symbol or how the interface is produced for the FSK printed circuit board.

TABLE IV

| Interface | Symbol | Comment |
|---|---|---|
| Inputs: | | |
| Demodulator BITE Disable | $\overline{DBD}$ | Allows testing of sensitivity. |
| Receive Data Bus | WDR | Input to FSK modulator. Data sampled into FSK card on positive transition of $CHS_n$, when $\overline{STBR}$ is low. |
| Receive Strobe | $\overline{STBR}$ | Receive data timing bus, active low. |
| Transmit Strobe | $\overline{STBX}$ | Transmit data timing bus, active low. |
| Channel Select | $\overline{CHS_n}$ | One of twelve lines, negative going pulse within $\overline{STBR}$ and $\overline{STBX}$. |
| FSK Timing Bus | FSKT | 197.4125 KHz ± .01% |

TABLE IV-continued

| Interface | Symbol | Comment |
|---|---|---|
| | | Frequency used for FSK modulation. |
| Channel Fail Input | $\overline{CHF_n}$ | LED input requires 20 mA sink current. |
| Outputs: | | |
| Transmit Data Bus | $\overline{RDX}$ | Output of FSK demodulator. Active (on-line) when $\overline{CHS_n}$ and $\overline{STBX}$ inputs are low. |
| Channel Select to Rate Switch | $\overline{CHS_nSW}$ | Jumpered to $CHS_n$. Allows Rate Switch to return rate codes only if channel card is in place. |
| FSK Bus | $\overline{FSK}$ | Goes low when channel is polled to indicate presence of FSK card. |
| Channel Fail Output | $CF_n$ | BITE Summary of Board Faults. External equipment faults are inhibited. Active high. |

A BITE summary alarm output $CF_n$ will be provided at output 31. An LED 32 and resistor 33 in series configuration will receive an input $CHF_n$ from printed circuit board 7. The summary alarm at output 31 is a logic "1" when either or both of the following conditions occur: (1) The FSK modulator differential output drops by three dB or more from the nominal +1 dBm. Both legs of the balanced output shall be monitored so that a failure of a single leg will be detected. The monitoring points shall be ahead of the output pad so that a short at the card output will not cause an alarm (this is an external equipment failure). The carrier monitor shall be ac-coupled so that a short to the power supply bus will not prevent a fail indication. (2) The FSK demodulator phase lock loop is out of lock and the input carrier amplitude is greater than −20 dBm (input carrier is valid). The carrier amplitude shall be monitored on a differential basis, and ac-coupled as above. The monitoring circuit shall be of the averaging type so that short noise peaks will not be interpreted as a valid signal. Out of band (greater than 2 KHz) signals shall be attenuated for the same reason. The tolerance of the threshold shall be ±2 dBm or better.

Input traffic (data) to the demodulator shall not be monitored since idle conditions may be present which should not alarm. Similarly, a non-carrier input condition (less than −20 dBm) should not alarm. Loss of carrier or an out of lock condition shall present a steady mark at the demodulator output.

The BITE circuits are independent of the signal paths as far as possible. No single component failure in the BITE circuits shall cause a failure in the FSK signal path (e.g., by shorting signals).

FSK demodulator 30 combines a bipolar comparator 34 with a monolithic IC phase locked loop 35 to recover TTY from the binary FM-ed carrier. The phase locked loop demodulator 35 phase locks a self-contained voltage controlled oscillator 36 to the FSK carrier frequency, the control voltage of which is filtered and sliced to recover the data in the data filter 37 and comparator 38.

The incoming FSK signal ranging from +4 dBm to −30 dBm is coupled through surge arrestor to a low-pass filter attenuator 39. Filter 39 reduces out-of-band noise and transients before the signal is center sliced in the voltage comparator 34. A cut-off frequency of 10 KHz has been chosen to satisfy the input impedance requirements of 600 ohms +10, −20%. The surge arrester, low-pass filter attenuator and voltage comparator are all balanced to ground to obtain a common mode rejection of equal to or greater than 26 dB. Balance is 26 dB or better. Signals within the clamp limits of the surge arrester (±8 volts) are scaled by the attenuator and, thus, maintained within the operating range of the voltage comparator 34. The output of the voltage comparator 34 is also scaled and ac-coupled to interface with the phase locked loop integrated circuit 35. The voltage controlled oscillator 36 used in the emitter-coupled multivibrator uses temperature compensated current source charging and discharged paths. Square waves and 90° phased linear triangle waves are simultaneously generated in the complex voltage controlled oscillator structure. The voltage controlled oscillator square wave output drives the main loop phase detector or comparator 40 in phase with incoming carrier as maintained by the phase detector error voltage.

The loop is a second order type 1 loop as defined in Motorola Application Note AN-535. The loop bandwidth is about 350 Hz, and the damping is about 0.8. These parameters allow fast slewing capability of the loop and, therefore, minimal envelope (bias) distortion of the data up to 150 baud without making the loop overly sensitive to noise. The noise performance of an asynchronous system such as this can be improved by the use of a lower cut off receive filter (the loop bandwidth is the receive filter), but inter-symbol interference and bias distortion increase with this. Since noise performance is usually not a problem, the timing distortion then becomes the important criteria for most FSK systems. The demodulator bandwidth causes about 9 dB worse than theoretical performance as far as bit error rate vs. signal-to-noise ratio, thereby creating low bias/-timing distortion. The FSK systems having a wide noise margin justify only the simplest FSK receivers and, therefore, do not attain theoretical performance.

The second order low pass filter 37 external to the loop is used to filter the control voltage for data extraction giving good carrier rejection (the carrier amplitude is quite high and could produce jitter with only a single pole filter). The filter cutoff of 300 Hz is for carrier rejection since most of the noise filtering is done by the main loop filter 41.

The output of data filter 37 is sliced with an internally-referenced comparator 38 with some hysteresis to remove any remaining carrier components. The sliced data is gated off the printed circuit board with the channel select and transmit strobe inputs as shown. The data output ($\overline{RDX}$) is an open collector gate. Gating logic is CMOS and LSTTL.

The phase locked loop 35 contains a second phase comparator and additional circuitry which are used to provide the lock detector 42 to detect an out-of-locked condition which is used for a BITE signal. This signal is gated with a "no-carrier present" signal to inhibit a fault output when the FSK input is not present. The carrier detector 51 is a rectifying level sensor with a threshold at −20 dBm which is approximately half-way between minimum "good" signal and the no-signal noise level for a typical system. The absence of a carrier or an out-of-lock condition also inhibits data (produces a steady mark) to the demodulator output.

FSK modulator 29 combines low-power SCHOTTKY and linear integrated circuits for an optimum speed-power balance. The data switch divider approach to FSK signal generation produces carrier frequencies having stability derived from a crystal-controlled timing source external to the FSK board. Operating the switch divider at 150 to 160 times the carrier rate and allowing the divider to only change ratio synchronous with the timing input ensures phase coherency and very low jitter. Synchronous operation is accomplished by retiming the data with the 197.4125 KHz clock and wiring the programming divider to only enable the preset inputs when the "end of count" pulse occurs.

The output of the programmable divider 43 is then divided by ten in a Johnson decade counter 44. The divide ratios and clock frequency combined to produce a minimal hardware divider chain with carrier frequencies less than 0.2 Hz from the nominal 1232.5 and 1317.5 Hz.

The Johnson counter 44 produces five phases at the nominal carrier frequencies simultaneously. Resistors 45 tap the output stages to produce five weighted current sources which, along with a fixed current, are summed in an operational amplifier 46. This forms a low-cost sine wave generator with suitable output amplitude control and negligible frequency drift. The result is a sine wave at mark or space frequency. The complementary signal required to produce a balanced output is generated in an inverting-unity gain, operational amplifier 47. These two signals are resistively attenuated and further filtered in filter 48 before being transmitted to the surge arrester and output connector.

The FSK signals produced by this circuitry measure +1 dBm into 600 ohms with a high side frequency (normal marking) of 1316.08 Hz±0.1 Hz and a low side frequency (normal spacing) of 1233.83 Hz ±0.2 Hz. The carrier exhibits about 5% THD and the output level between mark and space is less than 0.5 dB. The mark-to-space and space-to-mark distortion contributed by the complete modulator-filter is less than 1%.

Preceding the FSK modulator is a latch 49 which extracts data from the WDR input port of the printed circuit board. Data is sampled on the positive transition of STBR when the channel select line is low.

The transmitted carrier is monitored with a full wave rectifying level detector 50 with a threshold at −20 dBm. The output of detector 50 is OR'ed with the demodulator BITE signal and outputted from the board as a summary alarm on output 31.

To permit compatibility between two multiplex-demultiplex combinations at opposite ends of a communication link when one of the combinations at one end of the link has an FSK data channel printed circuit board in one channel receptacle and the other of the combinations at the other end of the link has a digital data channel printed circuit board in the same numbered channel receptacle, special provision has been made to prevent an erroneous error condition alarm from occurring in the receive path of the digital data channel card.

The condition would occur if the FSK TTY data, after being converted to NRZ binary data, were to be multiple-sampled at a nominal 1,200 bit-per-second rate and transmitted over the multiplexed group stream. The receiving demultiplexer with the digital data channel card aboard processing this bit stream would, under certain conditions, experience a repetitive elastic store overflow condition, resulting in an equipment alarm.

An analysis of actual vs. nominal data rates including worst case frequency offsets, shows that the condition can be avoided by generating a "dummy stuff request" signal in the transmit side of the FSK data channel printed circuit board at the appropriate rate. The transmit side is defined as that part of the data channel printed circuit board which is processing data from the channel side input to be multiplexed into the group transmit signal.

The highest rate that the FSK printed circuit board will sample the NRZ TTY signal is: (1) 1,200 Hz +781.6 ppm+30 ppm=1,200.974 Hz where 1,200 Hz+781.6 ppm is the nominal internal rate selected for a "stuffed only" technique and the additional +30 ppm allows for maximum internal oscillator offset.

At the receiving multiplexer-demultiplexer combination with a digital channel printed circuit board tracking the TTY signal, if the internal oscillator should be at a worst-case 30 ppm below nominal frequency, then the maximum rate that the digital phase locked loop can reach is: (2) (307.233 Hz −30 ppm)÷256=1200.0929 Hz. The maximum required stuff rate then is (1)−(2)=0.8811 Hz.

A stuff rate of 0.926 Hz has been selected, and must now be analyzed for proper operation at the other worst-case combination of clock tolerances; i.e., when the multiplex-demultiplex is 30 ppm low and the receive multiplex-demultiplex combination is 30 ppm high. The 1,200 Hz sampling clock is then (3) 1200 Hz+(781.6−30) ppm=1200.902 Hz. At the receiving multiplex-demultiplex combination, the lowest rate that the digital phase locked loop is: (4) (307.167 Hz+30 ppm)÷256=1199.90709 Hz. Comparing (3) and (4), (3)−(4)=0.99491 Hz. Therefore, the selected fixed stuff rate of 0.926 Hz for the FSK data channel printed circuit board will work for all combinations of oscillator tolerances at the transmit and received ends.

Checking the overhead control channel format for stuff/destuff command capability, it is seen that the format allows for approximately three stuff commands per second for each internal 600 bps channel, or six stuffs per second for a 1,200 bps data input. A fixed stuff rate of about one per second is easily accommodated.

Common Controller

The purpose of the common controller 5 of FIG. 1 is to derive timing from the digital clock pulse generator printed circuit board 6 and provide signals to the twelve plug-in receptacles 1 for printed circuit boards which will multiplex and demultiplex the 32 KHz group transmit and receive digital traffic. The twelve plug-in receptacles 1 for printed circuit boards may have plugged therein an intermix of digital or FSK printed circuit boards. The common controller performs functions which fall into five principal categories: (1) transmit multiplexing; (2) receive demultiplexing; (3) frame synchronization; (4) automatic channel assignment and (5) BITE.

Common controller 5 is contained on two printed circuit boards; the digital controller printed circuit board 8 and the alarm-memory printed circuit board 7 of FIG. 1. FIG. 8 is a combined functional block diagram showing the relationship of the functional blocks of both printed circuit boards 7 and 8 in a manner which facilitates the description of the overall control subsystem, and FIGS. 16A–16J are a schematic diagram of the overall control subsystem, with the various figures of FIG. 16 and other figures of the drawing with which common controller 5 operates being interconnected by labels on the various input and output lines thereof. FIG. 8 indicates the functional partitioning on the two printed circuit boards.

Figure 16A:
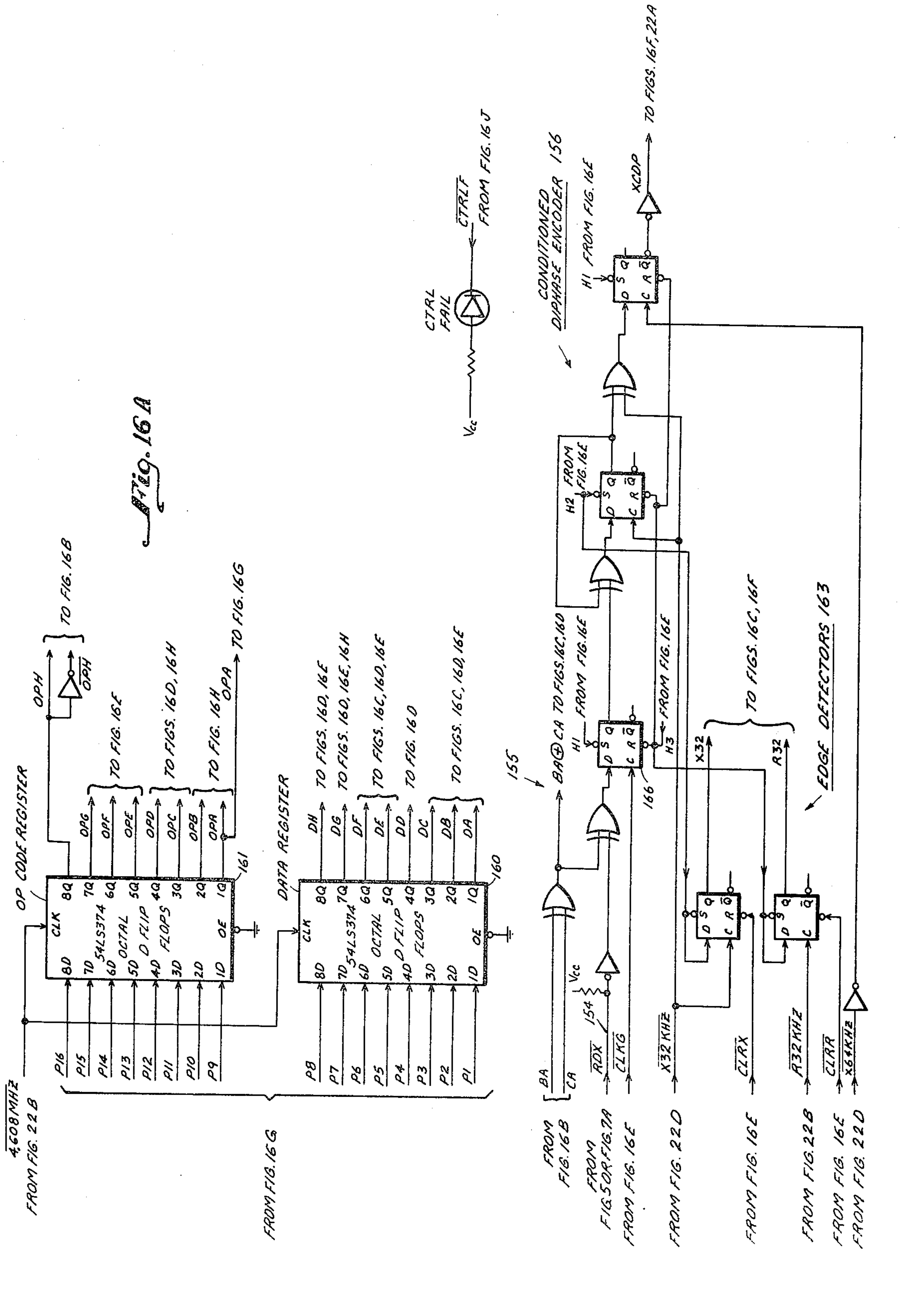
FIGS. 16A to 16J is a schematic diagram of the common controller in accordance with the principles of the present invention with the connections between FIGS. 16A to 16J and other Figs. of the drawing being labeled on the input and output of the various components thereof.

For transmit multiplexing, the common controller 5 will supply strobes from command strobe generator 152 and output distributor 153 (FIG. 16E) to the twelve channel receptacles 1 which cause one of the twelve data sources to be gated onto a single open collector group multiplex bus 154 (FIG. 16A). The group multiplex bus 154 will be accepted by the common controller where overhead bits are inserted and the combined multiplex stream from multiplexer 155 (FIG. 16A) will be conditioned diphase modulated in encoder 156 (FIG. 16A) prior to transmission.

For demultiplexing, the common controller 5 supplies strobes from generator 152 and distributor 153 to the twelve plug-in receptacles 1 which cause NRZ data of the group demultiplex bus to be distributed to the twelve printed circuit board plug-in receptacles 1.

Frame synchronization is the process required to align the local receiver timing generators to the framing format of the received demultiplexer group traffic to achieve proper data demultiplexing.

Automatic channel assignment is an algorithm employed to provide even distribution of time slot allocations or channel allocations in the format to minimize format jitter and the amount of elastic storage required at the individual channel level.

The common controller 5 is based upon a programmed digital sequencer which executes a series of instructions in accordance with specific tasks to be performed. The architecture of the digital sequencer is shown in the block diagram of FIG. 8 and FIG. 16G of the schematic diagram. The heart of the digital sequencer is the program memory 157 which supplies a series of digital codes to supporting logic elements. Memory 157 is addressed from program counter 158 (FIG. 16G) coupled to a branch control $\overline{PC}$ from branch multiplexer 159 (FIG. 16C). By interpreting the digital codes, the supporting logic elements including the data register 160 (FIG. 16A) operation code register 161 (FIG. 16A) and instruction decoder 162 (FIG. 16E) are able to execute algorithms in a manner which multiplexes and demultiplexes the 32 KHz digital group traffic. In addition to this main task, the common controller 5 performs self test (BITE) to ascertain proper functional operation.

The executive routine of the digital sequencer performs a systematic acquisition of inputs in a polling sequence to determine what task to perform at any given instant of time.

Figure 9:
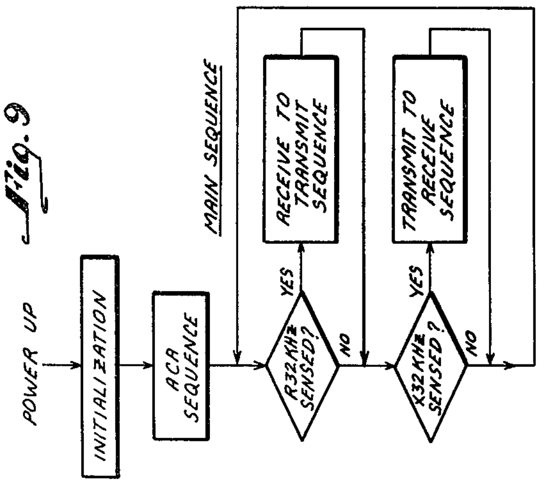
FIG. 9 is the executive routine flow chart of the common controller of FIG. 8.

The executive routine is shown in the flow chart of FIG. 9. At power turn-on the executive routine shall initialize any memory registers which require known starting states and shall then cause the automatic channel assignment (ACA) sequence to be entered. At the conclusion of the automatic channel assignment sequence, the normal polling sequence shall be entered. In the normal polling sequence, the transmit sensor and the receive sensor are tested for the logical true condition. If the transmit or receive sensor is true, the respective sequence shall be entered.

The transmit and receive sensors are keyed to edge transitions of the respective 32 KHz group clocks as detected in edge detector 163 (FIG. 16A). The digital sequencer operates on a strict polling basis where each task must be performed in series with no interrupt capability. Since the transmit and receive clocks may be asynchronous with respect to each other, transmit and receive servicing become time intensified functions, i.e., worse case cumulative processing time for both transmit and receive must be completed within one bit period at 32 KHz to avoid loss of bit integrity.

Figure 10:
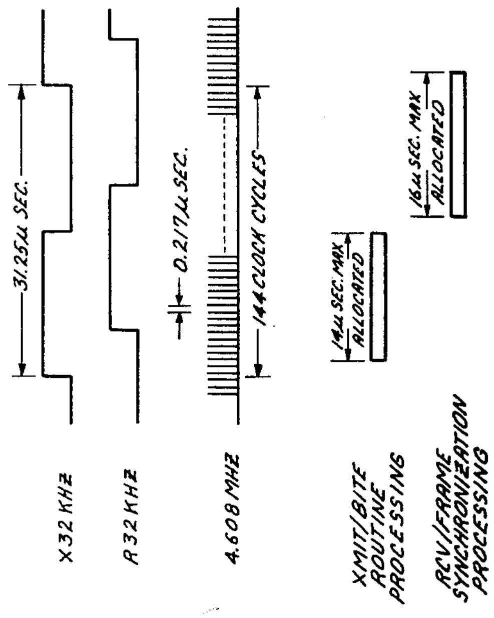
FIG. 10 is a timing diagram of the critical program timing of the common controller of FIG. 8.

The digital sequencer executes one instruction per 4.608 MHz cycle. At this rate, 144 instructions may be executed each 32 KHz bit period. This critical program timing is shown in FIG. 10. The measurement of processing time, bench marking, has shown that 144 instructions are adequate to service both transmit and receive within the real time constraints.

Further bench marking analysis has shown the fill bit processing of the transmit sequence to require the least amount of processing time, allowing the maintenance function to be added to this subroutine. The maintenance function consists of switch closure acknowledgments and responses and background BITE.

The common controller 5 shall operate in three principal modes: (1) power-up; (2) normal; and (3) automatic channel assignment.

During power-up or after any interruption of 0.5 seconds or greater, the common controller 5 shall initialize any internal registers which require known starting states or which could be adversely affected by power disruption. After initializing, the automatic channel assignment algorithm shall be performed. At the conclusion of these operations, the Normal mode shall be entered where the functions of transmit multiplexing, receive demultiplexing, frame synchronization and BITE are performed. Under Normal mode, the ALARM ACK/TEST pushbutton switch on the front panel may be operated as a lamp test and audible alarm test if no error condition exists. The common controller 5 shall sense this switch actuation and cause the audible alarm to sound and all fault lights to light without interfering with normal operation as long as the switch is being depressed.

The automatic channel assignment mode shall be entered when the operator desires to make any channel assignment changes by activation of the front panel ASSIGN pushbutton after changing channel assignments at the thumbwheel switches. The common controller 5 shall sense this actuation and cause the automatic channel assignment algorithm to be performed. At the conclusion of this operation, the common controller 5 will revert to Normal mode.

Sensing of the ALARM ACK/TEST or ASSIGN push-button actuation is accomplished in the fill code subroutine of the transmit processing sequence as previously explained.

The common controller 5 shall respond to the following front panel switch controls: (1) ASSIGN pushbutton; (2) ALARM ACK/TEST pushbutton and (3) channel programming thumbwheel switches. In addition, the common controller 5 shall drive the audible alarm, all module fault lamps and the following front panel fault indicators: (1) traffic (TRFC); (2) functional (FCTN) and (3) RATE. When the ASSIGN pushbutton is depressed, the automatic channel assignment algorithm shall be performed. When the ALARM ACK/TEST pushbutton is depressed, all lamps shall light if no fault exists. If a fault occurs, either the TRFC or FCTN lamp shall light, the audible alarm shall sound, and the lamp of the failed module shall light, if applicable. Under a fault condition, the ALARM ACK/TEST pushbutton may be used to silence the audible alarm. When the fault has been corrected, the audible alarm shall again sound and the fault indicators shall be extinguished. The audible alarm may again be silenced by operating the ALARM ACK/TEST pushbutton.

The positions dialed on the 12-channel rate programming thumbwheel switches of the rate select switches 2 of FIG. 1 on the front panel assembly 4 are encoded onto a common 3-bit bus and buffered by the digital clock pulse generator printed circuit board 6 so that the common controller 5 may read the selected data rates. The buffered output codes on bus 164 are defined in the following Table V:

TABLE V

| Dial Position | Rate (Kpbs) | PMBU | PMBV | PMBW |
|---|---|---|---|---|
| 0 | OFF | 0 | 1 | 0 |
| 1 | 1.2 (TTY) | 0 | 0 | 0 |
| 2 | 0.6 | 0 | 1 | 1 |
| 3 | 1.2 | 0 | 0 | 1 |
| 4 | 2.4 | 1 | 0 | 1 |
| 5 | 4.8 | 1 | 0 | 0 |
| 6 | 9.6 | 1 | 1 | 0 |
| 7 | OFF | 0 | 1 | 0 |

The 3-bit code is generated each time common controller 5 supplies a single-channel strobe pulse to one of the 12 thumbwheel switches. The contacts of selected thumbwheel switches cause the appropriate rate code to appear on the 3-bit bus through isolation diodes contained within the switch assembly. The isolation diodes prevent coding interference from the other unselected thumbwheel switches.

The single channel strobe pulse generated by the common controller 5 is first routed through the channel printed circuit board corresponding to the thumbwheel switch to sense the presence of that printed circuit board in the receptacles 1. If the printed circuit board is missing, an open circuit is created which causes all "ones" to appear on the U,V,W bus. The all "ones" code shall be interpreted as "OFF" by the common controller 5.

Figure 11:
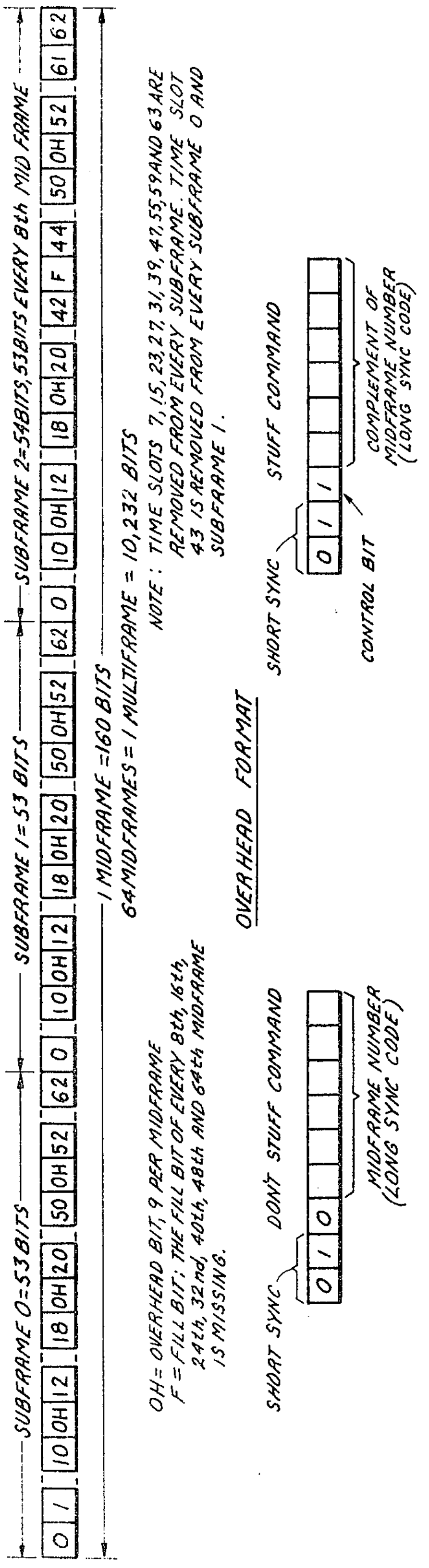
FIG. 11 illustrates the data format of the data streams in accordance with the principles of the present invention.

The framing format of the 32 KHz time division group multiplex data stream is shown in FIG. 11. In order to generate this format, common controller 5 monitors the 32 KHz group transmit clock and logically decides which channel or overhead bit is to be gated onto the multiplexed data stream for any given time slot or channel. The overhead format occupies fixed time slots in the frame format as shown in FIG. 11. However, the allocation of the time slots assigned to the twelve channels are variable according to the individual selected data rates. The method of assigning time slots is discussed hereinbelow.

Generation of the specified format implies maintenance of three binary counters: a 6-bit time slot counter (TSC), a 2-bit subframe counter (SFC) and and a 6-bit midframe counter (MFC). In general, the decoding of the TSC/SFC counters will determine which source is to be gated onto the multiplex stream for any given time slot. If channel data is to be gated, common controller 5 will generate a combination of two strobes for coupling to the channel printed circuit board receptacles 1. One strobe defines one discrete channel of the twelve possible channels. The second strobe identifies the transmit multiplex function. When an overhead bit is to be generated, the channel strobes will be automatically withheld.

Because the stuff-only technique is employed for the multiplex-demultiplex combination, common controller 5 shall also be responsible for generating stuff commands to the individual channel printed circuit board receptacles 1. The stuff command is a control sent in conjunction with the two aforementioned strobes and causes a channel to gate the same data that was generated during its prior channel time slot.

The basis for generating the stuff command is the receipt of a stuff request on the single open-collector stuff request bus 165. The stuff request is gated onto bus 165 by the individual channel printed circuit boards during one of its allocated time slots indicating a condition that the channel elastic store is less than half full.

In order for the stuff bit to be recognized at the remote multiplex-demultiplex combination at the receiving end, common controller 5 shall generate the overhead format in a specific manner. When the MFC=TSC for the requesting channel, the six bits of the MFC are sent in complement form in the overhead format (LONG SYNC CODE). In addition, the control bit of the overhead format is sent as a logical "one". These events are coordinated with the generation of the stuff command in the following midframe which causes the stuff bit to be transmitted. Destuffing at the remote end then becomes a manner of determining when the received MFC in the overhead format appears in complemented form and withholding the appropriate timing strobe during the following midframe.

In addition to the normal stuffing for the digital channels described above common controller 5 also generates a special "dummy stuffing" for each of the channels receptacles 1 which are equipped with FSK data channel printed circuit boards. A 0.926 Hz clock signal is scanned by controller 5, and for each occurrence a latch is set. Controller 5 will, during the next twelve multiframes, generate one dummy stuff command for each channel processing FSK data, after which the latch is reset until the next 0.926 Hz signal.

Figure 12:
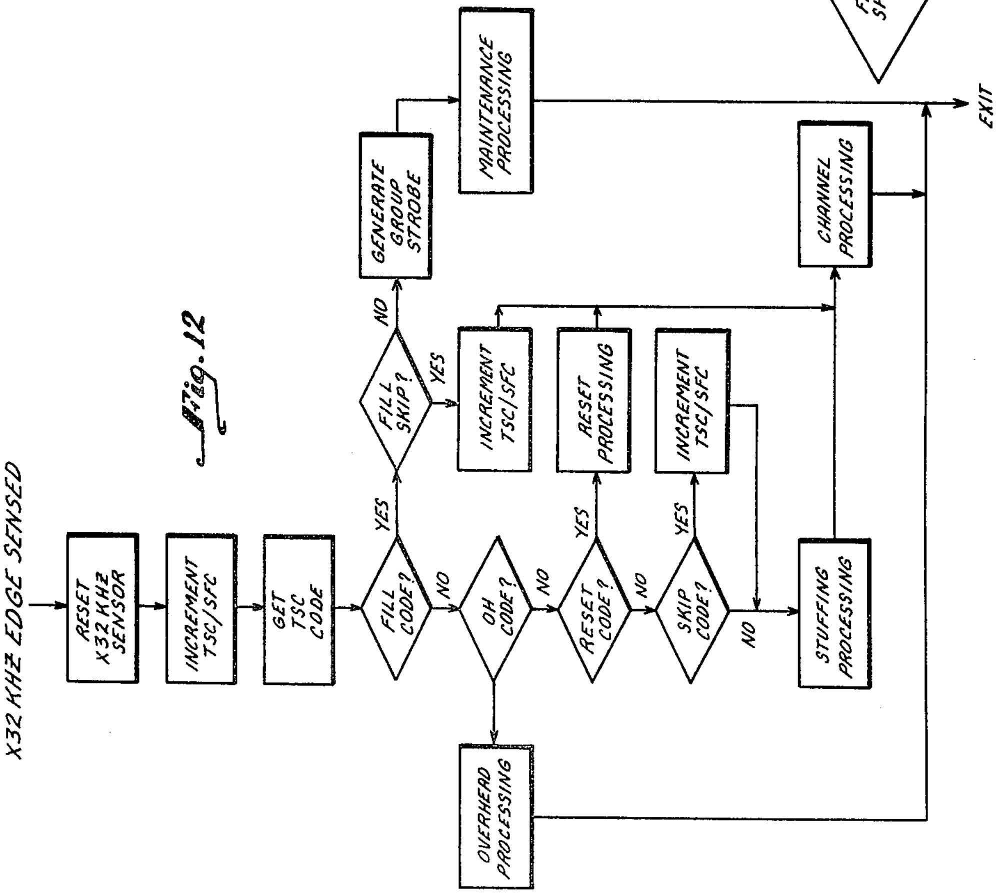
FIG. 12 is the transmit sequence flow chart of the asynchronous multiplexer-demultiplexer combination in accordance with the principles of the present application.

A flow chart of the transmit sequence is illustrated in FIG. 12. The transmit sequence is initiated once for each cycle (time slot) of the 32 KHz transmit clock. The transmit sequence is responsible for generating the group multiplexed format illustrated in FIG. 11. The purpose of the transmit sequence is to provide a group strobe which will either read channel data or read overhead data in the transmit group flip-flop 166 (FIG. 16A) and thereby generate the group data stream.

Figure 15:
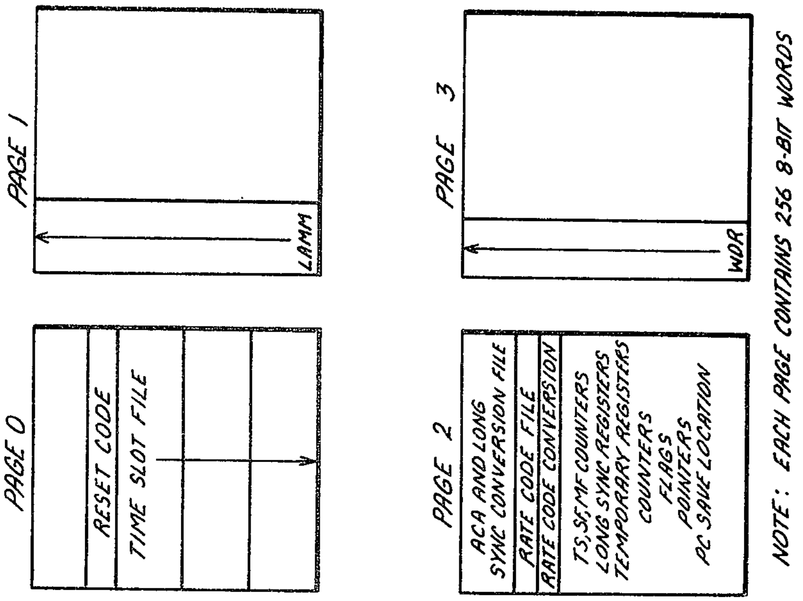
FIG. 15 is a data memory map of the common controller in accordance with the principles of the present invention.

As mentioned above, the generation of the specified format implies maintenance of three binary counters: the 6-bit time slot counter (TSC), the 2-bit subframe counter (SFC) and the 6-bit midframe counter (MFC). Whenever the automatic channel assignment algorithm is performed, a 4-bit time slot (TS) code is deposited into 192 consecutive memory locations (TIME SLOT FILE) of data memory 200 as shown in FIG. 15. The TSC/SFC refers to these 192 locations in sequence as each edge of the 32 KHz transmit clock is set. The TSC/SFC is maintained by the transmit sequence in a single memory location of data memory 200 and the MFC is maintained in a second location of data memory 200. After the 32 KHz sensor is reset by the transmit sequence, the TSC/SFC is incremented and the new TSC/SFC number is used to access the TIME SLOT FILE. The TS code thereby obtained directs the transmit sequence to a specific operation prior to generating the group strobe. The TS coding is defined in TABLE VI.

TABLE VI

| TS CODE | | | | |
|---|---|---|---|---|
| MSB | | | LSB | DEFINITION |
| 0 | 0 | 0 | 0 | RESET CODE |
| 0 | 0 | 0 | 1 | CHANNEL 1 |
| 0 | 0 | 1 | 0 | ↓ |
| 0 | 0 | 1 | 1 | ↓ |
| 0 | 1 | 0 | 0 | ↓ |
| 0 | 1 | 0 | 1 | Through |
| 0 | 1 | 1 | 0 | ↓ |
| 0 | 1 | 1 | 1 | ↓ |
| 1 | 0 | 0 | 0 | ↓ |
| 1 | 0 | 0 | 1 | ↓ |
| 1 | 0 | 1 | 0 | ↓ |
| 1 | 0 | 1 | 1 | ↓ |
| 1 | 1 | 0 | 0 | CHANNEL 12 |
| 1 | 1 | 0 | 1 | SKIP |
| 1 | 1 | 1 | 0 | FILL |
| 1 | 1 | 1 | 1 | OVERHEAD (OH) |

The TIME SLOT FILE is intended to include three subframes of TS codes (one midframe). Each subframe accounts for 64 locations of TS codes; three subframes account for 192 locations. Since the two bits of the SFC represent four possible subframes, the Reset code is inserted into the 192nd location which the transmit sequence must acknowledge by resetting the TSC/SFC. Also, since only 53 to 54 time slots exist per subframe, certain locations contain the skip code which the transmit sequence acknowledges by incrementing the TSC/SFC causing these time slots to be removed.

The third subframe contains a fill bit accounting for the 54th time slot. This bit is detected as the fill code and is deleted by the transmit sequence every 8th midframe (fill skip). Maintenance processing, as previously explained, is keyed to the fill bit and occurs every midframe, or 160 bits at 32 KHz.

The overhead code signals the transmit sequence that one bit of the overhead format is to be generated as specified in FIG. 11.

The channel codes define one of the twelve channels which the transmit sequence selects for transmission by supplying the transmit strobe STBX. As the STBX strobe is being supplied, the transmit sequence follows with the group strobe which clocks the transmit data into the group transmit flip-flop 166 (FIG. 16A).

Receive demultiplexing is the reverse process of transmit multiplexing and requires that the destination of data from the 32 KHz group demultiplex data stream be determined for each time slot. In order to meet this requirement, common controller 5 shall perform frame synchronization, a process which aligns the local timing counters (TSC, SFC, and MFC) according to the receive overhead format embedded within the demultiplex data stream. Once frame synchronization has been achieved, common controller 5 shall decode the TSC/SFC for each period of the 32 KHz group receive clock and shall provide a combination of two strobes of the receptacles 1 for the channel printed circuit boards. The first strobe defines one discrete channel of the twelve possible channels. The second strobe identifies the receive function. When an overhead time occurs, the channel strobes are automatically withheld.

Destuffing is also required as discussed in the transmit multiplexing description. The destuff operation is accomplished by withholding the aforementioned two strobes, which effectively causes the stuffed bit to be ignored by the appropriate channel printed circuit board. Destuffing occurs during the midframe following that in which the six bits of the MFC of the overhead format (LONG SYNC CODE) are received in complement form.

Figure 13:
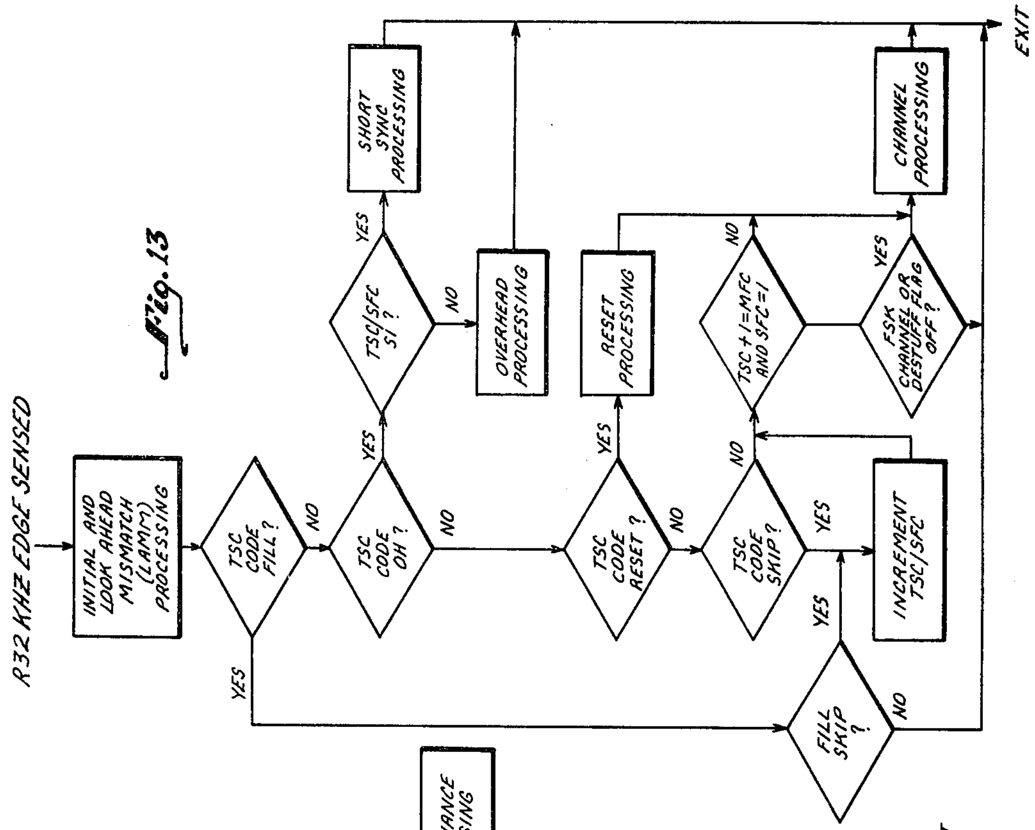
FIG. 13 is a receive sequence flow chart of the asynchronous multiplexer-demultiplexer combination in accordance with the principles of the present invention.

FIG. 13 is a flow chart of the receive sequence. The receive sequence is initiated once for each cycle (time slot) of the 32 KHz receive clock. The receive sequence is similar to the transmit sequence and is responsible for demultiplexing the group format as illustrated in FIG. 11. The purpose of the receive sequence is to provide channel strobes to the individual channel printed circuit board receptacles 1 so that the group data may be read by the appropriate channel for each data time slot.

Integral with the receive function is frame synchronization, a process which aligns the local framing format to the format generated at the remote transmitting multiplex-demultiplex combination.

Frame synchronization is achieved by searching the received group format for the short sync code. The frame sync strategy is discussed in the abovecited U.S. Patent and an implementation thereof is disclosed in U.S. Pat. No. 3,629,712 issued to J. M. Clark, whose disclosure is incorporated herein by reference and to U.S. Pat. No. 3,798,378 issued to M. A. Epstein, whose disclosure is incorporated herein by reference. The receive sequence accesses the same TIME SLOT FILE that was described for the transmit sequence. The receive sequence maintains separate TSC/SFC and MFC locations as each edge of the receive 32 KHz clock is sensed. Prior to frame synchronization, the TSC/SFC and MFC have arbitrary values. During frame search, the values of the TSC/SFC and MFC are adjusted until their relationship agrees with the receive format to a high degree of confidence.

The receive sequence maintains the following registers and counters in data memory 200 to implement the frame search algorithm as shown in FIG. 15:

WDR-Write Data Received. One bit register in which the group receive data is stored, one bit at a time, in 256 continuous locations.

OH REG-Overhead Register. A six bit register which contains the six bits of the MFC as they are received from the group data.

LAMM-Look Ahead Mismatch. A 256 bit register which maintains a record of the sync bit comparisons, S0 and S1 for the successive positions following the presently assumed alignment of the S1 sync bit in the received group format.

LSMM-Long Sync Mismatch. A control flag to indicate a mismatch between the six bits of the maintained MFC with the six bits of the received long sync code.

CONFIDENCE COUNTER. A four bit counter which is incremented once each S1 time when the TSC/SFC and MFC positions align with the received overhead format. When alignment is contraindicated, the CONFIDENCE COUNTER is decremented. The CONFIDENCE COUNTER is never incremented beyond all ones or decremented below all zeros. MAJORITY VOTE. A three bit counter which determines if four or more bits of the received overhead format agrees with the control time (CT) bit and the six bits of the MFC code.

Once frame synchronization has been achieved, the receive sequence causes the receive strobe, STBR, to be generated for each data time slot. The STBR strobe is used in conjunction with the channel strobe, which is a result of the TS code to cause one of the twelve channels to accept the appropriate data bit from the received group data stream.

Frame synchronization is the process of aligning the local framing generation to the data format generated at the remote multiplex-demultiplex combination and shall be accomplished in the controller 5 by searching for the SHORT SYNC CODE. As shown in FIG. 11, the SHORT SYNC CODE includes a "zero" and "one" in time slots 11 and 19, respectively, of subframe zero. The time slot 51 is the stuffed-destuffed control bit. When this bit is "zero", no stuffing is indicated and the true form of the MFC is present as the LONG SYNC CODE in bits 11, 19 and 51 of subframes 1 and 2. When stuffing is indicated by a binary "one" in the stuffed/destuffed control bit, the midframe number is presented in complemented form in the LONG SYNC CODE. The six bit midframe number proceeds in straight binary fashion and this fact shall be used to synchronize the local MFC.

Frame sync acquisition and bit count integrity shall be accomplished within 300 milliseconds 90% of the time following the application of the signal to the demultiplex input. The definitions and criteria for frame synchronization and bit count integrity can be found in the above-cited U.S. Patents of J. M. Clark and M. A. Epstein.

The automatic channel assignment technique is a method of allocating time slots for a time division multiplexer to evenly distribute sampling of any particular channel in the framing format. The benefit of this distribution is that format jitter and elastic storage is minimized at the channel level.

The automatic channel assignment algorithm as it applies to common controller 5 shall be performed in the following manner under power-up or an operator initiated rate change. The time slot coding is shown in Table VII below:

TABLE VII

| TIME SLOT | | | | | | | | |
|---|---|---|---|---|---|---|---|---|
| L58 | | | M58 | | | | | |
| POSITION NUMBER | | | | | | | | |
| M58 | | | L58 | | | | | |
| A | B | C | D | E | F | POSITION NUMBER | TIME SLOT NUMBER | Note |
| 0 | 0 | 0 | 0 | 0 | 0 | 0 | 0 | |
| 0 | 0 | 0 | 0 | 0 | 1 | 1 | 32 | |
| 0 | 0 | 0 | 0 | 1 | 0 | 2 | 16 | |
| 0 | 0 | 0 | 0 | 1 | 1 | 3 | 48 | |
| 0 | 0 | 0 | 1 | 0 | 0 | 4 | 8 | |
| 0 | 0 | 0 | 1 | 0 | 1 | 5 | 40 | |
| 0 | 0 | 0 | 1 | 1 | 0 | 6 | 24 | |
| 0 | 0 | 0 | 1 | 1 | 1 | 7 | 56 | |
| 0 | 0 | 1 | 0 | 0 | 0 | 8 | 4 | |
| 0 | 0 | 1 | 0 | 0 | 1 | 9 | 36 | |
| 0 | 0 | 1 | 0 | 1 | 0 | 10 | 20 | |
| 0 | 0 | 1 | 0 | 1 | 1 | 11 | 52 | |
| 0 | 0 | 1 | 1 | 0 | 0 | 12 | 17 | |
| 0 | 0 | 1 | 1 | 0 | 1 | 13 | 44 | |
| 0 | 0 | 1 | 1 | 1 | 0 | 14 | 28 | |
| 0 | 0 | 1 | 1 | 1 | 1 | 15 | 60 | |
| 0 | 1 | 0 | 0 | 0 | 0 | 16 | 2 | |
| 0 | 1 | 0 | 0 | 0 | 1 | 17 | 34 | |
| 0 | 1 | 0 | 0 | 1 | 0 | 18 | 18 | |
| 0 | 1 | 0 | 0 | 1 | 1 | 19 | 50 | |
| 0 | 1 | 0 | 1 | 0 | 0 | 20 | 10 | |
| 0 | 1 | 0 | 1 | 0 | 1 | 21 | 42 | |
| 0 | 1 | 0 | 1 | 1 | 0 | 22 | 26 | |
| 0 | 1 | 0 | 1 | 1 | 1 | 23 | 58 | |
| 0 | 1 | 1 | 0 | 0 | 0 | 24 | 8 | |
| 0 | 1 | 1 | 0 | 0 | 1 | 25 | 38 | |
| 0 | 1 | 1 | 0 | 1 | 0 | 26 | 22 | |
| 0 | 1 | 1 | 0 | 1 | 1 | 27 | 54 | AVAILABLE |
| 0 | 1 | 1 | 1 | 0 | 0 | 28 | 14 | FOR |
| 0 | 1 | 1 | 1 | 0 | 1 | 29 | 46 | DATA |
| 0 | 1 | 1 | 1 | 1 | 0 | 30 | 30 | |
| 0 | 1 | 1 | 1 | 1 | 1 | 31 | 62 | |
| 1 | 0 | 0 | 0 | 0 | 0 | 32 | 1 | |
| 1 | 0 | 0 | 0 | 0 | 1 | 33 | 33 | |
| 1 | 0 | 0 | 0 | 1 | 0 | 34 | 17 | |
| 1 | 0 | 0 | 0 | 1 | 1 | 35 | 49 | |
| 1 | 0 | 0 | 1 | 0 | 0 | 36 | 9 | |
| 1 | 0 | 0 | 1 | 0 | 1 | 37 | 41 | |
| 1 | 0 | 0 | 1 | 1 | 0 | 38 | 25 | |

TABLE VII-continued

| | | | | | | | | | |
|---|---|---|---|---|---|---|---|---|---|
| 1 | 0 | 0 | 1 | 1 | 1 | 39 | 57 | | |
| 1 | 0 | 1 | 0 | 0 | 0 | 40 | 5 | | |
| 1 | 0 | 1 | 0 | 0 | 1 | 41 | 37 | | |
| 1 | 0 | 1 | 0 | 1 | 0 | 42 | 21 | | |
| 1 | 0 | 1 | 0 | 1 | 1 | 43 | 53 | | |
| 1 | 0 | 1 | 1 | 0 | 0 | 44 | 13 | | |
| 1 | 0 | 1 | 1 | 0 | 1 | 45 | 45 | | |
| 1 | 0 | 1 | 1 | 1 | 0 | 46 | 29 | | |
| 1 | 0 | 1 | 1 | 1 | 1 | 47 | 61 | | |
| 1 | 1 | 0 | 0 | 0 | 0 | 48 | 3 | | |
| 1 | 1 | 0 | 0 | 0 | 1 | 49 | 35 | | |
| 1 | 1 | 0 | 0 | 1 | 0 | 50 | 19 | | |
| 1 | 1 | 0 | 0 | 1 | 1 | 51 | 51 | OVERHEAD (3) | |
| 1 | 1 | 0 | 1 | 0 | 0 | 52 | 11 | | |
| 1 | 1 | 0 | 1 | 0 | 1 | 53 | 43 | SPARE - 1/3 | NOT USED - 2/3 |
| 1 | 1 | 0 | 1 | 1 | 0 | 54 | 27 | | |
| 1 | 1 | 0 | 1 | 1 | 1 | 55 | 59 | | |
| 1 | 1 | 1 | 0 | 0 | 0 | 56 | 7 | | |
| 1 | 1 | 1 | 0 | 0 | 1 | 57 | 39 | | |
| 1 | 1 | 1 | 0 | 1 | 0 | 58 | 23 | NOT | |
| 1 | 1 | 1 | 0 | 1 | 1 | 59 | 55 | USED (10) | |
| 1 | 1 | 1 | 1 | 0 | 0 | 60 | 15 | | |
| 1 | 1 | 1 | 1 | 0 | 1 | 61 | 47 | | |
| 1 | 1 | 1 | 1 | 1 | 0 | 62 | 31 | | |
| 1 | 1 | 1 | 1 | 1 | 1 | 63 | 63 | | |

1. The three-bit rate code for each channel is acquired by strobing each of the 12 thumbwheel switches in rate selector switch 2, one at a time.

2. The channels are then systematically sorted and assigned according to data rate, with the highest rates being assigned first. In the case of the 9.6 kilobit per second channel, the 16 time slot numbers are obtained by reversing the bit significance of binary numbers 0 through 15. From Table VII it will be seen that the appropriate time slot numbers will be: zero, 32, 16, 48, 8, 40, 24, 56, 4, 36, 20, 52, 12, 44, 28 and 60. If the next channel was also a 9.6 kilobit per second rate, the channel numbers 16 through 31 would be reversed. If the next channel were a 4.8 kilobit per second rate, eight positions would be required and the binary numbers 16 through 23 would have been reversed. This process is continued until the time slots for all twelve channels have been assigned.

3. From Table VII, it will be seen that a maximum of 50 positions are available for channel time slot allocations. If the accumulated channel rates cause assignments in excess of the 50 positions, the rate budget of 30 kilobits per second has been exceeded and common controller 5 shall alert the operator by lighting the RATE lamp.

Figure 14:
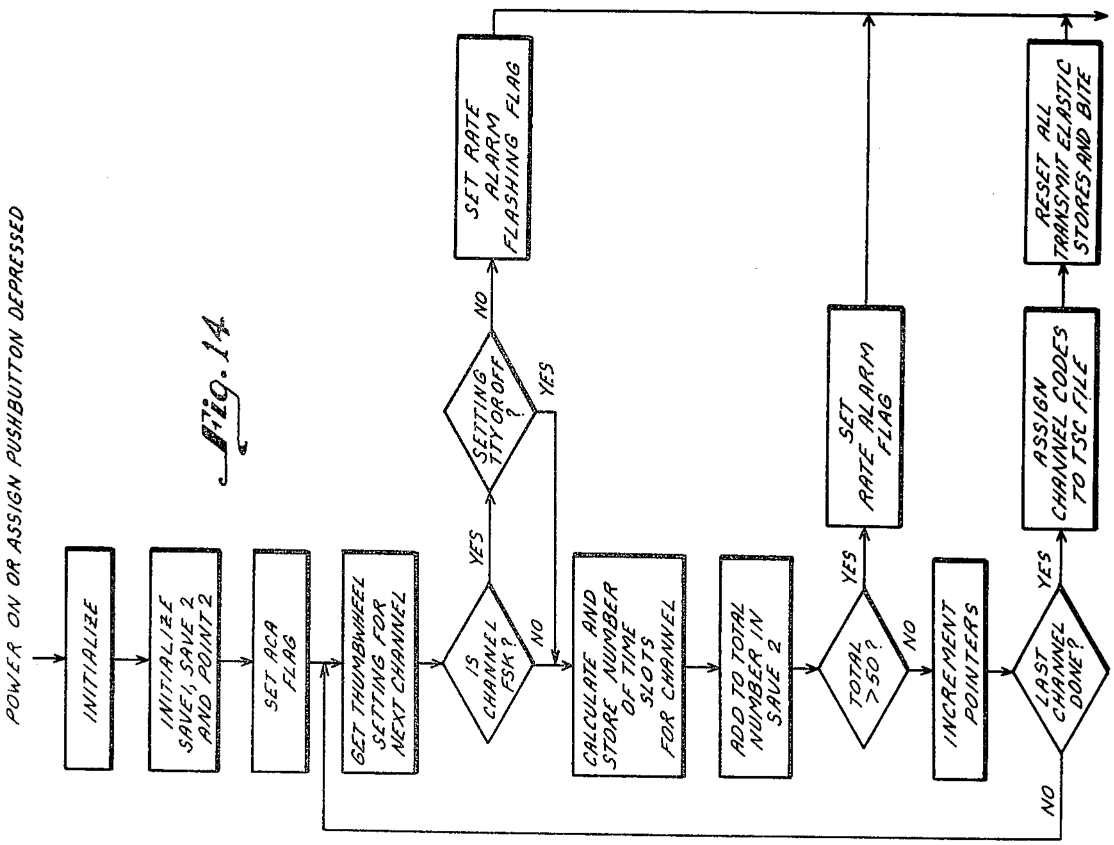
FIG. 14 is the automatic channel assignment sequence flow chart of the asynchronous multiplexer-demultiplexer combination in accordance with the principles of the present invention.

FIG. 14 illustrates a flow chart of the automatic channel assignment sequence. The automatic channel sequence is entered either upon activating the programming pushbutton or during power turn-on.

Figure 16B:
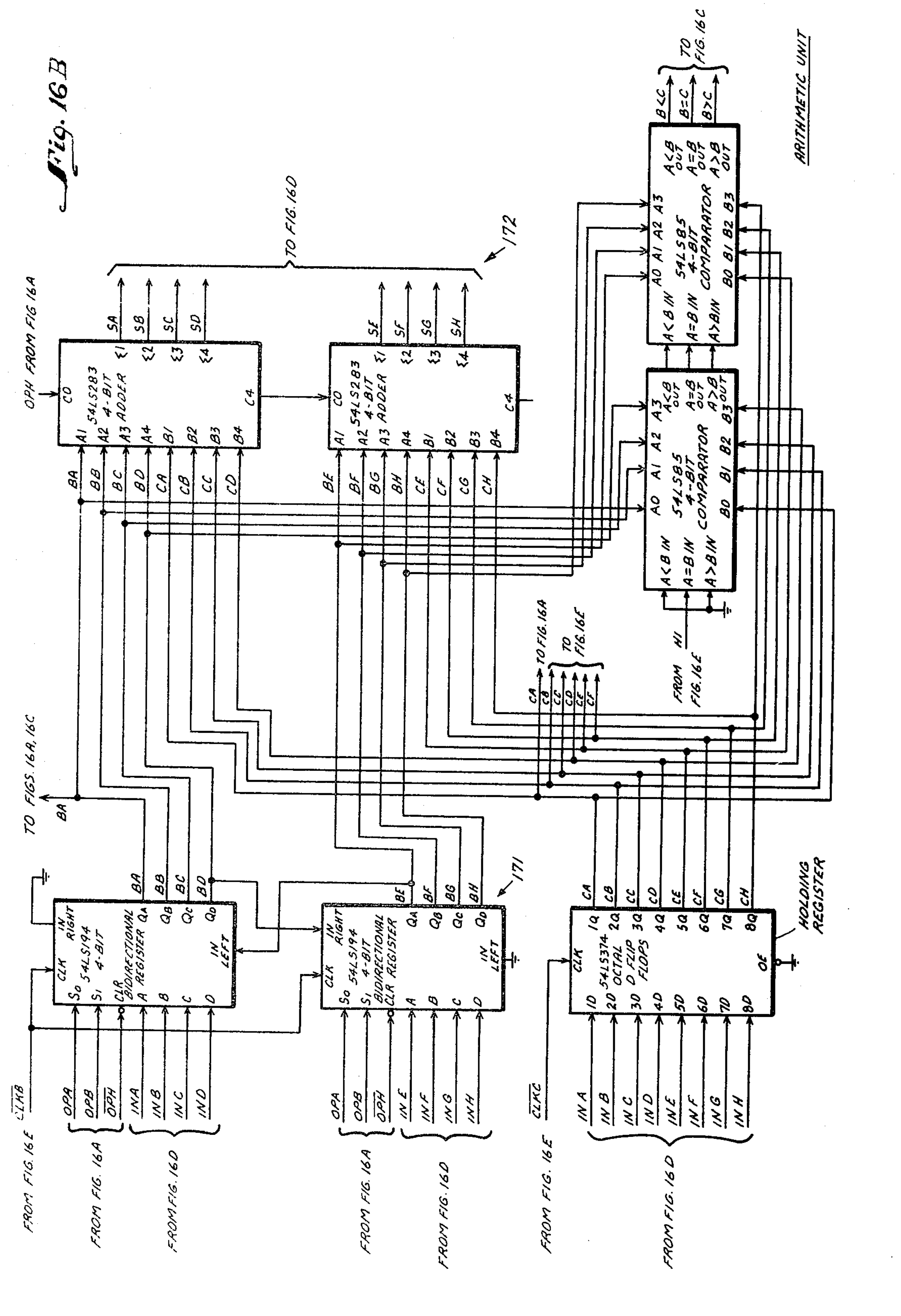
Figure 16C:
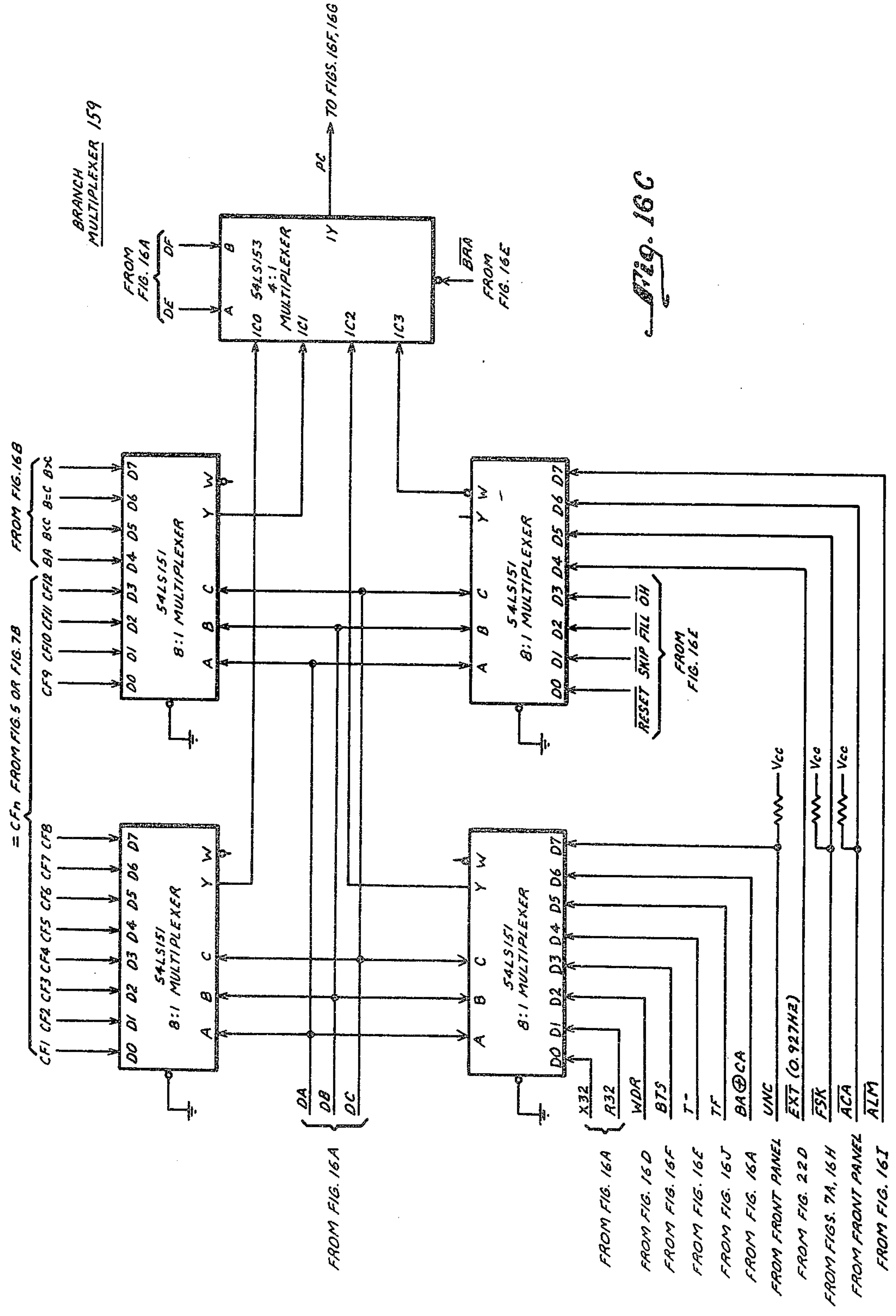
Figure 16D:
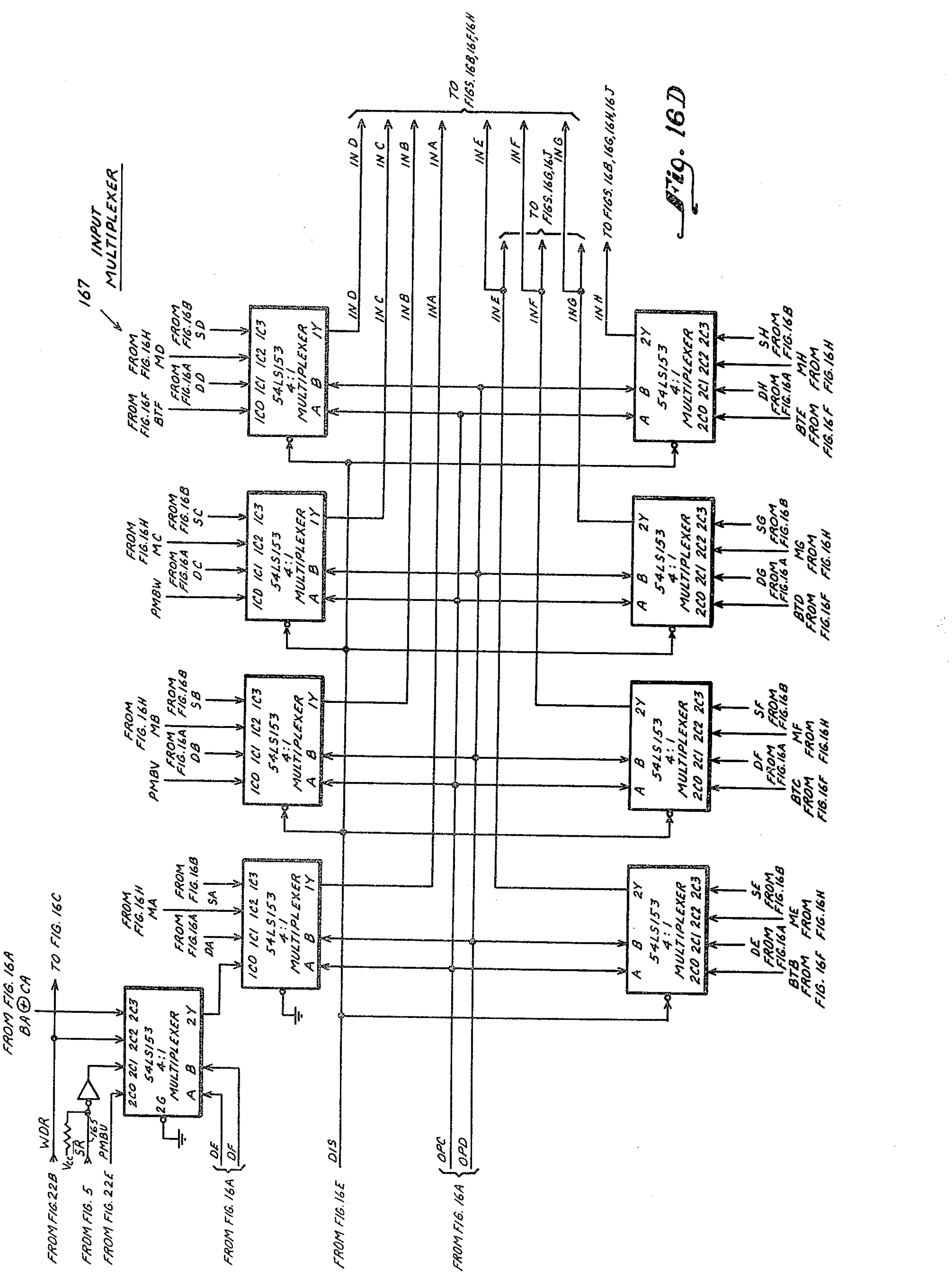
Figure 16E:
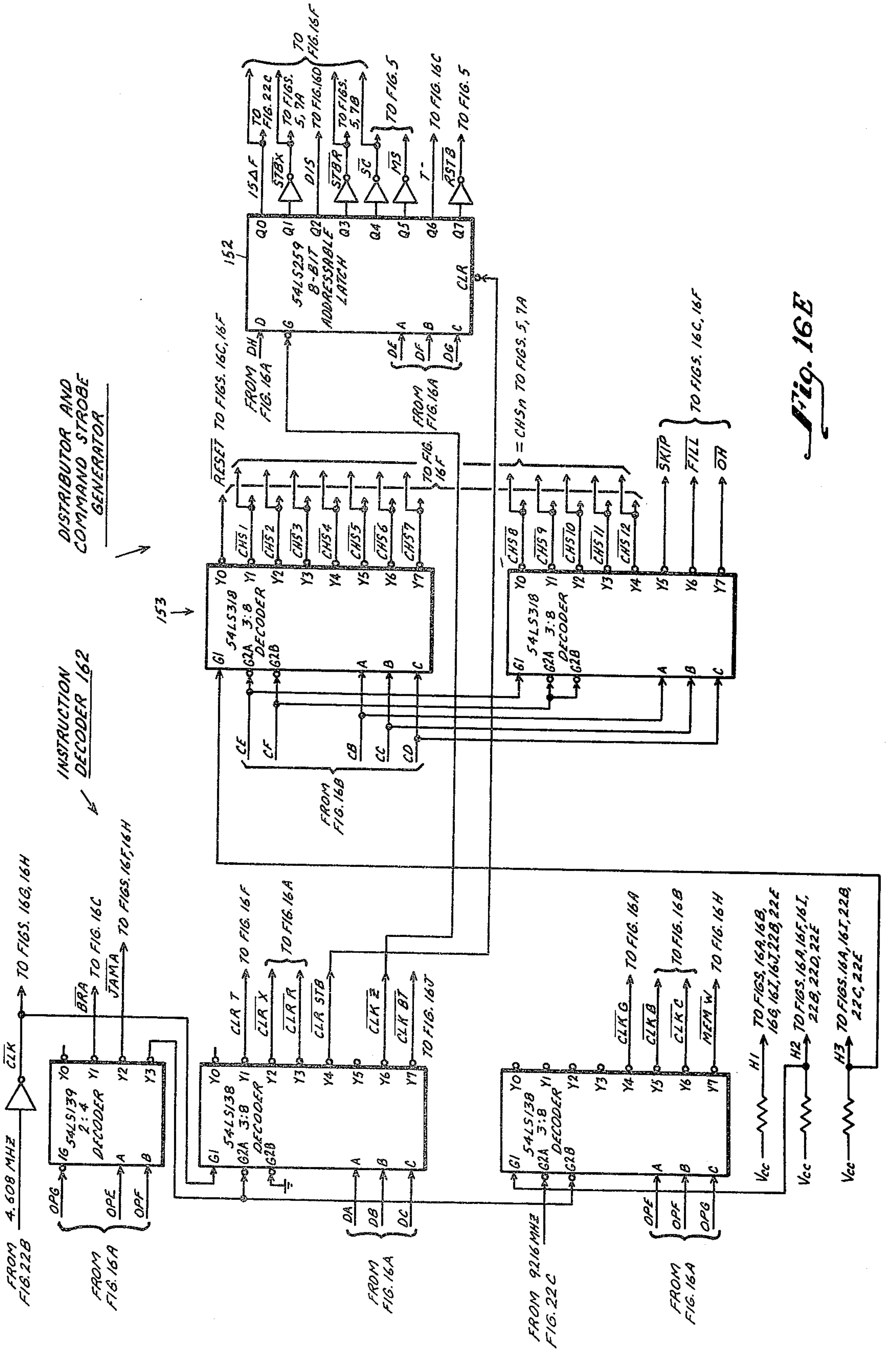
Figure 16F:
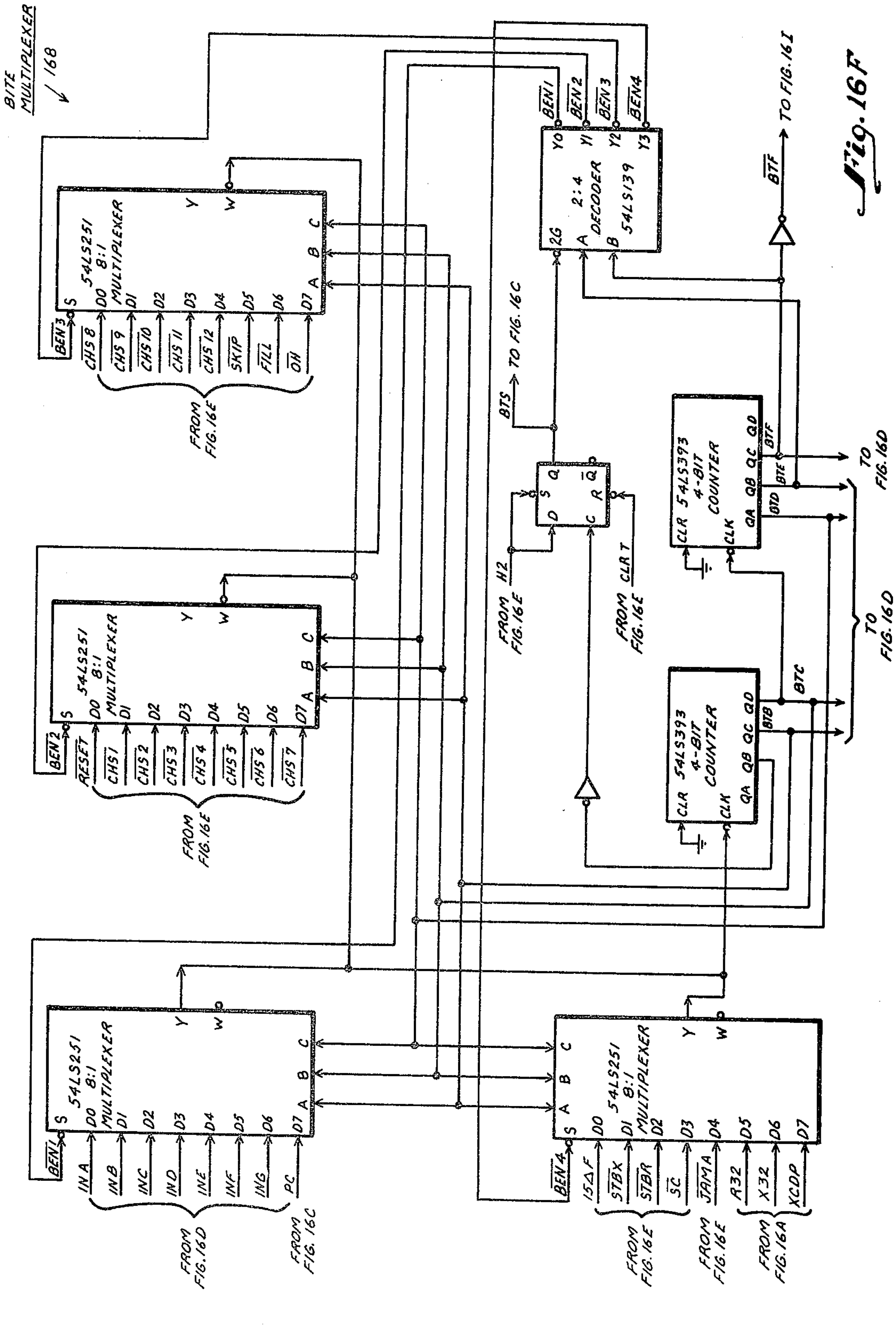
Figure 16G:
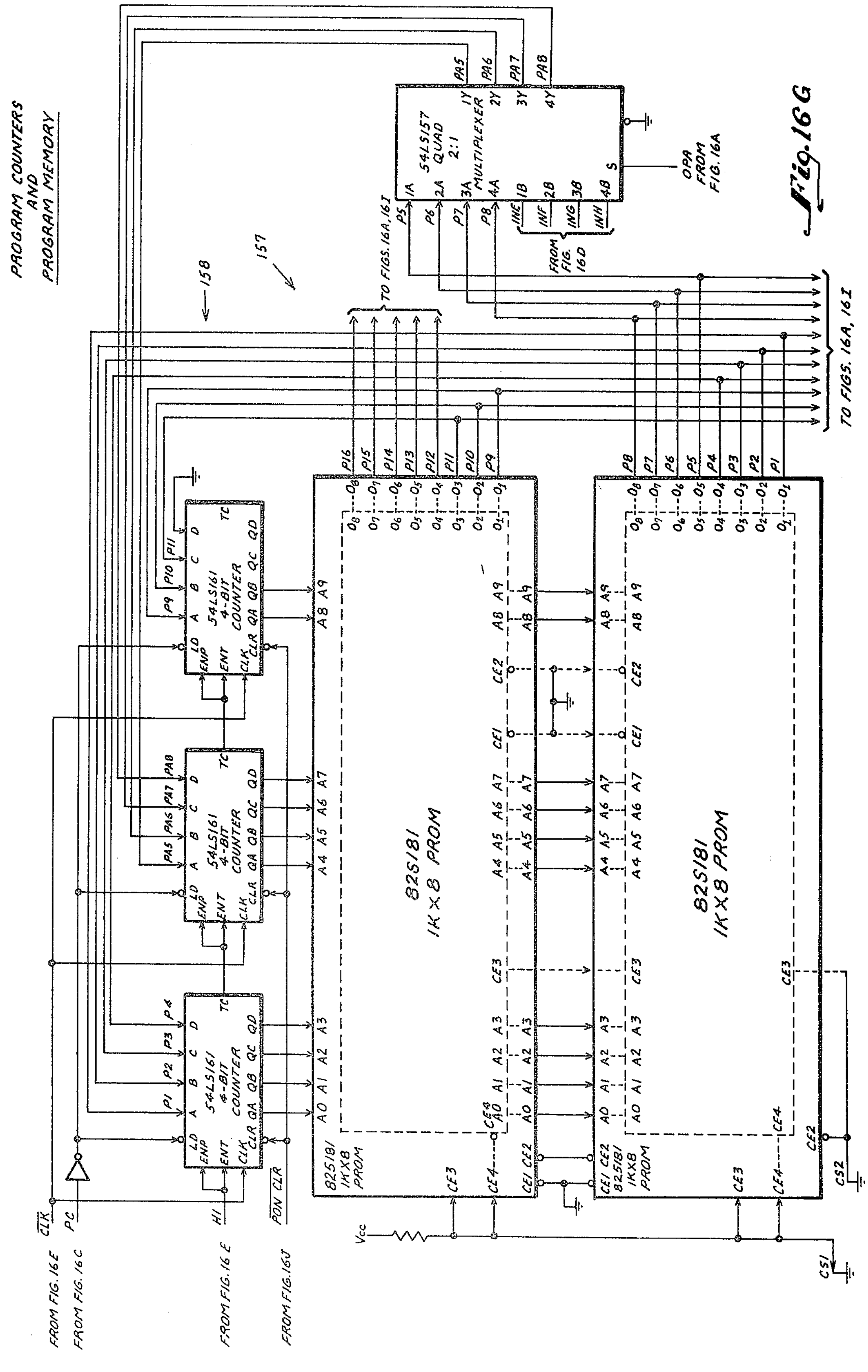
Figure 16H:
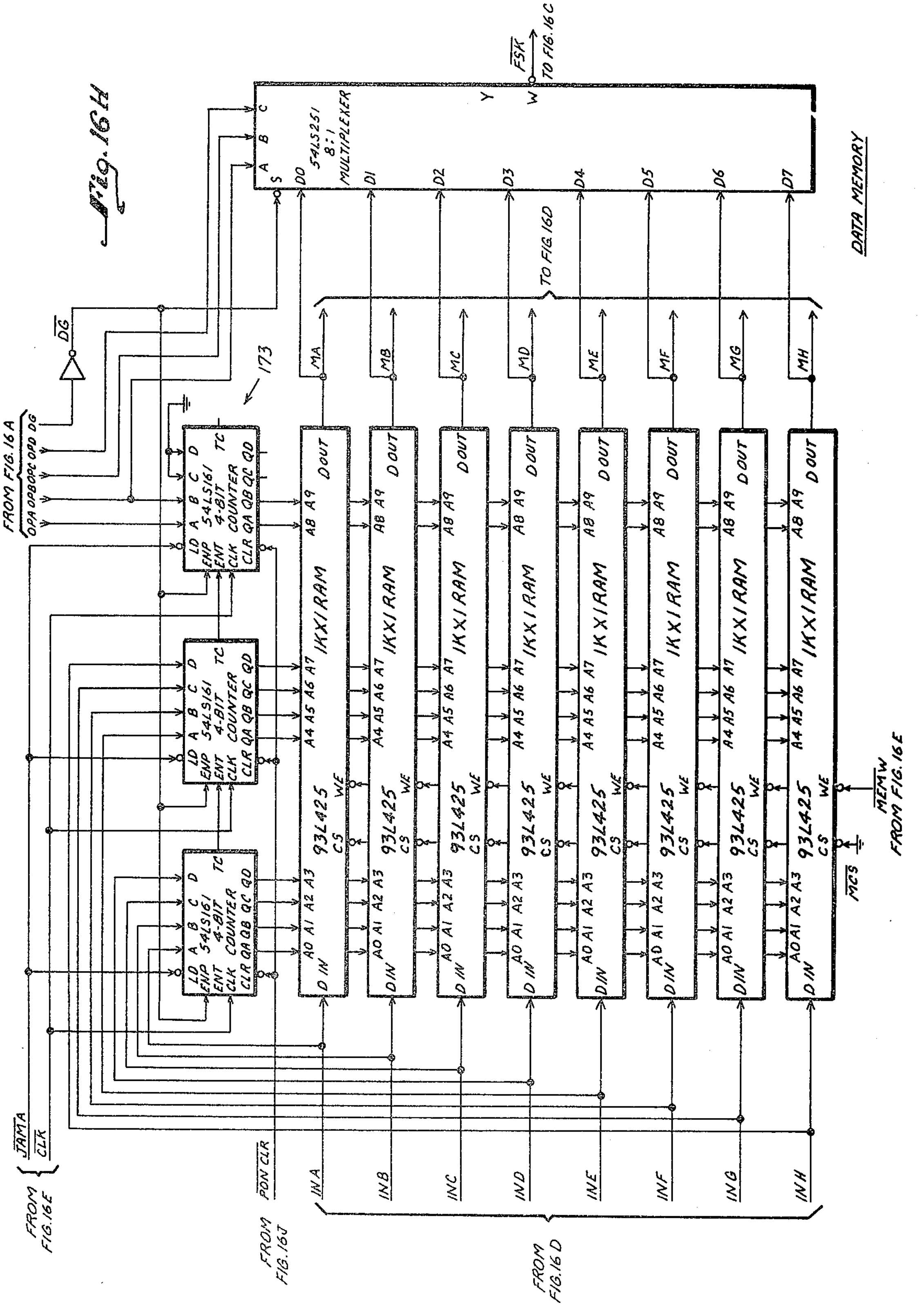
Figure 16I:
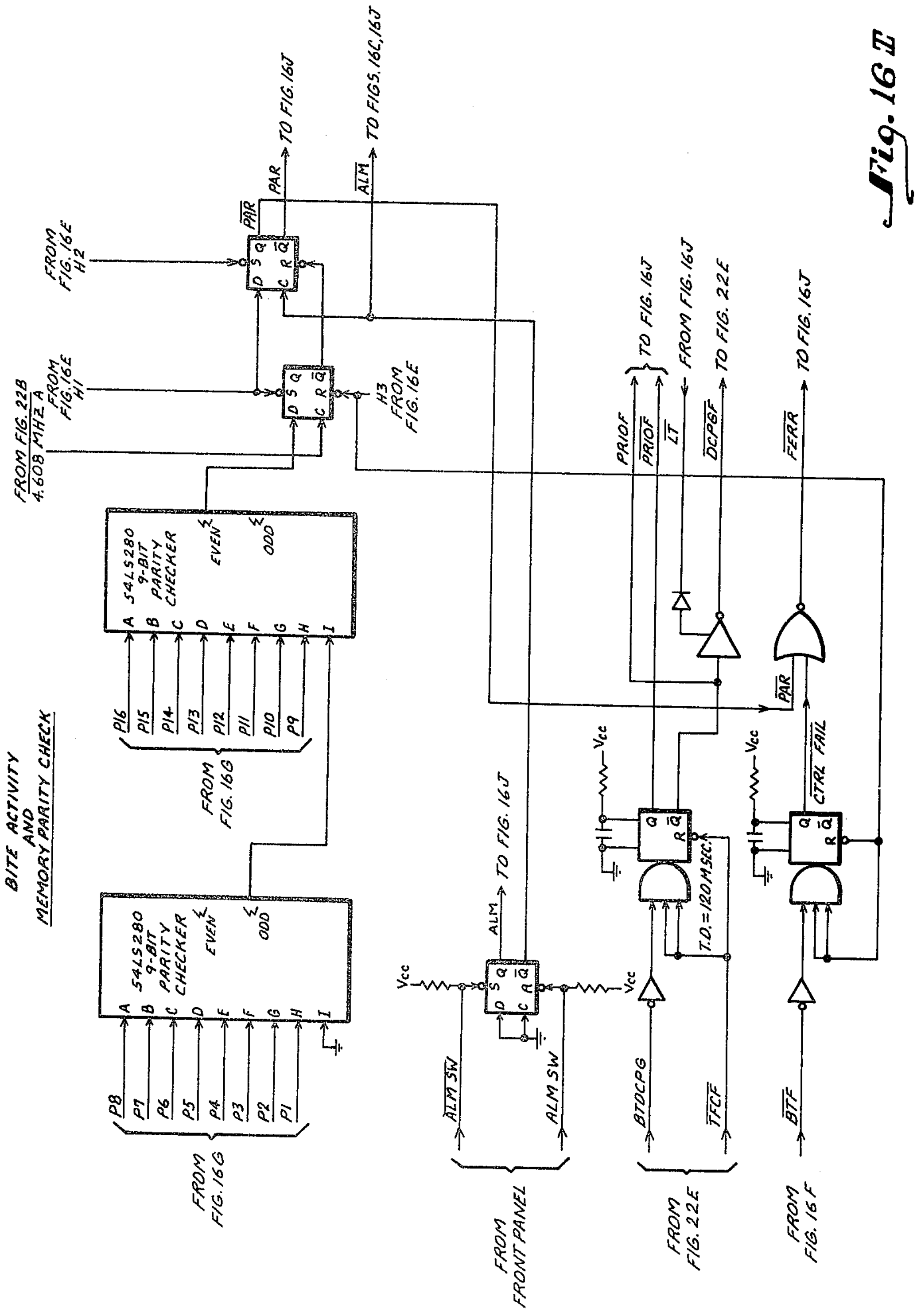

The automatic channel assignment sequence causes all twelve channel thumbwheel switches to be scanned and read through the input multiplexer 167 of FIGS. 8 and 16D. The acquired rates are first examined to determine whether or not the aggregate data rate programmed on the thumbwheel switches exceeds the budget of 30 kilobits per second (accumulated channel assignment greater than 50). If the budget is exceeded, the channel programming is inhibited and the RATE lamp is activated. If the budget is not exceeded, systematic channel assignments are made and codes for each time slot are deposited into data memory 200.

The automatic channel assignment algorithm shall incorporate the following requirements: (A) if the OFF position is programmed for any channel, no assignments shall be made for that channel; (B) if a channel card is removed from a receptacle 1, the channel shall automatically be programmed OFF; (C) proper assignments shall occur with up to eleven channel cards removed from the receptacles 1; and (D) a teletypewriter subscriber with transmission speeds up to 150 bits per second shall be assigned a 1,200-bit per second channel rate on the multiplexed data stream (includes FSK TTY).

Common controller 5 shall perform BITE in the following manner: (1) Module failure signals shall be received from the digital control pulse generator printed circuit board 6 (FIG. 1) and the channel printed circuit board receptacles 1. In addition, common controller 5 performs a self test and provides an error signal in the event of failure. When an error occurs, common controller 5 will light a LED lamp only on the isolated fault module and shall provide a time guard of two seconds to avoid intermittent indications prior to providing signal and drive to: (a) light the fault summary lamp on the front panel and (b) activate the audible alarm. When an error condition is corrected, common controller 5 shall automatically cause all error indications and drive signals to revert back to the normal state. (2) The digital control pulse generator shall monitor the received conditioned diphase 32 KHz received traffic to determine whether or not transitions are occurring within nominal limits of 10 KHz to 40 KHz. If traffic falls outside of these limits, the common controller 5 shall drive the TRFC FAULT lamp on the front panel but shall prevent any other lamp from indicating. Also, as for functional faults, common controller 5 shall provide a time guard of two seconds to avoid intermittent indications prior to activating the audible alarm.

When the 32 KHz traffic is restored, common controller 5 shall initialize all channel receive elastic stores and the BITE latches and automatically cause all error indication drive signals to revert back to the normal state.

(3) Under FAULT condition, common controller 5 shall respond to the front panel ALARM ACK/TEST switch by silencing the audible alarm. When the fault is corrected, the audible alarm shall again sound and may be silenced again by pressing the ALARM ACK/TEST switch.

(4) Under NO-FAULT conditions, controller 5 shall respond to the ALARM ACK/TEST switch by lighting all fault lamps and sounding the audible alarm as long as the pushbutton is depressed.

(5) If an operator has dialed RATES on the channel rate programming thumbwheel switches in excess of the RATE budget as defined hereinabove, common controller 5 shall cause the RATE lamp to illuminate if the ASSIGN pushbutton is activated.

(6) If an operator has dialed a RATE other than OFF or TTY for any channel in which an FSK printed circuit board resides, controller 5 shall cause the RATE lamp and the indicator on the effective channel printed circuit board to flash.

(7) If frame synchronization has not been achieved, the TRAFFIC light will flash and the digital control pulse generator ERROR lamp will light.

Figure 16J:
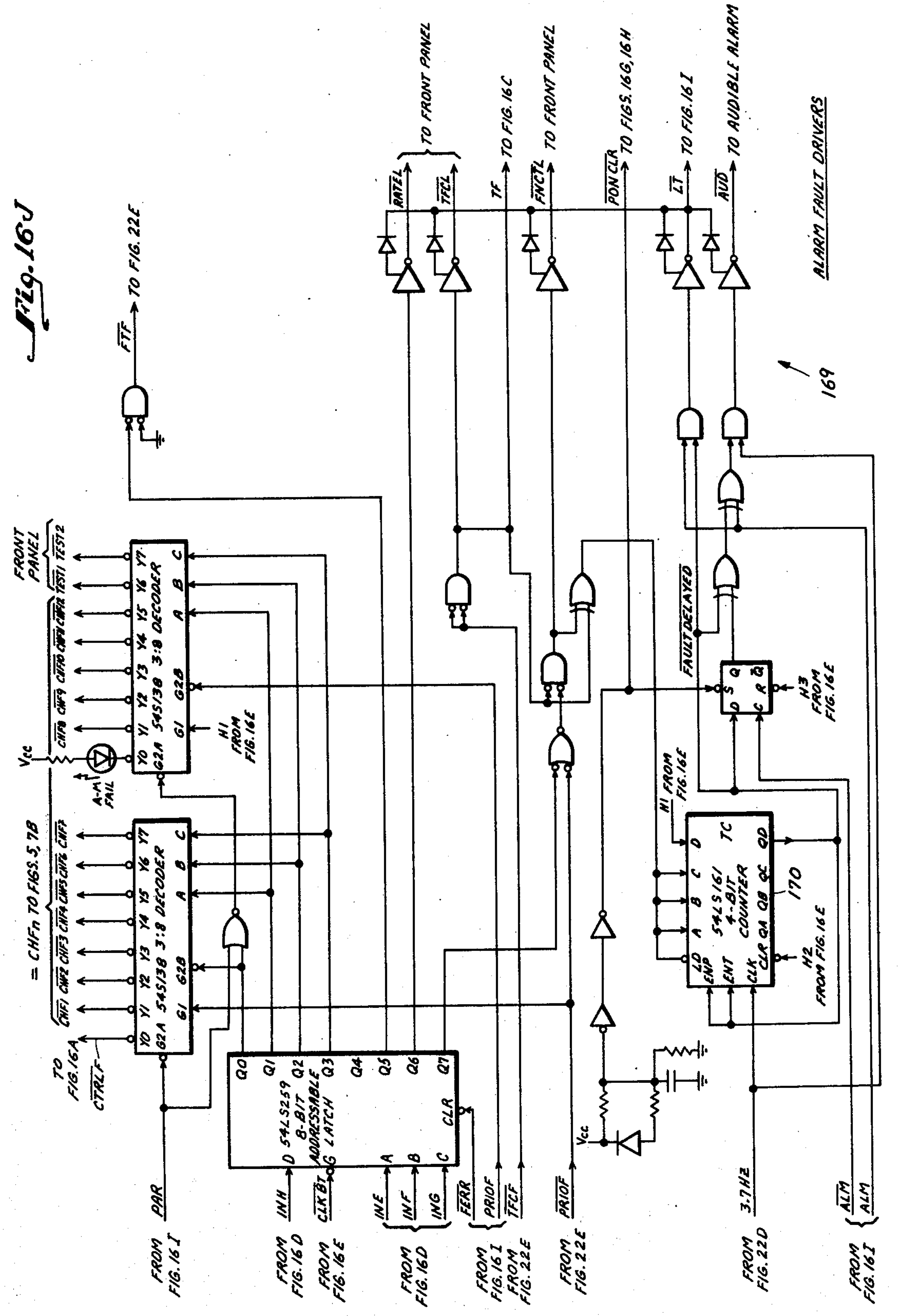

BITE is accomplished in two modes in BITE multiplexer 168 (FIG. 16F) and alarm monitor 169 (FIG. 16J) of controller 5; BITE summary and self test. In the BITE summary mode, common controller 5 examines the received channel FAIL signals to determine whether a single or multiple channel fault has occurred. If multiple errors have occurred, the faults are ignored on the basis that the priority circuit will detect the probable source of error. If a single error occurs, common controller 5 will cause the audible alarm and the appropriate channel FAIL light to be driven on. In the self test mode, independent circuitry monitors activity in the common controller 5 and drives a BITE counter 170 (FIG. 16J). The BITE counter 170 output is monitored for activity. In addition, the sequencer monitors the BITE counter under program control to perform a comprehensive self test.

The instruction set for the multiplex-demultiplex combination is a special purpose machine coding and is defined in TABLE VIII.

The instruction set TABLE VIII is comprised of variations of eight basic instruction types: ADR-Address Branch, BRA-Branch, JAM A-Preset Address Register, STB-Command Strobe Latch, STB GP-Group Strobe, OPB-B Register Operation, LDC-C Register Operation, STO-Memory Store.

The capabilities of the digital common controller 5 are reflected in the variations of the basic instruction types. The eight basic instructions are decoded in decoder 162 from the E, F, G bits of the OP code field in register 161. The parity bit has variable locations according to specific instruction types. The BRA instruction has 32 possible variations which are decoded in decoder 162 from the A, B, C, E, and F bits of the data field in register 160. The BRA REL group is determined by the A bit of the OP code field. The ABR instruction follows the BRA or BRA REL instruction types. For BRA instructions, the eight bits of the data field and the A and B bits of the OP CODE field define the ten bit address from program counter 158 to which a branch signal is directed. For BRA REL instruction types, the E, F, G and H bits of the data field are replaced with previously set up data from a source specified by the decoding of the C and D bits of the OP CODE field.

TABLE VIII

DIGITAL CONTROLLER INSTRUCTION SET

| HEXADECIMAL OP | HEXADECIMAL DATA | OP CODE FIELD H G F E | OP CODE FIELD D C B A | DATA FIELD H G F E | DATA FIELD D C B A | MNEMONIC | INSTRUCTION |
|---|---|---|---|---|---|---|---|
| 0 Y | Z Z | 0 0 0 0 | P 0 $A_9$ $A_8$ | $A_7$ $A_6$ $A_5$ $A_4$ | $A_3$ $A_2$ $A_1$ $A_0$ | ADR | BYTE 2 OF BRA INSTR. |
| | | B R A | | CONDITION | CODE | BRA | BRANCH CONDITIONAL |
| 1 0 | 0 0 | 0 0 0 1 | 0 0 0 0 | P 0 0 0 | 0 0 0 0 | BRA CF 00 | CHANNEL FAIL 1 |
| | 8 1 | | | 0 0 | 0 0 0 1 | 01 | 2 |
| | 8 2 | | | 0 0 | 0 0 1 0 | 02 | 3 |
| | 0 3 | | | 0 0 | 0 0 1 1 | 03 | 4 |
| | 8 4 | | | 0 0 | 0 1 0 0 | 04 | 5 |
| | 0 5 | | | 0 0 | 0 1 0 1 | 05 | 6 |
| | 0 6 | | | 0 0 | 0 1 1 0 | 06 | 7 |
| | 8 7 | | | 0 0 | 0 1 1 1 | 07 | 8 |
| | 9 0 | | | 0 1 | 0 0 0 0 | 10 | 9 |
| | 1 1 | | | 0 1 | 0 0 0 1 | 11 | 10 |
| | 1 2 | | | 0 1 | 0 0 1 0 | 12 | 11 |
| | 9 3 | | | 0 1 | 0 0 1 1 | BRA CF 13 | CHANNEL FAIL 12 |
| | 1 4 | | | 0 1 | 0 1 0 0 | BRA X32 | XMIT 32 KHZ SENSE |
| | 9 5 | | | 0 1 | 0 1 0 1 | BRA R32 | RCV 32 KHZ SENSE |
| | 9 6 | | | 0 1 | 0 1 1 0 | BRA BTS | BITE STROBE |
| | 1 7 | | | 0 1 | 0 1 1 1 | BRA UNC | UNCONDITIONAL |
| | A 0 | | | 1 0 | 0 0 0 0 | BRA BA | BA · 1 |
| | 2 1 | | | 1 0 | 0 0 0 1 | BRA B < C | B < C |
| | 2 2 | | | 1 0 | 0 0 1 0 | BRA WDR | WDR 1 |
| | A 3 | | | 1 0 | 0 0 1 1 | BRA B · C | B · C |
| | 2 4 | | | 1 0 | 0 1 0 0 | BRA T | T - |
| | A 5 | | | 1 0 | 0 1 0 1 | BRA 3.7 | 3.7 HZ |
| | A 6 | | | 1 0 | 0 1 1 0 | BRA BXC | BA (+) CA · 1 |
| | 2 7 | | | 1 0 | 0 1 1 1 | BRA B > C | B > C |
| | 3 0 | | | 1 1 | 0 0 0 0 | BRA RESET | RESET CODE |
| | B 1 | | | 1 1 | 0 0 0 1 | BRA SKIP | SKIP CODE |
| | B 2 | | | 1 1 | 0 0 1 0 | BRA FILL | FILL CODE |
| | 3 3 | | | 1 1 | 0 0 1 1 | BRA OH | OVERHEAD CODE |
| | B 4 | | | 1 1 | 0 1 0 0 | BRA EXT | EXTERNAL (.927 HZ) |
| | 3 5 | | | 1 1 | 0 1 0 1 | BRA FSK | FSK IN SLOT* |
| | 3 6 | | | 1 1 | 0 1 1 0 | BRA ACA | ASSIGN SW ON |
| 1 0 | B 7 | 0 0 0 1 | 0 0 0 0 | P 0 1 1 | 0 1 1 1 | BRA ALM | ALARM SW ON |
| A Y | Z Z | 1 0 1 0 | 0 1 $A_9$ $A_8$ | $A_7$ $A_6$ $A_5$ $A_4$ | $A_3$ $A_2$ $A_1$ $A_0$ | JAM ADP | PRESET A REG WITH LITERAL (P EVEN)** RESET B |

| | | | | | | | |
|---|---|---|---|---|---|---|---|
| 2 Y | Z Z | 0 0 1 0 | 0 1 $A_9$ $A_8$ | $A_7$ $A_6$ $A_5$ $A_4$ | $A_3$ $A_2$ $A_1$ $A_0$ | JAM AD | PRESET A REG WITH LITERAL (P ODD)*** |
| 2 Y | 0 Z | 0 0 1 0 | 1 0 $A_9$ $A_8$ | 0 0 0 0 | P 0 0 0 | JAM AM | PRESET A REG WITH MEMORY DATA |
| 2 Y | 0 Z | 0 0 1 0 | 1 1 $A_9$ $A_8$ | 0 0 0 0 | P 0 0 0 | JAM AS | PRESET A REG WITH CONTENTS OF ADDER |
| A Y | 0 Z | 1 0 1 0 | 1 1 $A_9$ $A_8$ | 0 0 0 0 | P 0 0 0 | JAM CC | PRESET A REG WITH C + 1, (RST B) |
| 3 0 | 0 1 | 0 0 1 1 | 0 0 0 0 | 0 0 0 0 | P 0 0 1 | CLR T | CLR BITE STROBE |
| | 0 8 | | | | P 0 1 0 | CLR X | CLR X 32 KHZ SENSOR |
| | 0 D | | | | P 0 1 1 | CLR R | CLR R 32 KHZ SENSOR |
| | 0 4 | | | | P 1 0 0 | CLR STB | CLR COMMAND STROBES |
| | 0 E | | | 0 0 0 0 | P 1 1 0* | CLR 15 F | 15 △ F — COMMAND STROBE |
| | 1 6 | | | 0 0 0 1 | | CLR STBX | XMIT STROBE |
| | 2 6 | | | 0 0 1 0 | | CLR DIS | IN MUX DISABLE (B THRU H) |
| | 3 E | | | 0 0 1 1 | | CLR STBR | RCV STROBE |
| | 4 6 | | | 0 1 0 0 | | CLR SC | STUFF COMMAND |
| | 5 E | | | 0 1 0 1 | | CLR MS | MODE STROBE |
| | 6 E | | | 0 1 1 0 | | CLR T - | T - |
| | 7 6 | | | 0 1 1 1 | | CLR RSTB | RESET BITE — COMMAND STROBE |
| | 8 6 | | | 1 0 0 0 | | STB 15 F | COMMAND STROBE |
| | 9 E | | | 1 0 0 1 | | STB XO | |
| | A E | | | 1 0 1 0 | | STB DIS | |
| | B 6 | | | 1 0 1 1 | | STB RO | |
| | C E | | | 1 1 0 0 | | STB SC | |
| | D 6 | | | 1 1 0 1 | | STB MS | |
| | E 6 | | | 1 1 1 0 | | STB T - | |
| 3 0 | F E | 0 0 1 1 | 0 0 0 0 | 1 1 1 1 | P 1 1 0 | STB RSTB | COMMAND STROBE |
| 3 4 | 0 F | 0 0 1 1 | 0 1 0 0 | 0 0 0 0 | P 1 1 1 | CLR BT 0 | CLR BITE LATCH Q0**** |
| | 1 7 | | | 0 0 0 1 | | 1 | Q1 |
| | 2 7 | | | 0 0 1 0 | | 2 | Q2 |
| | 3 F | | | 0 0 1 1 | | 3 | Q3 |
| | 4 7 | | | 0 1 0 0 | | 4 | Q4 |
| | 5 F | | | 0 1 0 1 | | 5 | Q5 |
| | 6 F | | | 0 1 1 0 | | 6 | Q6 |
| | 7 7 | | | 0 1 1 1 | | CLR BT 7 | CLR BITE LATCH Q7 |
| | 8 7 | | | 1 0 0 0 | | STB BT 0 | SET BITE LATCH Q0**** |
| | 9 F | | | 1 0 0 1 | | 1 | Q1 |
| | A F | | | 1 0 1 0 | | 2 | Q2 |
| | B 7 | | | 1 0 1 1 | | 3 | Q3 |
| | C F | | | 1 1 0 0 | | 4 | Q4 |
| | D 7 | | | 1 1 0 1 | | 5 | Q5 |
| | E 7 | | | 1 1 1 0 | | 6 | Q6 |
| 3 4 | F F | 0 0 1 1 | 0 1 0 0 | 1 1 1 1 | P 1 1 1 | STB BT 7 | SET BITE LATCH Q7 |
| 4 8 | 0 F | 0 0 1 1 | 0 1 0 0 | 0 0 0 0 | P 1 1 1 | STB MBT | SET BITE LATCH WITH MEMORY DATA CONTAINED IN DATA FIELD E THROUGH H |

(CONTINUED)

P = PARITY BIT

* REGISTER BIT CP MUST = 0. SEE LOGIC DIAGRAM, DIGITAL CONTROLLER, SHEET 8.

** JAM ADP CANNOT BE USED IF PARITY OF LITERAL $A_0$ THROUGH $A_9$ IS ODD.

*** JAM AD CANNOT BE USED IF PARITY OF LITERAL $A_0$ THROUGH $A_9$ IS EVEN.

**** SEE BITE LATCH CODING TABLE.

| HEXADECIMAL | | OP CODE FIELD | | DATA FIELD | | MNEMONIC | INSTRUCTION |
|---|---|---|---|---|---|---|---|
| O P | DATA | H G F E | D C B A | H G F E | D C B A | | |
| 4 0 | 0 0 | 0 1 0 0 | 0 0 0 0 | 0 0 0 0 | P 0 0 0 | STB GP | GROUP STROBE |
| 5 0 | 0 8 | 0 1 0 1 | 0 0 0 0 | 0 0 0 0 | P 0 0 0 | OPB NOP | NO OPERATION |
| 5 1 | 0 0 | | 0 0 0 1 | 0 0 0 0 | P 0 0 0 | OPB SHR | SHIFT RIGHT B |
| 5 2 | 0 0 | | 0 0 1 0 | 0 0 0 0 | P 0 0 0 | OPB SHL | SHIFT LEFT B |
| 5 3 | 0 8 | | 0 0 1 1 | 0 0 0 0 | P 0 0 0 | OPB RBLD | RATE BUS/BITE CTR, LOAD B<br>RATE BUS → BA, BB, CC<br>BITE CTR → BD THRU BH |
| 5 3 | 1 0 | | 0 0 1 1 | 0 0 0 1 | P 0 0 0 | OPB SR | STUFF REQ → BA |
| 5 3 | 2 0 | | 0 0 1 1 | 0 0 1 0 | P 0 0 0 | OPB WDR | WDR → BA |
| 5 3 | 3 8 | | 0 0 1 1 | 0 0 1 1 | P 0 0 0 | OPB BXC | BA (+) CA → BA |
| 5 7 | Z Z | | 0 1 1 1 | $D_H$ $D_G$ $D_F$ $D_E$ | $D_D$ $D_C$ $D_B$ $D_A$ | OPB DLD | LITERAL D → B (P ODD)* |
| 5 B | 0 0 | | 1 0 1 1 | 0 0 0 0 | P 0 0 0 | OPB MLD | MEMORY DATA → B |
| 5 F | 0 8 | 0 1 0 1 | 1 1 1 1 | 0 0 0 0 | P 0 0 0 | OPB SLD | ADDER → B |
| 6 1 | 0 0 | 0 1 1 0 | 0 0 0 P | 0 0 0 0 | 0 0 0 0 | LDC RB | LOAD C WITH RATE BUS/BITE CTR<br>RATE BUS → CA, CB, CC<br>BITE CTR → CD, THRU CH |
| 6 0 | 1 0 | 0 1 1 0 | 0 0 0 P | 0 0 0 1 | 0 0 0 0 | LDC SR | STUFF REQ → CA |
| 6 0 | 2 0 | 0 1 1 0 | 0 0 0 P | 0 0 1 0 | 0 0 0 0 | LDC WDR | WDR → CA |
| 6 1 | 3 0 | 0 1 1 0 | 0 0 0 P | 0 0 1 1 | 0 0 0 0 | LDC BXC | BA (+) CA → CA |
| 6 Y | Z Z | 0 1 1 0 | 0 1 0 P | $D_H$ $D_G$ $D_F$ $D_E$ | $D_D$ $D_C$ $D_B$ $D_A$ | LDC D | LITERAL D → C |
| 6 8 | 0 0 | 0 1 1 0 | 1 0 0 P | 0 0 0 0 | 0 0 0 0 | LDC M | MEMORY DATA → C |
| E 8 | 4 0 | 1 1 1 0 | 1 0 0 P | 0 1 0 0 | 0 0 0 0 | LDC MCB | MEMORY DATA → C, (RST B) |
| E 9 | 0 0 | 1 1 1 0 | 1 0 0 P | 0 0 0 0 | 0 0 0 0 | LDC MI | MEMORY DATA → C, INCR A REG, (RST B) |
| 6 D | 0 0 | 0 1 1 0 | 1 1 0 P | 0 0 0 0 | 0 0 0 0 | LDC S | ADDER → C |
| E D | 4 0 | 1 1 1 0 | 1 1 0 P | 0 1 0 0 | 0 0 0 0 | INCR C | C + 1 → C, RESET B |
| 7 0 | 0 0 | 0 1 1 1 | 0 0 0 P | 0 0 0 0 | 0 0 0 0 | STO RB | STORE RATE BUS/BITE CTR<br>RATE BUS → MA, MB, MC<br>BITE CTR → MD THRU MH |
| 7 1 | 1 0 | 0 1 1 1 | 0 0 0 P | 0 0 0 1 | 0 0 0 0 | STO SR | STORE STUFF REQ |
| 7 1 | 2 0 | | 0 0 0 P | 0 0 1 0 | 0 0 0 0 | STO WDR | STORE WDR |
| 7 0 | 3 0 | | 0 0 0 P | 0 0 1 1 | 0 0 0 0 | STO BXC | STORE BA (+) CA |
| 7 Y | Z Z | | 0 1 0 P | $D_H$ $D_G$ $D_F$ $D_E$ | $D_D$ $D_C$ $D_B$ $D_A$ | STO D | STORE LITERAL |

| | | | | | | | | | | | | | | | | | | | | | |
|---|---|---|---|---|---|---|---|---|---|---|---|---|---|---|---|---|---|---|---|---|---|
| C | 0 | 0 | 0 | 1 | 1 | 1 | 1 | 1 | 0 | P | 0 | 0 | 0 | 0 | 0 | 0 | 0 | 0 | STO | S | STORE ADDER |
| 1 | 0 | 0 | 1 | 1 | 1 | 1 | 0 | 0 | 0 | P | 0 | 0 | 0 | 0 | 0 | 0 | 0 | 0 | STO | RBI | STORE RATE BUS/BITE CTR, INCR A REG RESET B |
| 0 | 1 | 0 | | | | | 0 | 0 | 0 | P | 0 | 0 | 0 | 1 | 0 | 0 | 0 | 0 | STO | SRI | STORE STUFF REQ, INCR A REG, RESET B |
| 0 | 2 | 0 | | | | | 0 | 0 | 0 | P | 0 | 0 | 1 | 0 | 0 | 0 | 0 | 0 | STO | WI | STORE WDR, INCR A REG, RESET B |
| Y | Z | Z | | | | | 0 | 1 | 0 | P | $D_H$ | 0 | $D_F$ | $D_E$ | $D_D$ | $D_C$ | $D_B$ | $D_A$ | STO | DI | STORE LITERAL, INCR A REG, RESET B |
| D | 0 | 0 | | | | | 1 | 1 | 0 | P | 0 | 0 | 0 | 0 | 0 | 0 | 0 | 0 | STO | CCI | STORE C + 1, INCR A REG, RESET B** |
| C | 4 | 0 | 1 | 1 | 1 | 1 | 1 | 1 | 0 | P | 0 | 1 | 0 | 0 | 0 | 0 | 0 | 0 | STO | CC | STORE C + 1, RESET B** |

* OPB DID CANNOT BE USED IF PARITY IS EVEN.
** RESET B NOT GUARANTEED IF NEXT PROGRAM INSTRUCTION IS A MEMORY STORE TYPE.

BITE LATCH CODING[1]

| HEXADECIMAL O P | | DATA | | INSTRUCTION | | $D_H$ | $D_G$ | $D_F$ | $D_E$ | FAULT LAMP DECODER 1 G2 EN | A | B | C | FAULT LAMP DECODER 2 G2 EN | A | B | C | SPARE | FORCE TRAFFIC FAULT FTF | RATE LAMP | GATE FORCE FAULT |
|---|---|---|---|---|---|---|---|---|---|---|---|---|---|---|---|---|---|---|---|---|---|
| 3 | 4 | 0 | F | CLR | BT 0 | 0 | 0 | 0 | 0 | 0 | R | R | R | 1 | R | R | R | R | R | R | R |
| | | 1 | 7 | | 1 | 0 | 0 | 0 | 1 | R | 0 | R | R | R | 0 | R | R | R | R | R | R |
| | | 2 | 7 | | 2 | 0 | 0 | 1 | 0 | R | R | 0 | R | R | R | 0 | R | R | R | R | R |
| | | 3 | F | | 3 | 0 | 0 | 1 | 1 | R | R | R | 0 | R | R | R | 0 | R | R | R | R |
| | | 4 | 7 | | 4 | 0 | 1 | 0 | 0 | R | R | R | R | R | R | R | R | 0 | R | R | R |
| | | 5 | F | | 5 | 0 | 1 | 0 | 1 | R | R | R | R | R | R | R | R | R | 0 | R | R |
| | | 6 | F | | 6 | 0 | 1 | 1 | 0 | R | R | R | R | R | R | R | R | R | R | 0 | R |
| | | 7 | 7 | CLR | BT 7 | 0 | 1 | 1 | 1 | R | R | R | R | R | R | R | R | R | R | R | 0 |
| | | 8 | 7 | STB | BT 0 | 1 | 0 | 0 | 0 | 1 | R | R | R | 0 | R | R | R | R | R | R | R |
| | | 9 | F | | 1 | 1 | 0 | 0 | 1 | R | 1 | R | R | R | 1 | R | R | R | R | R | R |
| | | A | F | | 2 | 1 | 0 | 1 | 0 | R | R | 1 | R | R | R | 1 | R | R | R | R | R |
| | | B | 7 | | 3 | 1 | 0 | 1 | 1 | R | R | R | 1 | R | R | R | 1 | R | R | R | R |
| | | C | F | | 4 | 1 | 1 | 0 | 0 | R | R | R | R | R | R | R | R | 1 | R | R | R |
| | | D | 7 | | 5 | 1 | 1 | 0 | 1 | R | R | R | R | R | R | R | R | R | 1 | R | R |
| | | E | 7 | | 6 | 1 | 1 | 1 | 0 | R | R | R | R | R | R | R | R | R | R | 1 | R |
| 3 | 4 | F | F | STB | BT 7 | 1 | 1 | 1 | 1 | R | R | R | R | R | R | R | R | R | R | R | 1 |

| FAULT LAMP DECODER 1 G2 EN | A | B | C | FAULT LAMP | FAULT LAMP DECODER 2 G2 EN | A | B | C | FAULT LAMP |
|---|---|---|---|---|---|---|---|---|---|
| 0 | 0 | 0 | 0 | DIG CTRLLR | 0 | 0 | 0 | 0 | ALARM-MEM |
| 0 | 1 | 0 | 0 | CHANNEL 1 | 0 | 1 | 0 | 0 | CHANNEL 8 |
| 0 | 0 | 1 | 0 | 2 | 0 | 0 | 1 | 0 | 9 |
| 0 | 1 | 1 | 0 | 3 | 0 | 1 | 1 | 0 | 10 |
| 0 | 0 | 0 | 1 | 4 | 0 | 0 | 0 | 1 | 11 |
| 0 | 1 | 0 | 1 | 5 | 0 | 1 | 0 | 1 | CHANNEL 12 |
| 0 | 0 | 1 | 1 | 6 | 0 | 0 | 1 | 1 | NONE |
| 0 | 1 | 1 | 1 | CHANNEL 7 | 0 | 1 | 1 | 1 | NONE |
| 1 | X | X | X | NONE | 1 | X | X | X | NONE |

LEGEND:
R - PREVIOUS STATE
X - DON'T CARE
P - PARITY BIT
1 - SEE LOGIC DIAGRAM, ALARM-MEMORY, SHEET 5.

REVISED JULY 1980

In general, the C and D bits of the OP CODE field specify the following sources of data for manipulation as set forth in Table IX.

TABLE IX

| D | C | SOURCE |
|---|---|---|
| 0 | 0 | BITE Counter/Thumbwheel Rate Bus |
| 0 | 1 | Data Field Literal |
| 1 | 0 | Memory Data |
| 1 | 1 | Adder Data (B Reg. Plus C Reg.) |

The JAM A instruction types are used to present the address register (A) with values specified by the CD source code.

The OP H data bit is used for both resetting the B register (left/right shift register 171, FIG. 16B) and for preconditioning the carry input of the adder (summer) 172, (FIG. 16B). In addition, OP H will increment the A REG register (address register 173, FIG. 16H) if the G of the data field is logic zero.

The eight commands of the command strobe latch (strobe generator 152) are controlled by the E, F, G and H bits of the data field. The E, F and G bits specify one of eight commands and the H bit specifies the state which the command is to assume. The A, B and C bits of the data field specify specific clear (CLR) strobes or the command strobe latch. The group strobe (STB GP) is an independent instruction.

The B REG operations (OPB) are specified by the A and B bits of the OP CODE field as shown in Table X.

TABLE X

| OPB | OPA | |
|---|---|---|
| 0 | 0 | NOP |
| 0 | 1 | SHIFT RIGHT |
| 1 | 0 | SHIFT LEFT |
| 1 | 1 | PRESET |

The present operation is augmented by the source code as specified by the C and D bits of the OP CODE field. The LDC instruction is a preset instruction which is augmented by the specific source code as is the STO instruction which must determine a data source for storing.

The program memory budget and processing time allocation is shown in Table XI.

TABLE XI

| TASK | BYTES ALLOCATED | PROCESSING TIME ALLOCATED |
|---|---|---|
| Power Up Initialization | 175 | * |
| Automatic Channel Assignment | 150 | * |
| Transmit/BITE | 800 | 14 us |
| Receive/Frame Synchronization | 300 | 16 us |

*These processing times not critical because they are not performed while processing TRAFFIC FIG. 15 illustrates the data memory map for program memory 157.

Digital Clock Pulse Generator

The digital clock pulse generator 6 of FIG. 1 performs all of the timing generator functions for the multiplexer-demultiplexer combination and also contains the group input and output interface circuits, including timing recovery for the received signal. The following functions are performed: (1) generates ten clock frequencies from 0.927 Hz to 9.216 MHz from a crystal source; (2) regenerates 64 KHz and 32 KHz clocks from a conditioned diphase source at 32 kilobits per second using a digital phase locked loop; (3) demodulates a conditioned diphase signal into NRZ, 32 kilobits per second; (4) interfaces 32 kilobits per second conditioned diphase data from LSTTL levels to a balanced line and vice versa; and (5) provides traffic fault and BITE outputs.

Figure 17:
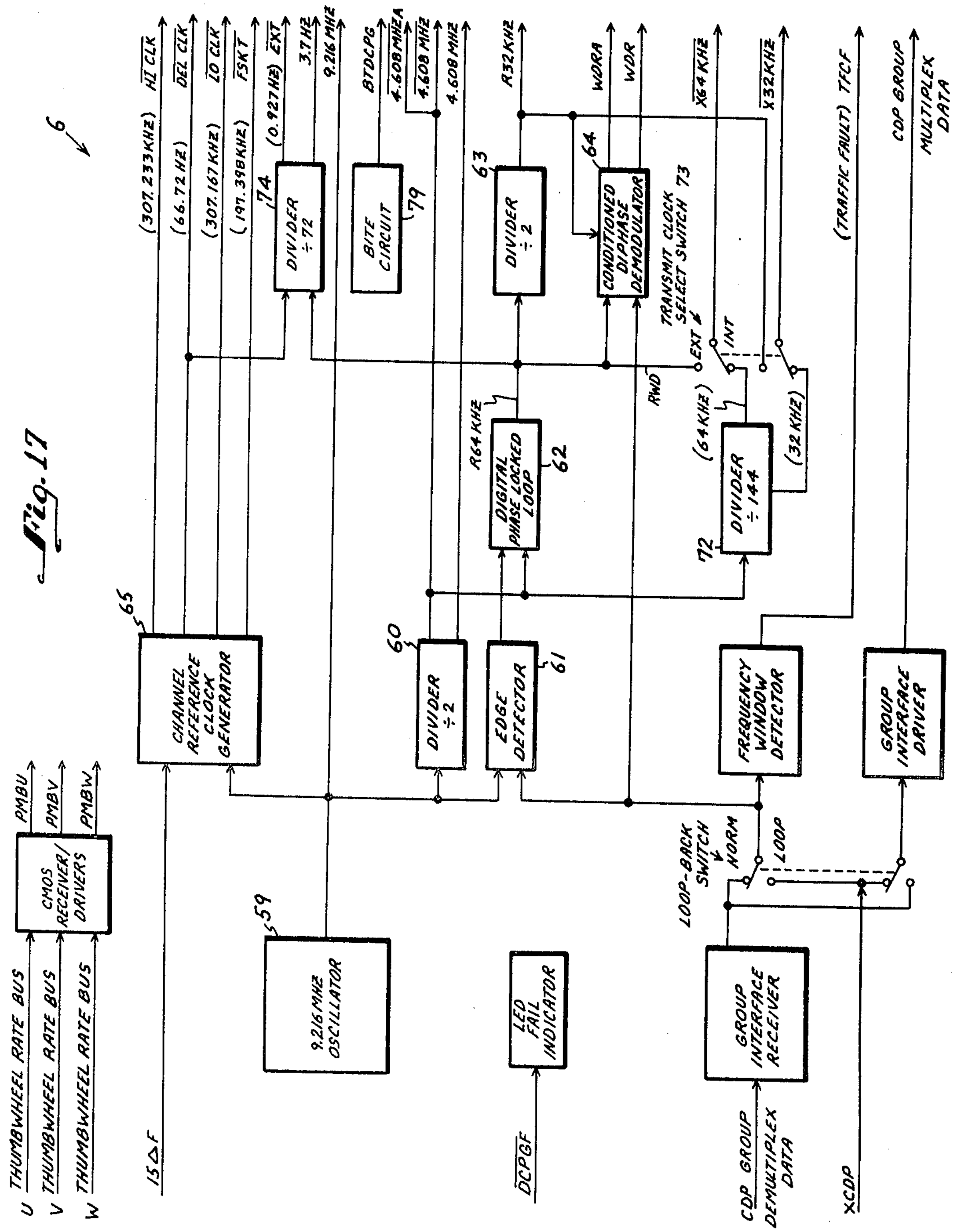
FIG. 17 is a block diagram of the digital clock pulse generator of the multiplexer-demultiplexer combination in accordance with the principles of the present invention.

The block diagram of the digital clock pulse generator 6 is shown in FIG. 17 and the schematic diagram thereof is shown in FIGS. 22A–22E with the various figures of FIG. 22 and other figures of the drawing with which the pulse generator 6 operates being interconnected by labels on the various input and output lines thereof.

A 9.216 MHz master clock is generated by an oscillator module 59. Symmetry is assured by starting with 18.432 MHz and dividing by two within module 59. The 9.216 MHz is further divided by two in divider 60 to produce 4.608 MHz.

An edge detector 61 detects transitions in the received CDP (RCDP) and therefore operates as a phase comparator for a digital phase locked loop 62. The edge detector output sets the divide ratio of a programmable counter to either 140 or 148, thus, offsetting the R64 KHz frequency to maintain proper phase between RCDP and R64 KHz. An R32 KHz output is provided by dividing R64 KHz by two in divider 63.

Figure 18:
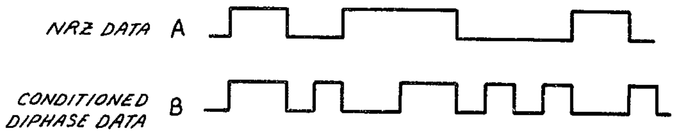
FIG. 18 illustrates waveforms for the conditioned diphase encoding scheme of the present invention.

The conditioned diphase demodulator 64 processes RCDP into NRZ format according to the algorithm shown in FIG. 18, using the regenerated R64 KHz for timing. The demodulated data is designated WDR and outputted from the printed circuit board.

Channel reference clocks HICLK, LOCLK and DELCLK are also provided by generator 65. The HICLK signal is generated by dividing the 9.216 MHz clock by 15 by counter 66, except by 14 every 1/500.4 seconds. A latch 67 is set every 1/500.4 seconds by an external signal (15Δf), and a HI latch eventually reaches the counter presets, changing the divide ratio to 14. Using counter 68 generation of LOCLK is similar, except that the preset is changed to 16 every 1/500.4 seconds. The DELCLK clock is provided by phase comparing HICLK and LOCLK in phase comparator 69 (FIG. 22C) such that the clock DELCLK is the difference frequency between HICLK and LOCLK.

The FSK timing ($\overline{FSKT}$=197.398 KHz) is derived from the 9.216 MHz by counters 70 and 71. The total divide ratio is 46 11/16 and is obtained by dividing by 47 eleven times and by 46 five times. Presets of the counters 70 and 71 are changed to accomplish this.

Figure 19:
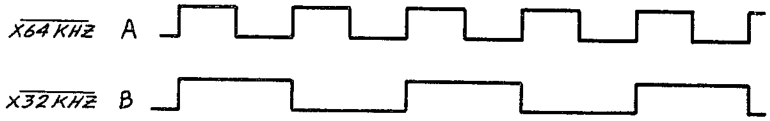
FIG. 19 illustrates transmit timing diagrams of the present invention.

Transmit clocks $\overline{X64}$ $\overline{KHz}$ and $\overline{X32}$ $\overline{KHz}$ as shown in FIG. 19 are obtained either from the 4.608 MHz (divide by 144 in divider 72) or from R64 KHz and R32 KHz, depending on the setting of the transmit select switch 73.

The 3.7 Hz and 0.927 Hz (EXT) are generated by dividing DELCLK (66.72 Hz) by 18 and then by 4 in divider 74.

The group line driver (FIG. 22*a*) is a modified version of the channel card driver of the above-cited U.S. Pat. No. 3,982,077. The requirements for the driver are: output level: positive and negative 3 volt peak to peak (terminated); output impedance: 135 ohms±10%; longitudinal balance: 40 db or greater; rise time: 5 to 15% of pulse period at 32 KHz; waveform purity: no inflection points or glitches.

A positive and complemented signal are generated by logic gates to produce a balanced signal. The 40 db longitudinal balance (1% balance) is met by precise level generation and, therefore, matching, in the CMOS gates. Output signals of the gates are rail-to-rail, within 30 millivolts or so. This way the positive and the complemented signal are matched. The absolute level reference is the 5-volt power supply (tolerance=5%). A high slew rate dual operational amplifier 75 with gains of 1.20 is employed. Both sections operate in the noninverting mode so rise times are effected more or less the same in both paths.

The output transistors 76 operate in a class B mode. Waveform purity is maintained because the output filter time constant is much slower than the operational amplifier/buffer transitions. The output buffers are in the operational amplifier loop to maintain precise levels in matching between legs. The group receiver (FIG. 22A) has a 40 dB longitudinal balance requirement; other than this there are no severe restraints. The input amplifier 77 operates linearly as a balanced/unbalanced converter with a cut-off frequency of 120 KHz. This configuration allows a single ended equalizer and therefore eliminates any 1% capacitors. Also, input impedance is resistive and constant at all frequencies with this method.

The equalizer has been attenuation-matched to 2.5 miles of dry WF-16 cable. The composite curve (cable, equalizer and high frequency cut-off) is flat +1, −3 dB to 120 KHz. The equalized signal is then sliced with a comparator 78 with 20 millivolts of hysteresis.

The BITE circuit 79 (FIGS. 17 and 22E) operates by monitoring seven critical points on the digital control pulse generator printed circuit board 6 for activity. Tthis is done by an 8×1 multiplexer 80 and a counter 81. Counter 81 is shifted by activity on the output of multiplexer 80, changing the address of multiplexer 80.

The following are the signal inputs to the printed circuit board 6 with these input ports all being at LSTTL unless otherwise noted. The underlined designation will serve as the mnemonic. The input port 15ΔF shall accept a positive going pulse at 500.4 Hz for generating the HICLK and LOCLK signals. The 15ΔF signal may have an arbitrary phase with respect to the 9.216 MHz and 4.608 MHz signals and the HICLK and LOCLK signals. The nominal pulse width is 0.87 seconds. The input port CDPGDD (conditioned diphase group data demux) will accept a 32 kilobit per second conditioned diphase signal (balanced) under the following conditions: (1) input signal level from 0.15 volts peak to peak to 6 volts peak to peak, (2) input impedance of 135 ohms±10%; and (3) longitudinal balance of 40 dB or greater.

An input port XCDP (transmit conditioned diphase) shall accept a conditioned diphase signal at 32 kilobit per second at LSTTL levels, to be sent to the group interface driver.

The input DCPGF shall connect to an LED which is in series with a resistor tied to +5 volts. This is the FAULT input that indicates that the digital control pulse generator 6 has a fault therein.

The inputs U, V and W shall accept signals from the thumbwheel switch bus for purposes of buffering. Gates are of the CMOS type and have pull-up resistors at the inputs.

The output signals from the digital control pulse generator 6 are as follows, with all outputs at LSTTL unless otherwise noted. The underlined output designations will serve as the mnemonic.

A square wave clock at 9.216 MHz shall be provided with the following characteristics: stability at 25° C. of ±10 ppm; at −55° C. to 85° C., ±30 ppm. An adjustment is provided to re-establish the center frequency to ±4 Hz. The specified stability shall be maintained through a ±5% supply voltage variation, and environmental conditions, and over aging for one year (5 ppm/year maximum aging). The symmetry of the output waveform is in the range of 48% to 52% under all conditions. The rise time and fall time shall be equal to or less than 15 nanoseconds.

A square wave clock at 4.608 MHz is provided which is phased to the 9.216 MHz clock such that the 4.608 MHz transitions occur between 5 and 55 nanoseconds after the positive transitions of the 9.216 MHz clock.

A $\overline{4}$08/ $\overline{MHz}$ signal which is a complement of the 4.608 MHz clock is provided such that the 4.608 MHz transitions occur between 6 and 40 nanoseconds after the positive transitions of the 9.216 MHz clock.

The output $\overline{4}$08/ $\overline{MHz}$ $\overline{A}$ is a duplicate of the $\overline{4}$08/ $\overline{MHz}$ signal for fan-out requirements.

A HICLK signal of 307.233 KHz is provided and is generated by dividing the 4.608 MHz signal by 15, except by 14 every 1/500.4 seconds. An input port for a 500.4 Hz pulse is provided on the assembly for this purpose.

The LOCLK signal of 307.167 KHz is provided and is generated by dividing the 4.608 MHz by 15, except by 16 every 1/500.4 seconds as above.

The signal DELCLK of 66.72 Hz is generated by phase-comparing the HICLK and the LOCLK signals according to the following: DELCLK is a logic "1" if the negative transitions of HICLK occur when LOCLK is low, otherwise DELCLK is low. The DELCLK transitions will follow the HICLK positive transitions by no greater than 60 nanoseconds.

The $\overline{FSKT}$ signal is a 197.4125 KHz ±0.01% clock which is provided at any abritrary phase with a pulse width between 20% and 80% of the clock period, S-TTL compatible.

Figure 20:
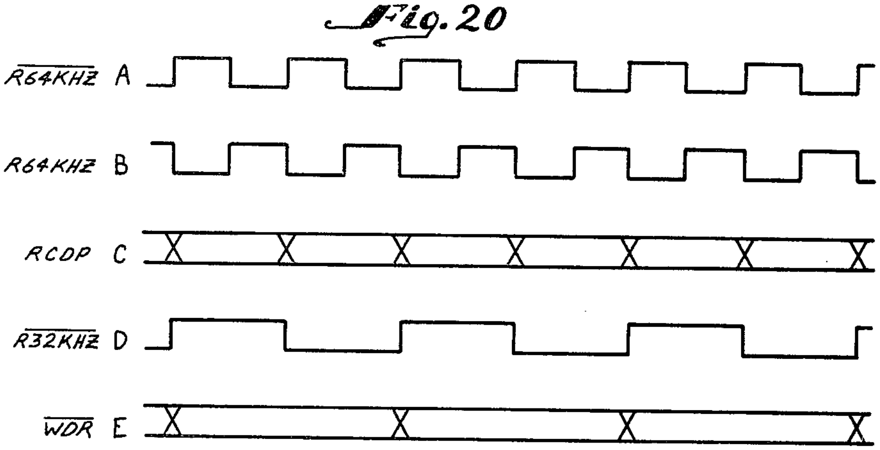
FIG. 20 illustrates receive timing diagrams of the present invention.

A receiver 32 KHz squarewave clock $\overline{R32}$ $\overline{KHz}$ is provided which is phase locked to the receive conditioned diphase (RCDP) such that the transitions of the $\overline{R32}$ $\overline{KHz}$ are coincident with the transitions of the RCDP signal as illustrated in FIG. 20.

The 3.7 Hz square wave clock is provided which is derived from the 66.72 Hz clock by dividing by 18. The 66.72 Hz clock is the DELCLK signal.

The $\overline{EXT}$ signal is a 0.927 Hz squarewave clock which is derived by dividing the 3.7 Hz clock by 4.

A transmit 64 KHz squarewave clock ($\overline{X64}$ $\overline{KHz}$) is provided which is derived from either of two sources: (1) the 9.216 MHz clock; or (2) the received 64 KHz clock. Note FIGS. 19 and 20. In the former case the X64 KHz clock may be of any phase with respect to the R64 KHz clock. The selection of case 1 or 2 shall be by means of a jumper plug on the digital control pulse generator printed circuit board 6.

A transmit 32 KHz squarewave clock, X32 KHz, shall be provided which is derived from either (1) the X64 KHz clock, or (2) the receive 32 KHz clock. In the former case, the X32 KHz clock may be of any phase with respect to the R32 KHz clock. The selection of case 1 or 2 shall be by means of a switch. In all cases, phasing of X64 KHz and X32 KHz shall be as shown in FIG. 19.

A conditioned diphase group multiplex data (CDPGMD) balanced output is provided whose data is derived from either of two sources: (1) the transmit CDP signal in a normal mode; or (2) from the conditioned diphase group demultiplexed data (CDPGDD) in a loop-back mode. The CDPGMD signal shall have the following characteristics: (1) CDP coding scheme as shown in FIG. 18; (2) output impedance of 135 ohms ±10%; (3) output levels of 3 volts peak to peak ±10% when terminated with 135 ohms ±10%; (4) short circuit limitations of 0.1 amps; (5) longitudinal balance of not less than 40 dB; and (6) rise and fall times such that the transitions in both directions shall be reasonably equal within the limits specified above and be equally affected by shunt capacitors across the line. Properly shaped waveforms shall exhibit smooth expediential curves and contain no points of inflection prior to obtaining maximum amplitudes.

The CDPGDD shall be demodulated back to NRZ according to FIG. 18 and outputted from the digital control pulse generated printed wiring circuit board 6. This output is designated $\overline{WDR}$ for write data received. The receiver 64 KHz timing shall be used for the CDP demodulation. In loop-back mode, the demodulator shall instead demodulate the transmit CDP (XCDP) signal. The signal WDRA is a duplicate of the signal WDR for fan-out requirements.

A traffic fault output $\overline{TFCF}$ is provided which is a logic zero if the CDP group demultiplex data is either (1) not present; or (2) lies outside a frequency band of 14 to 35 KHz. The activity/frequency monitoring may be done after the group interface receiver. In loop-back mode, the activity-frequency monitor shall instead monitor the transmit conditioned diphase (XCDP) signal.

BITE circuitry providing a BITE output BTDCPG is provided to monitor activity of critical points on the digital control pulse generator printed circuit board 6, excluding CDP group demultiplex data traffic. The BITE output shall have activity on it during normal operation, and shall latch up either high or low when a critical point fails.

The outputs designated PMBU, PMPV and PMBW are buffered versions of the inputs U, V and W.

A two-position switch is provided on the digital control pulse generator printed circuit board 6 which, when operated, will (1) loop the CDP group demultiplex data to the CDP group multiplex data (line drivers and receivers are used in this mode) and (2) loop the transmit CDP signal to the right data received bus, after demodulating.

Figure 21:
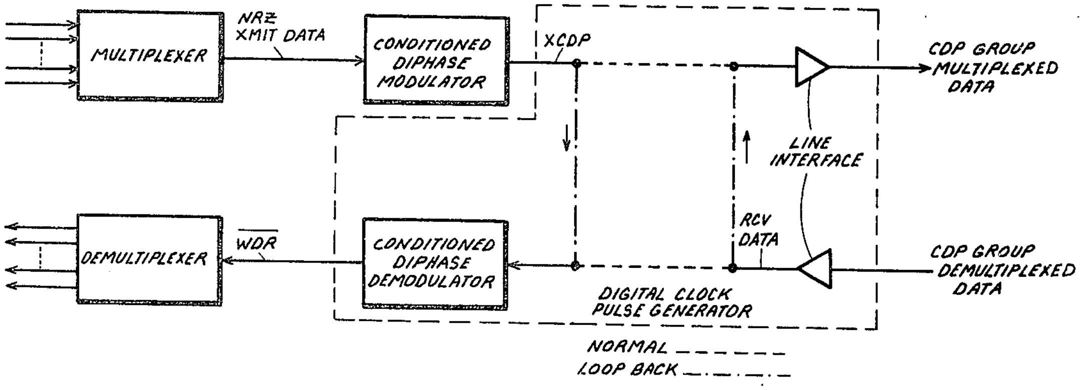
FIG. 21 is a block diagram illustrating the loop-back feature in accordance with the principles of the present invention.
Figure 22A:
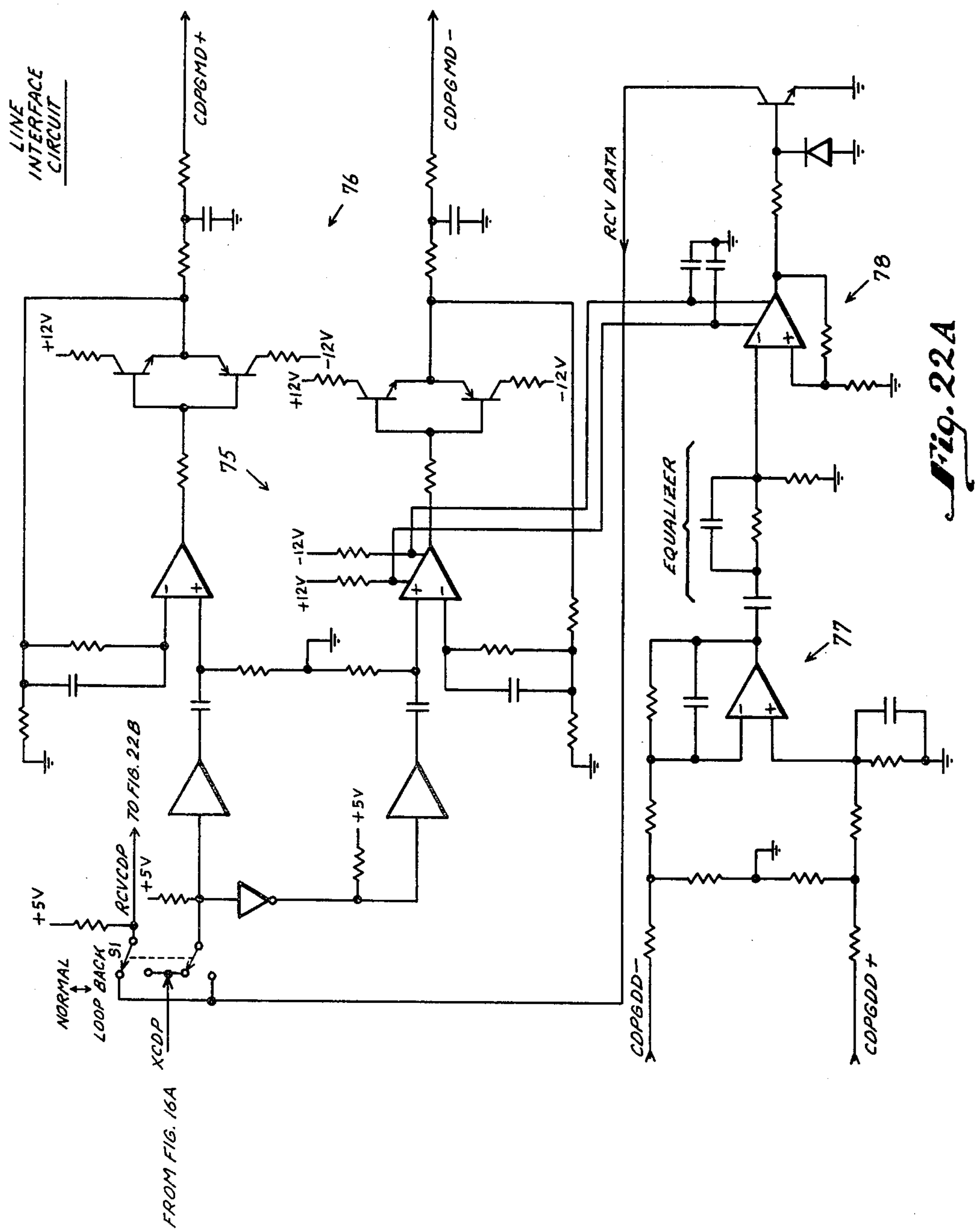
Figure 22B:
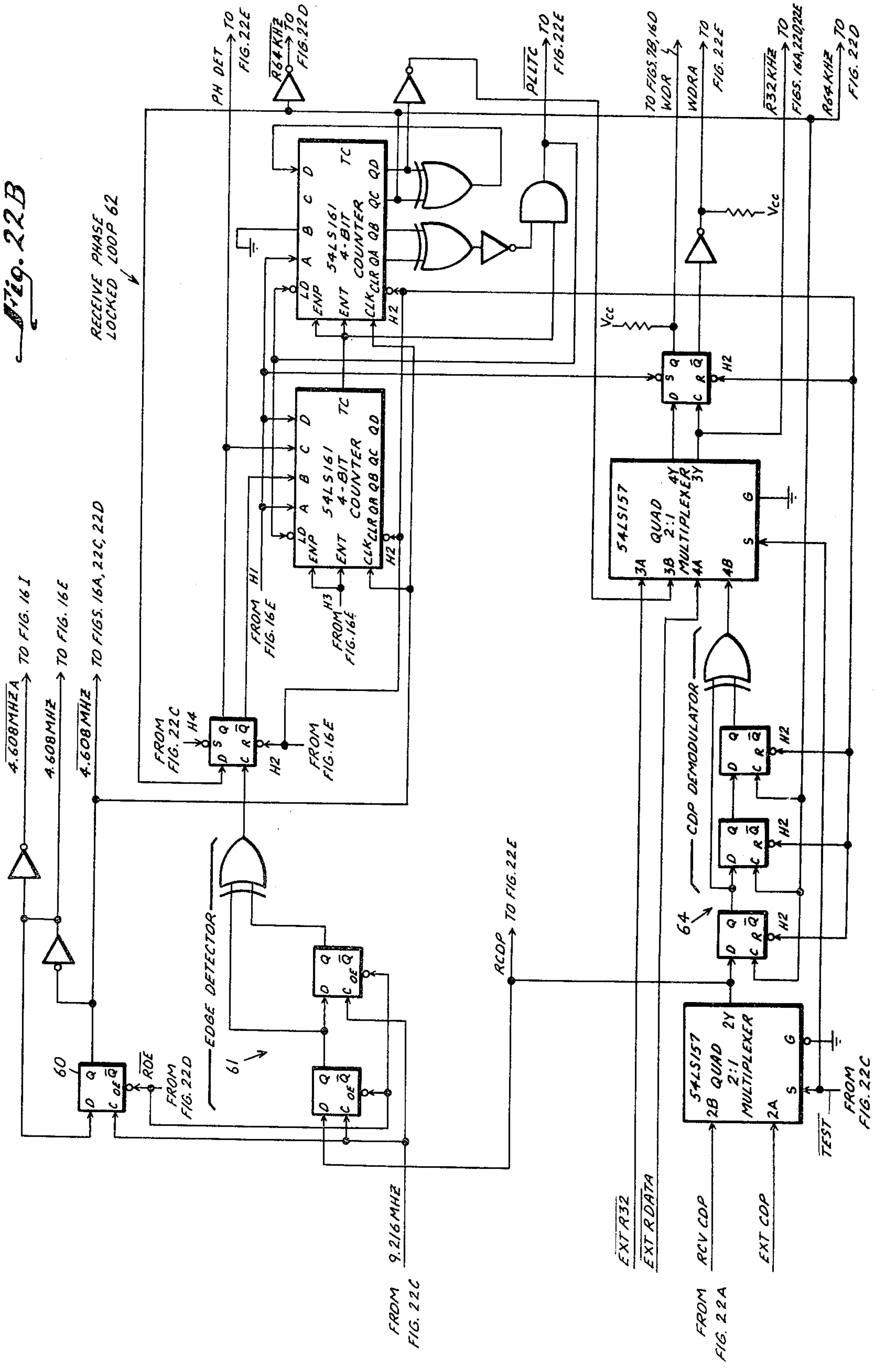
Figure 22C:
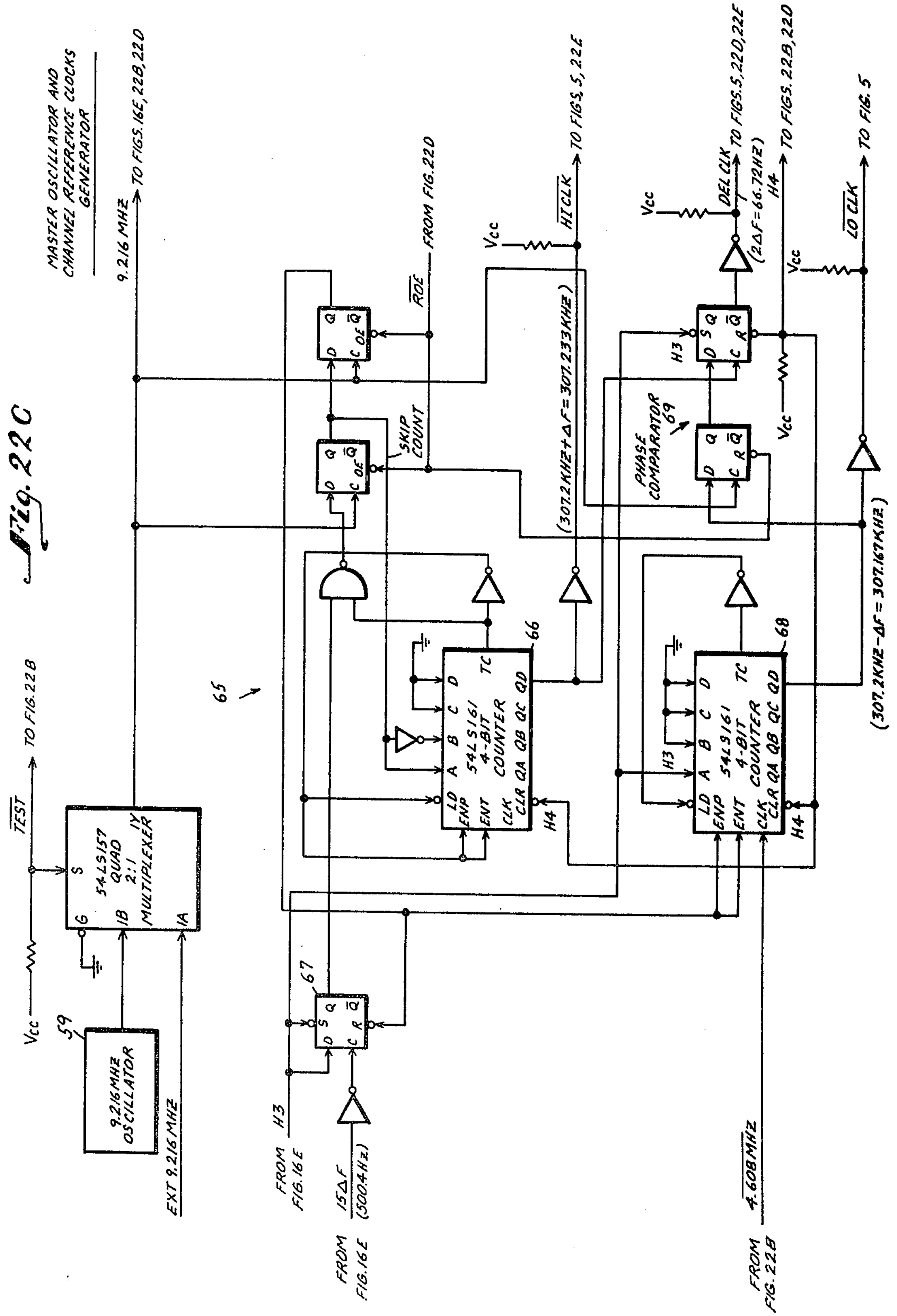
Figure 22D:
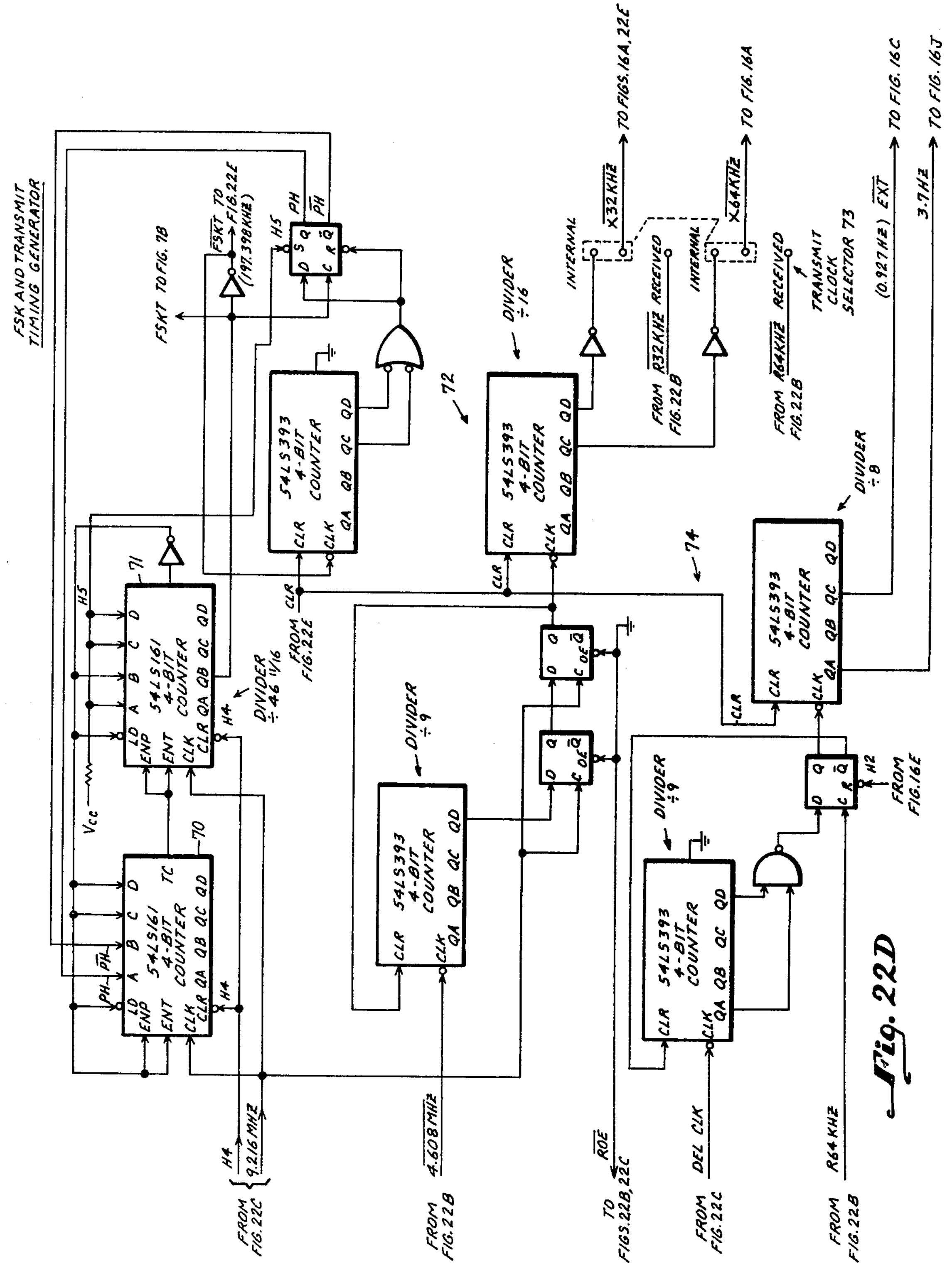

This loop-back connection is shown in FIG. 21.

A two-position jumper plug is provided on the digital control pulse generator printed circuit board 6 so that the transmit timing can be either generated internally from the crystal oscillator, or derived from the group demultiplex data. The switch positions will be labeled "internal" and "received".

While we have described above the principles of our invention in connection with specific apparatus, it is to be clearly understood that this description is made only by way of example and not as a limitation to the scope of our invention as set forth in the objects thereof and in the accompanying claims.

We claim:

1. In a digital time division multiplex multiplexer-demultiplexer combination at one communication terminal to multiplex N input data signals each having a predetermined bit rate into a transmitted synchronous data stream having a predetermined fixed data format and a given bit rate greater than the sam of said predetermined bit rates and to demultiplex N output data signals each having said predetermined bit rate from a received synchronous data stream having said data format and said given bit rate, where N is an integer greater than one, a common controller coupled to a common timing signal generator and each of N channel printed circuit board plug-in receptacles each coupled to a different one of said N input data signals and a different one of N outputs each for a different one of said N output signals, each of said N receptacles having plugged therein a selected one of no printed circuit board, a digital data channel printed circuit board and a frequency shift keying (FSK) channel printed circuit board to process a mixture of digital data signals, teletype signals and FSK signals in said N input data signals and said received data stream, said mixture of signals being in any random order and mix and said digital channel printed circuit boards and said FSK channel printed circuit boards being plugged in said N receptacles in any random order and mix, said controller at least controlling said N receptacles for multiplexing said N input data signals to provide said transmitted data stream and for demultiplexing said received data stream to distribute said N output data signals to appropriate ones of said N outputs, said transmitted data stream and said received data stream having an even distribution of said N input data signals and said N output data signals, respectively, even if certain ones of said N receptacles have no printed circuit board plugged therein, said controller further controlling said timing signal generator for aligning receive timing signals with said data format of said received data signals to provide receive frame synchronization to enable proper demultiplexing of said received data stream, said controller comprising:

a programmed digital sequencer executing a series of instructions to control said multiplexing, said demultiplexing and said frame synchronization, said sequencer including program memory means to supply a plurality of digital codes each related to a different one of said series of instructions, and support logic means coupled to said memory means, said N receptacles and said timing generator responsive to said plurality of digital codes to provide control signals for said multiplexing, said demultiplexing and said frame synchronization.

2. A controller according to claim 1, wherein said memory means includes a program memory having an address input, a data code output and an operation code output, a counter coupled to said data code output, said operation code output, said address input and said timing generator to provide addresses for said memory, a first register coupled to said timing generator and said data code output to store said data code, and a second register coupled to said timing generator and said operation code output to store said operation code, said first and second registers providing said plurality of digital codes.

3. A controller according to claim 2, wherein said memory means further includes a parity checking means coupled to said data code output and said operation code output for parity checking in said memory means.

4. A controller according to claims 1, 2 or 3, wherein said data format includes a plurality of channel data time slots, and a plurality of overhead time slots distributed in a given manner throughout said format; and said support logic means includes logic circuitry coupled to said timing genertor, a data rate code bus, a receive bus for said received data stream, a transmit bus for said transmitted data stream, each of said N receptacles and said first and second registers to monitor a transmit clock signal produced by said timing generator equal to said given rate, to logically determine which of a selected one of said input data signals and an overhead bit is to be gated into said transmitted data stream for any given time slot of said data format and produce first control signals to be coupled to an appropriate one of said N receptacles when an input data signal is to be gated into said transmitted data stream in a first predetermined period of time and in a second predetermined period of time different than and spaced from said first period of time respond to overhead bits of said overhead time slots of said received data stream to provide said frame synchronization and then for each period of a received clock signal produced by said timing generator equal to said given rate produce second control signals to extract said output data signals from said received data stream, said first and second control signals being dependent upon said data rate present on said data rate code bus.

5. A controller according to claim 4, further including built-in test equipment coupled to said timing generator and each of said N receptacles responsive to a fault in said controller, said timing generator and any of said printed circuit boards to provide a fault signal to light a fault indicator at that one of said controller, said timing generator and said printed circuit boards producing said fault and to activate a front panel summary fault indicator and an audible alarm.

6. A controller according to claim 5, wherein said test equipment further includes means coupled to said received data stream to detect whether said given bit rate is within predetermined limits and if not to light a front panel traffic fault indicator.

7. A controller according to claim 6, wherein at least one of each of said first and second control signals is coupled to an associated one of said N receptacles to provide on said data rate code bus a code indicating an absence of a printed circuit board in said associated one of said N receptacles.

8. A controller according to claims 1, 2 or 3, further including built-in test equipment coupled to said timing generator and each of said N receptacles responsive to a fault in said controller, said timing generator and any of said printed circuit boards to provide a fault signal, each of said controller, said timing generator and said printed circuit boards having a fault indicator, said fault signal lighting said fault indicator at that one of said controller, said timing generator and said printed circuit boards producing said fault and to activate a front panel summary fault indicator and an audible alarm.

9. A controller according to claim 8, wherein said test equipment further includes means coupled to said received data stream to detect whether said given bit rate is within predetermined limits and if not to light a front panel traffic fault indicator.

10. A controller according to claim 9, wherein at least one of said control signals is coupled to each of said N receptacles in sequence to provide on a data rate control bus a code indication that a printed circuit board is not plugged in an associated one of said N receptacles.

11. A controller according to claims 1, 2 or 3, further including built-in test equipment coupled to said received data stream to detect whether said given bit rate is within predetermined limits and if not to light a front panel traffic fault indicator.

12. A controller according to claim 11, wherein at least one of said control signals is coupled to each of said N receptacles in sequence to provide on a data rate control bus a code indication that a printed circuit board is not plugged in an associated one of said N receptacles.

13. A controller according to claims 1, 2 or 3, wherein at least one of said control signals is coupled to each of said N receptacles in sequence to provide on a data rate control bus a code indication that a printed circuit board is not plugged in an associated one of said N receptacles.

14. A controller according to claims 1, 2 or 3, wherein said predetermined bit rate of each of said N input data signals are different, said N input data signals having a first random mixture of said different bit rates and said N output data signals having a second random mixture of said different bit rates, and said sequencer further includes first means coupled to each of said N receptacles to sequentially determine said bit rate of each of said N input data signals, and second means coupled to said first means and said memory means to determine whether the sum of said bit rates for said N input data signals exceeds said given bit rate, said second means inhibiting time slot assignment in said data format for said N input data signals and activating a front panel indicator if said given bit rate is exceeded and producing codes for each time slot of said data format to cause assignment of data bits of each of said N input data signals with equal spacing throughout said time slots of said data format if said given bit rate is not exceeded, said codes being coupled to said memory means.

15. A controller according to claim 14, wherein said second means causes time slot assignment of data bits of said N input data signals in a decreasing order from that one of said N input data signals having the highest bit rate to that one of said N input data signals having the lowest bit rate.

16. A controller according to claim 15, wherein said data format includes a plurality of channel data time slots, and a plurality of overhead time slots distributed in a given manner throughout said format; and said support logic means includes logic circuitry coupled to said timing generator, a data rate code bus, a receive bus for said received data stream, a transmit bus for said transmitted data stream, each of said N receptacles and said first and second registers to monitor a transmit clock signal produced by said timing generator equal to said given rate, to logically determine which of a selected one of said input data signals and an overhead bit is to be gated into said transmitted data stream for any given time slot of said data format and produce first control signals to be coupled to an appropriate one of said N receptacles when an input data signal is to be gated into said transmitted data stream in a first predetermined period of time and in a second predetermined period of time different than and spaced from said first period of time respond to overhead bits of said overhead time slots of said received data stream to provide said frame synchronization and then for each period of a received clock signal produced by said timing generator equal to said given rate produce second control signals to extract said output data signals from said received data stream, said first and second control signals being dependent upon said data rate present on said data rate code bus.

17. A controller according to claim 16, further including built-in test equipment coupled to said timing generator and each of said N receptacles responsive to a fault in said controller, said timing generator and any of said printed circuit boards to provide a fault signal to light a fault indicator at that one of said controller, said timing generator and said printed circuit boards producing said fault and to activate a front panel summary fault indicator and an audible alarm.

18. A controller according to claim 17, wherein said test equipment further includes means coupled to said received data stream to detect whether said given bit rate is within predetermined limits and if not to light a front panel traffic fault indicator.

19. A controller according to claim 18, wherein at least one of each of said first and second control signals is coupled to an associated one of said N receptacles to provide on said data rate code bus a code indicating an absence of a printed circuit board in said associated one of said N receptacles.

20. A controller according to claim 14, wherein said data format includes a plurality of channel data time slots, and a plurality of overhead time slots distributed in a given manner throughout said format; and said support logic means includes logic circuitry coupled to said timing generator, a data rate code bus, a receive bus for said received data stream, a transmit bus for said transmitted data stream, each of said N receptacles and said first and second registers to monitor a transmit clock signal produced by said timing generator equal to said given rate, to logically determine which of a selected one of said input data signals and an overhead bit is to be gated into said transmitted data stream for any given time slot of said data format and produce first control signals to be coupled to an appropriate one of said N receptacles when an input data signal is to be gated into said transmitted data stream in a first predetermined period of time and in a second period of time different than and spaced from said first period of time respond to overhead bits of said overhead time slots of said received data stream to provide said frame synchronization and then for each period of a received clock signal produced by said timing generator equal to said given rate produce second control signals to extract said output data signals from said received data stream, said first and second control signals being dependent upon said data rate present on said data rate code bus.

21. A controller according to claim 20, further including built-in test equipment coupled to said timing generator and each of said N receptacles responsive to a fault in said controller, said timing generator and any of said printed circuit boards to provide a fault signal to light a fault indicator at that one of said controller, said timing generator and said printed cicuit boards producing said fault and to activate a front panel summary fault indicator and an audible alarm.

22. A controller according to claim 21, wherein said test equipment further includes means coupled to said received data stream to detect whether said given bit rate is within predetermined limits and if not to light a front panel traffic fault indicator.

23. A controller according to claim 22, wherein at least one of each of said first and second control signals is coupled to an associated one of said N receptacles to provide on said data rate code bus a code indicating an absence of a printed circuit board in said associated one of said N receptacles.

24. A controller according to claim 14, further including built-in test equipment coupled to said timing generator and each of said N receptacles responsive to a fault in said controller, said timing generator and any of said printed circuit boards to provide a fault signal to light a fault indicator at that one of said controller, said timing generator and said printed circuit boards producing said fault and to activate a front panel summary fault indicator and an audible alarm.

25. A controller according to claim 24, wherein said test equipment further includes means coupled to said received data stream to detect whether said given bit rate is within predetermined limits and if not to light a front panel traffic fault indicator.

26. A controller according to claim 25, wherein at least one of said control signals is coupled to each of said N receptacles in sequence to provide on a data rate control bus a code indication that a printed circuit board is not plugged in an associated one of said N receptacles.

27. A controller according to claim 14, further including built-in test equipment coupled to said received data stream to detect whether said given bit rate is within predetermined limits and if not to light a front panel traffic fault indicator.

28. A controller according to claim 27, wherein at least one of said control signals is coupled to each of said N receptacles in sequence to provide on a data rate control bus a code indication that a printed circuit board is not plugged in an associated one of said N receptacles.

29. A controller according to claim 14, wherein at least one of said control signals is coupled to each of said N receptacles in sequence to provide on a data rate control bus a code indication that a printed circuit board is not plugged in an associated one of said N receptacles.

* * * * *